(12) United States Patent
Seo

(10) Patent No.: US 11,227,394 B2
(45) Date of Patent: Jan. 18, 2022

(54) METHOD FOR SETTING EDGE BLUR FOR EDGE MODELING

(71) Applicant: Kyungpook National University Industry-Academic Cooperation Foundation, Daegu (KR)

(72) Inventor: Su Young Seo, Daegu (KR)

(73) Assignee: Kyungpook National University Industry-Academic Cooperation Foundation, Daegu (KR)

( * ) Notice: Subject to any disclaimer, the term of this patent is extended or adjusted under 35 U.S.C. 154(b) by 208 days.

(21) Appl. No.: 16/341,765

(22) PCT Filed: Oct. 13, 2017

(86) PCT No.: PCT/KR2017/011349
§ 371 (c)(1),
(2) Date: Apr. 12, 2019

(87) PCT Pub. No.: WO2018/070844
PCT Pub. Date: Apr. 19, 2018

(65) Prior Publication Data
US 2019/0236787 A1 Aug. 1, 2019

(30) Foreign Application Priority Data
Oct. 13, 2016 (KR) ........................ 10-2016-0132654

(51) Int. Cl.
*G06T 7/174* (2017.01)
*G06T 7/13* (2017.01)
(Continued)

(52) U.S. Cl.
CPC ................ *G06T 7/13* (2017.01); *G06T 5/002* (2013.01); *G06T 5/009* (2013.01); *G06T 7/00* (2013.01);
(Continued)

(58) Field of Classification Search
CPC ........ G06K 9/38; G06K 2209/01; G06K 9/42; G06K 9/3275; G06K 9/00442;
(Continued)

(56) References Cited

U.S. PATENT DOCUMENTS

| 7,983,468 B2* | 7/2011 | Ibikunle | ............... G06Q 20/401 |
| | | | 382/137 |
| 8,848,094 B2* | 9/2014 | Li | .......................... G03B 17/18 |
| | | | 348/348 |

(Continued)

FOREIGN PATENT DOCUMENTS

| JP | 08-018828 A | 1/1996 |
| JP | 2010-237177 B | 10/2010 |

(Continued)

OTHER PUBLICATIONS

Dong et al., Blur kernel estimation via salient edges and low rank prior for blind image deblurring, Jul. 27, 2017 [on-line][retrieved Dec. 29, 2020], Signal Processing: Image Communication, vol. 58, pp. 134-145. Retrieved: https://www.sciencedirect.com/science/article/pii/S0923596517301340 (Year: 2017).*

(Continued)

*Primary Examiner* — Matthew C Bella
*Assistant Examiner* — Dennis Rosario
(74) *Attorney, Agent, or Firm* — Procopio, Cory, Hargreaves & Savitch

(57) ABSTRACT

Provided is a method for setting an edge blur according to a brightness value including a first step for providing a plurality of target sheets on each of which a reference pattern for detecting a reference line and a grid pattern for detecting an edge position are provided, and in which changes in brightness values included in the grid patterns are different from each other, a second step for capturing images of the
(Continued)

target sheets to obtain target sheet images, a third step for analyzing a reference pattern for each corresponding target sheet to estimate the reference line, and analyzing the grid pattern to extract an edge profile provided in the grid pattern, a fourth step for calculating a gradient of a brightness difference between adjacent pixels on the basis of the edge profile, and acquiring a background edge blur parameter and a foreground edge blur parameter on the basis of the gradient according to brightness contrast present in the image, and a fifth step for generating background edge blur prediction information and foreground edge blur prediction information for each pixel value, which respectively correspond to brightness values on a basis of distributions of the background edge blur parameter and the foreground edge blur parameter.

According to the present invention, a resolution pattern of a camera is accurately understood according to a contrast by predicting two edge parameters according to a brightness value, and a more accurate edge position having sub-pixel level precision can be determined through an edge blur having the predicted edge parameters, and thus, there is an effect of accurately and swiftly recognizing the edge position in camera resolution analysis, geographic information construction, autonomous mobile robot, or the like.

16 Claims, 50 Drawing Sheets

(51) Int. Cl.
| | |
|---|---|
| *G06T 5/00* | (2006.01) |
| *H04N 5/235* | (2006.01) |
| *G06T 7/194* | (2017.01) |
| *G06T 7/40* | (2017.01) |
| *G06T 7/149* | (2017.01) |
| *G06T 7/00* | (2017.01) |
| *G06T 7/155* | (2017.01) |
| *G06T 7/90* | (2017.01) |

(52) U.S. Cl.
CPC ............ *G06T 7/149* (2017.01); *G06T 7/155* (2017.01); *G06T 7/174* (2017.01); *G06T 7/194* (2017.01); *G06T 7/40* (2013.01); *G06T 7/90* (2017.01); *H04N 5/2354* (2013.01)

(58) Field of Classification Search
CPC ...... G06K 9/00463; G06K 9/46; G06T 5/003; G06T 7/194; G06T 2207/20201; G06T 5/50; G06T 7/13; G06T 7/174
See application file for complete search history.

(56) References Cited

U.S. PATENT DOCUMENTS

| | | | | |
|---|---|---|---|---|
| 10,032,254 | B2* | 7/2018 | Harmeling | G06T 5/003 |
| 2013/0336597 | A1* | 12/2013 | Maeda | H04N 5/23254 |
| | | | | 382/275 |

FOREIGN PATENT DOCUMENTS

| | | |
|---|---|---|
| JP | 2014-521990 A | 8/2014 |
| JP | 2015-094701 A | 5/2015 |
| KR | 10-0639164 B1 | 10/2006 |
| KR | 10-2010-0073366 B | 7/2010 |
| KR | 10-1279705 B1 | 6/2013 |
| KR | 10-2016-0100032 A | 8/2016 |
| KR | 10-1765223 B1 | 8/2017 |
| KR | 10-1777696 B1 | 9/2017 |
| WO | 2012/168766 A1 | 12/2012 |

OTHER PUBLICATIONS

Pan et al., Deblurring Face Images with Exemplars, Sep. 6-12, 2014 [retrieved Dec. 30, 2020], European Conference Computer Vision 2014, pp. 47-62. Retrieved: https://link.springer.com/chapter/10.1007/978-3-319-10584-0 4#citeas (Year: 2014).*

Gentile, Weak Gravitational Lensing by Large-Scale Structures: A Tool for Constraining Cosmology, Jun. 28, 2013 [retrieved Dec. 30, 2020], Ecole Polytechnique Federale De Lausanne, These No. 5732 (2013), 219 pages. Retrieved: https://core.ac.uk/download/pdf/147996184.pdf (Year: 2013).*

Couzinie-Devy et al., Learning to Estimate and Remove Non-uniform Image Blur, Jun. 23-28, 2013 [retrieved Dec. 30, 2020], 2013 IEEE Conference on Computer Vision and Pattern Recognition, pp. 1075-1082. Retrieved: https://ieeexplore.IEEE.org/abstract/document/6618987 (Year: 2013).*

Levin et al., Efficient marginal likelihood optimization in blind deconvolution, Jun. 20-25, 2011 [retrieved Dec. 30, 2020], Conference on Computer Vision and Pattern Recognition 2011, pp. 2657-2664. Retrieved: https://ieeexplore.ieee.org/abstract/document/5995308 (Year: 2011).*

Yi et al., LBP-Based Segmentation of Defocus Blur, Apr. 2016 [retrieved Jun. 21, 2021], IEEE Transactions in Image Processing, vol. 25, No. 4, pp. 1626-1638. Retrieved: https://ieeexplore.ieee.org/abstract/document/7403985 (Year: 2016).*

Seo, Investigation on Image Quality of Smartphone Cameras as Compared with a DSLR Camera by Using Target Image Edges, Feb. 28, 2016 [retrieved Aug. 31, 2021], Korean Journal of Remote Sensing, vol. 32, Issue 1, pp. 49-60. Retrieved: https://www.koreascience.or.kr/article/JAKO201609562999088.page (Year: 2016).*

International Preliminary Report on Patentability for related PCT App No. PCT/KR2017/011349, dated Apr. 15, 2019, 14 pgs.

International Search Report and Written Opinion for related International Application No. PCT/KR2017/011349, dated Jan. 15, 2018; English translation of ISR provided; 10 pages.

Ye, J. et al. "High-accuracy edge detection with Blurred Edge Model" Image and Vision Computing 23 (2005) pp. 453-467 (15 pages).

Wu, S. et al. "Blind blur assessment for vision-based applications" J. Vis. Commun. Image Representation 20 (2009) pp. 231-241 (11 pages).

Extended European Search Report for related European Application No. 17859967.6, dated May 12, 2020 (11 pages).

Shan, Y. et al. "Sub-pixel location of edges with non-uniform blurring: a finite closed-form approach" Image and Vision Computing, Mar. 31, 2000, pp. 1015-1023, vol. 18.

Hagara, M. et al. "Edge Detection with Sub-pixel Accuracy Based on Approximation of Edge with Erf Function" Radioengineering, Jun. 2011, pp. 516-524, vol. 20. No. 2.

Joshi, N. et al. "PSF Estimation using Sharp Edge Prediction" Computer Vision and Pattern Recognition, Jun. 1, 2008 (8 pages).

Smith, L. et al. "A New Blur Kernel Estimator and Comparisons to State-of-the-Art" Infrared Imaging Systems: Design, Analysis, Modeling, and Testing XXII, May 13, 2011, pp. 1-19, vol. 8014, No. 1.

Kothe, U. et al. "Reliable Low-Level Image Analysis" Sep. 21, 2007, Retrieved from Internet on May 4, 2020 (318 pages).

* cited by examiner

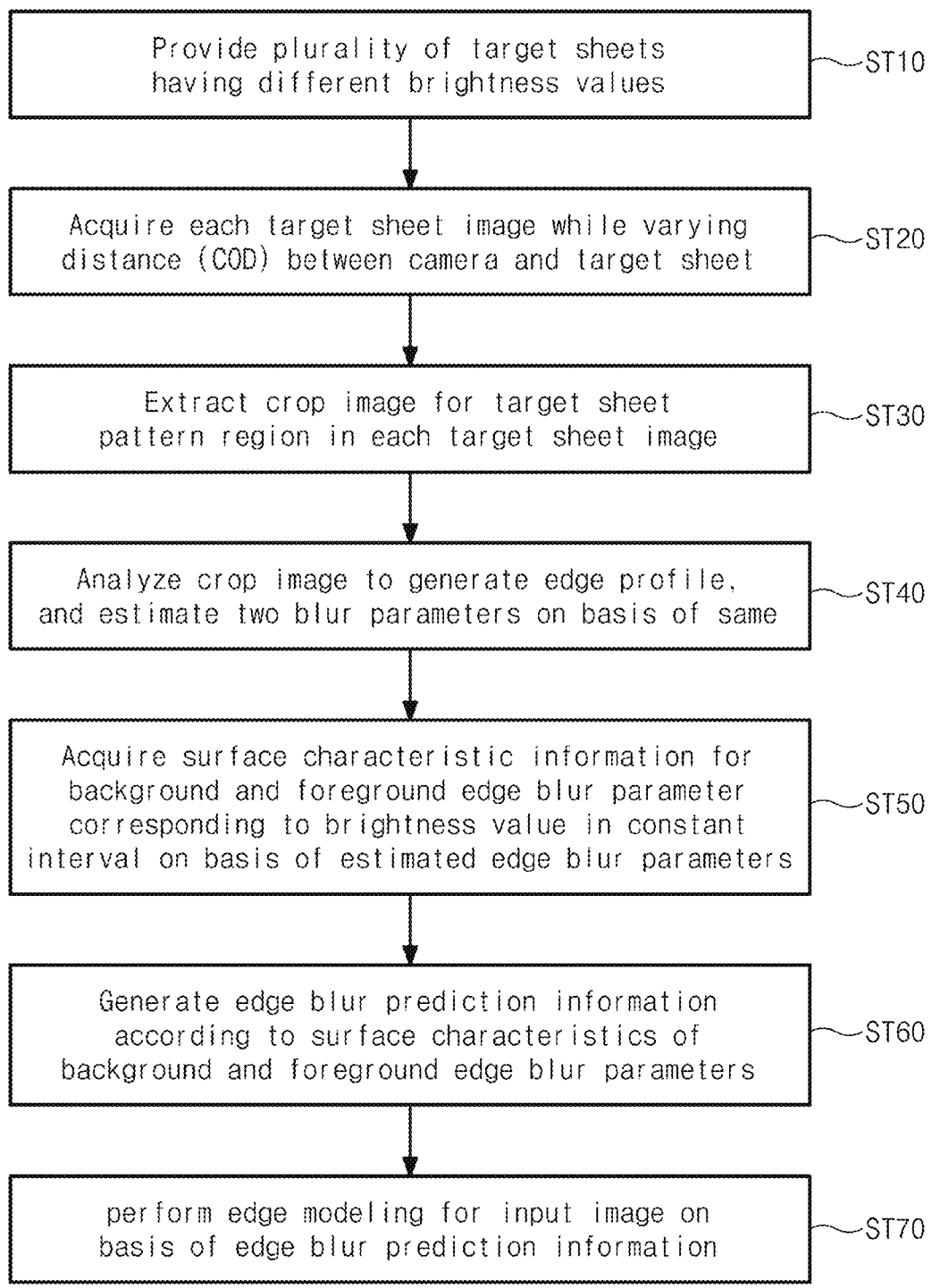

METHOD FOR SETTING EDGE BLUR FOR EDGE MODELING

CROSS-REFERENCE TO RELATED APPLICATIONS

This application is a U.S. National Stage entry of PCT Application No: PCT/KR2017/011349 filed Oct. 13, 2017, which claims priority to Korean Patent Application No. 10-2016-0132654, filed on Oct. 13, 2016, the entire contents of which are hereby incorporated by reference

TECHNICAL FIELD

The present invention disclosed herein relates to a method for predicting two edge blur parameters to be generated in an edge from an edge profile, which has various brightness combinations, according to the brightness contrast, and performing edge modeling through an edge blur corresponding to the predicted two edge blur parameters so as to enable an edge position having more stable sub-pixel level precision to be determined.

BACKGROUND ART

In an image processing field, an edge represents a boundary of an object in which a typical brightness value rapidly changes. Detection and position determination of an edge is a required procedure for extracting and recognizing an object from an image. Due to such importance of an edge, the edge detection is being widely studied in the image processing field.

In order to precisely measure the shape of an object, it is necessary to determine the edge position at sub-pixel level precision. Accordingly, many researches have been performed for determining the edge position at sub-pixel level precision. In addition, researches are also being continued for quantifying the quality of results of the edge detection and position determination.

On the other hand, edges are blurred in various ways in an actual image. Here, most image blurring is caused by a movement or focusing of a camera, and a certain amount of blurring is also caused by the resolution of a camera lens even in a stable camera.

In other words, the edge detection can be estimated on the basis of an edge blur parameter.

Typically, edge modeling is performed for the edge detection, and, at this point, an edge is typically modeled in order to have two brightness parameters and one edge blur parameter.

Accordingly, various methods have been proposed to calculate an edge profile model and parameters thereof. For example, Ye et al. propose a method for generating an edge profile model using a Gaussian function and for estimating an edge and an edge blur parameter using the least mean square algorithm (see Non-Patent Literature 1), and Wu et al. propose a method for modeling a dot distribution function with a uniform circular mask and analyzing a vertical gradient combination at an edge to calculate the edge blur parameter (see Non-Patent Literature 2).

However, there is a limitation in that the above-described edge modeling schemes do not explain occurrences of a hump H and a gutter G that frequently appear in the edge profile as shown in FIGS. 2(a) and 2(d).

This can influence on the edge position determination and consequently act as a factor of decisively influencing on the edge position determination of sub-pixel level precision.

Accordingly, for edge position determination in more stable sub-pixel level precision, it is necessary to generate an edge model capable of providing interpretation even for a hump and a gutter.

CITATION LIST

Non-Patent Literature 1: J. Ye, G. Fu, U. P. Poudel, High-accuracy edge detection with Blurred Edge Model, Image Vis. Comput. 23 (2005) 453-467. doi:10.1016/j.imavis.2004.07.007.

Non-Patent Literature 2: S. Wu, W. Lin, S. Xie, Z. Lu, E. P. Ong, S. Yao, Blind blur assessment for vision-based applications, J. Vis. Commun. Image Represent. 20 (2009) 231-241. doi:10.1016/j.jvcir.2009.03.002.

DISCLOSURE OF THE INVENTION

Technical Problem

The present invention provides a method for determining an edge blur parameter in consideration of an influence of a contrast change in brightness, and setting an edge blur for edge modeling using the same to enable an edge position to be determined in sub-pixel precision level more stably.

Technical Solution

An embodiment of the present invention provides a method for setting an edge blur according to a brightness value including: a first step for providing a plurality of target sheets on each of which a reference pattern for detecting a reference line and a grid pattern for detecting an edge position are provided, and in which changes in brightness values included in the grid patterns are different from each other; a second step for capturing images of the target sheets to obtain target sheet images; a third step for analyzing a reference pattern for each corresponding target sheet to estimate the reference line, and analyzing the grid pattern to extract an edge profile provided in the grid pattern; a fourth step for calculating a gradient of a brightness difference between adjacent pixels on the basis of the edge profile, and acquiring a background edge blur parameter and a foreground edge blur parameter on the basis of the gradient according to brightness contrast present in the image; and a fifth step for generating background edge blur prediction information and foreground edge blur prediction information for each pixel value, which respectively correspond to brightness values on a basis of distributions of the background edge blur parameter and the foreground edge blur parameter.

In an embodiment, each of the target sheets may include the reference pattern in which one pair of vertical regions and two lateral regions have a segment shape with a prescribed width and are separated from each other with a central gap therebetween, and the grid pattern provided with 4 squares disposed in the central gap.

In an embodiment, the grid pattern may be provided with upper two squares and lower two squares, one square and a square in a diagonal direction thereto being used for background, remaining squares being used for foreground, and brightness values of the foreground and the background having variable values.

In an embodiment, the foreground brightness value may be set brighter than the background brightness value, the background being set to have a variable brightness value of 0.0 to 0.9, and a plurality of target sheets may be manufactured so as to cause the foreground to have a variable brightness value of 0.1 to 1.0.

In an embodiment, the second step may include a step for acquiring a plurality of images while a distance between a camera and an object is varied for each of the plurality of sheets, the third step may estimate the edge profile according to a change in brightness value for each distance between the camera and the object, the fourth step may acquire the background edge blur parameter and the foreground edge blur parameter according to the brightness contrast for each distance between the camera and the object, and the fifth step may generate background edge blur prediction information and foreground edge blur prediction information according to respective distributions of the background edge blur parameter and the foreground edge blur parameter with respect to a brightness value of a constant interval in consideration of the change in brightness value and the distance between the camera and the object.

In an embodiment, in the fourth step, the step of acquiring the edge blur parameters may include: a step for re-sampling the edge profile collected in the third step in a preset interval; a step for generating a mean profile over all edge profiles in the re-sampled interval; a step for acquiring a gradient profile calculated with central values in continuous periods using difference values of consecutive mean profiles; and a step for calculating the background edge blur parameter and the foreground edge blur parameter according to the brightness contrast by generating a gradient modeling function as a following Equation corresponding to the gradient profile, and by selecting one pair of values from which a least square error sum satisfying the same is obtained, $$s = f(\sigma_b, \sigma_f, x) + e = \left( -\frac{h_b}{\sigma_b \sqrt{2\pi}} e^{-\frac{x^2}{2\sigma_b^2}} + \frac{h_f}{\sigma_f \sqrt{2\pi}} e^{-\frac{x^2}{2\sigma_f^2}} \right) + e$$

where, e denotes a random error, $h_b$ denotes background brightness, $h_f$ denotes foreground brightness, $\sigma_b$ denotes the background edge blur parameter, and $\sigma_f$ denotes the foreground edge blur parameter.

In an embodiment, the background edge blur parameter $\sigma_b$, and the foreground edge blur parameter $\sigma_f$ may be set to a mean brightness value for the grid pattern of the target sheet.

In an embodiment, the step for calculating the background edge blur parameter and the foreground edge blur parameter according to the brightness contrast may be configured to calculate the background edge blur parameter and the foreground edge blur parameter for a combination of the background edge blur parameter and the foreground edge blur parameter having values of "0.2" to "2.0" with an interval of "0.01" using a brute-force scheme.

In an embodiment, the fifth step may include: a step for collecting the background edge blur parameter and the foreground edge blur parameter acquired in the fourth step as data points for a preset pixel value DN; a step for calculating respective planar surface characteristics for the background edge blur parameter and the foreground edge blur parameter using the data points; a step for acquiring respective residual components for the background edge blur parameter and the foreground edge blur parameter from the planar surface characteristics, and calculating each of kriging surface characteristics according to a kriging scheme using the residual component; and a step for determining the background and foreground blur prediction information by generating surface characteristics for each pixel value with respect to each of the background edge blur parameter and the foreground edge blur parameter on a basis of a difference between the planar surface characteristics and the kriging surface characteristics.

In an embodiment, planes for the background edge blur parameter and the foreground edge blur parameter may be modeled as a following Equation, $$Z = aX + bY + c + e$$

where, X denotes a background pixel value DN, Y denotes a foreground pixel value DN, Z denotes an edge blur, a, b, and c denote planar parameters to be estimated, and e denotes a random error estimated to be present in the edge blur parameters.

In an embodiment, the calculating of the kriging surface characteristics may include: a step for acquiring a residual component as a following Equation from the edge blur parameters; a step for acquiring a variogram for the residual components, and generating a covariance function by adopting a point of the variogram as an observation value; and a step for estimating a parameter for the covariance function using a least square scheme to acquire the kriging surface characteristics for a pixel value having a constant interval, $$R = y - A\xi$$

where, $$y = A\xi + e$$

where $$y = \begin{bmatrix} Z_1 \\ Z_2 \\ \vdots \\ Z_n \end{bmatrix}$$

$$A = \begin{bmatrix} X_1 & Y_1 & 1 \\ X_2 & Y_2 & 1 \\ \vdots & \vdots & \vdots \\ X_n & Y_n & 1 \end{bmatrix}$$

$$\xi = \begin{bmatrix} a \\ b \\ c \end{bmatrix}$$

$$e = \begin{bmatrix} e_{Z_1} \\ e_{Z_2} \\ \vdots \\ e_{Z_n} \end{bmatrix} \quad e \sim N(0, \sigma_0^2 I)$$

where $\xi$ denotes a parameter vector, and R denotes a residual vector.

In an embodiment, the covariance function may be generated in a quadratic function as a following Equation, $$C(h) = a + bh^2$$

where C(h) denotes the covariance function, a and b denote estimation parameters, and h denotes a distance between adjacent residuals.

In an embodiment, the covariance function may be generated in a linear function as a following Equation, $$V(h) = ah.$$

where V(h) denotes the covariance function, a denotes an estimation parameter, and h denotes a distance between adjacent residuals.

In an embodiment, an edge blur prediction value according to the surface characteristics for each pixel value having the constant interval may be calculated by a following Equation, $$I(P) = k^T K^{-1} R$$

where P is an arbitrary point in a grid configuration predicted by the residuals, and k, K, and R are defined as following, $$k = [C(\overline{PP_1})\ C(\overline{PP_2})\ \ldots\ C(\overline{PP_m})]^T$$

$$K = \begin{bmatrix} 0 & C(\overline{P_1 P_2}) & \ldots & C(\overline{P_1 P_m}) \\ C(\overline{P_1 P_2}) & 0 & \ldots & C(\overline{P_2 P_m}) \\ \vdots & \vdots & \ddots & \vdots \\ C(\overline{P_1 P_m}) & C(\overline{P_2 P_m}) & \ldots & 0 \end{bmatrix}$$

$$R = [R_1\ R_2\ \ldots\ R_m]^T$$

where $PP_i$ is a distance between point P and point $P_i$, $P_i P_j$ is a distance between point $P_i$ and point $P_j$, and $R_i$ is a residual at point $P_i$.

In an embodiment, background edge blur prediction value according to the surface characteristics is set to decrease, as a background pixel value increases or a foreground pixel value increases, and a foreground edge blur prediction value according to the surface characteristics is set to increase, as the background pixel value increases or the foreground pixel value decreases.

Advantageous Effects

According to the present invention, edge blur patterns, which are generated by combinations of various kinds of lenses and image surfaces, can be accurately predicted and an edge position having more stable sub-pixel precision can be determined by estimating respective edge blur parameters for a background region and a foreground region of an image in consideration of various brightness contrast characteristics of the image, and by performing an edge modeling process using the two edge blur parameters corresponding to the respective regions.

In addition, since the respective edge blur parameters are set for the background region and the foreground region, deblurring is useful for making it easy to separate various edges when the edges are populous or overlap each other, and to more easily figure out a denoise amount.

Accordingly, there is an effect of accurately and swiftly recognizing the edge position in camera resolution analysis, geographic information construction, autonomous mobile robot, or the like.

BRIEF DESCRIPTION OF THE DRAWINGS

The accompanying drawings are included to provide a further understanding of the inventive concept, and are incorporated in and constitute a part of this specification. The drawings illustrate exemplary embodiments of the inventive concept and, together with the description, serve to explain principles of the inventive concept. In the drawings:

FIG. 6 is a flowchart for describing a method for setting an edge blur for edge modeling according to the present invention.

MODE FOR CARRYING OUT THE INVENTION

Figure 1:
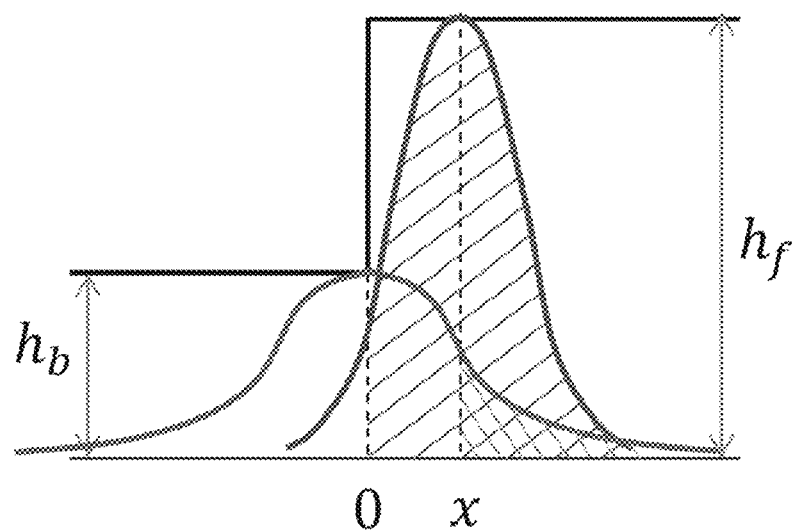
FIG. 1 illustrates an ideal step edge in two brightness regions.
Figure 2A:
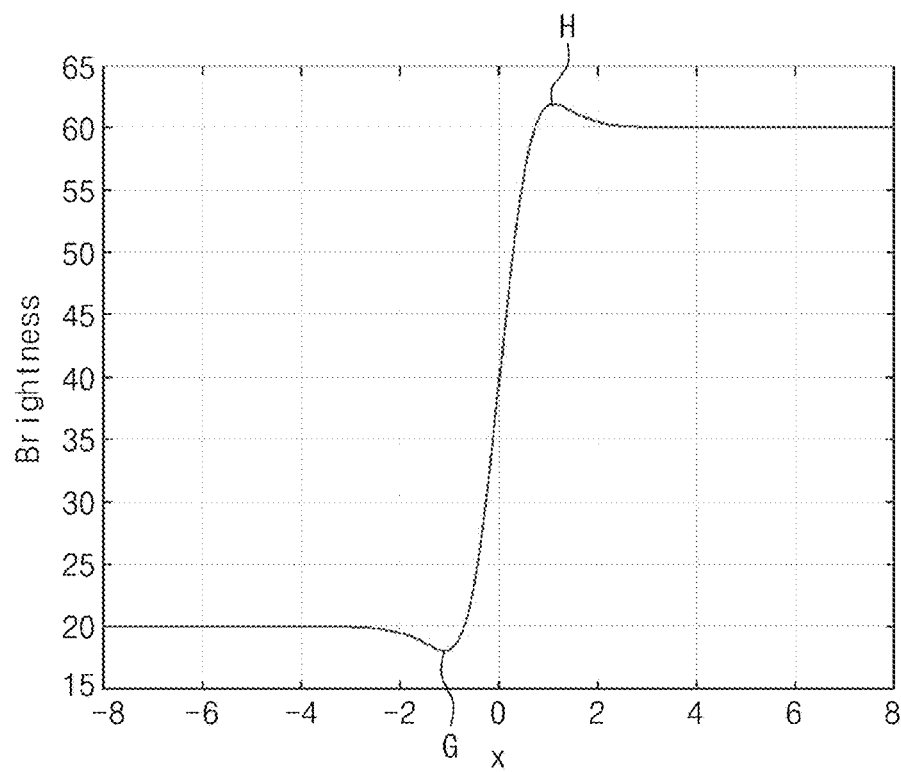
FIGS. 2A-2F illustrate an edge profile (a, b, c) and a gradient profile (d, e, f) according to three different conditions.
Figure 2B:
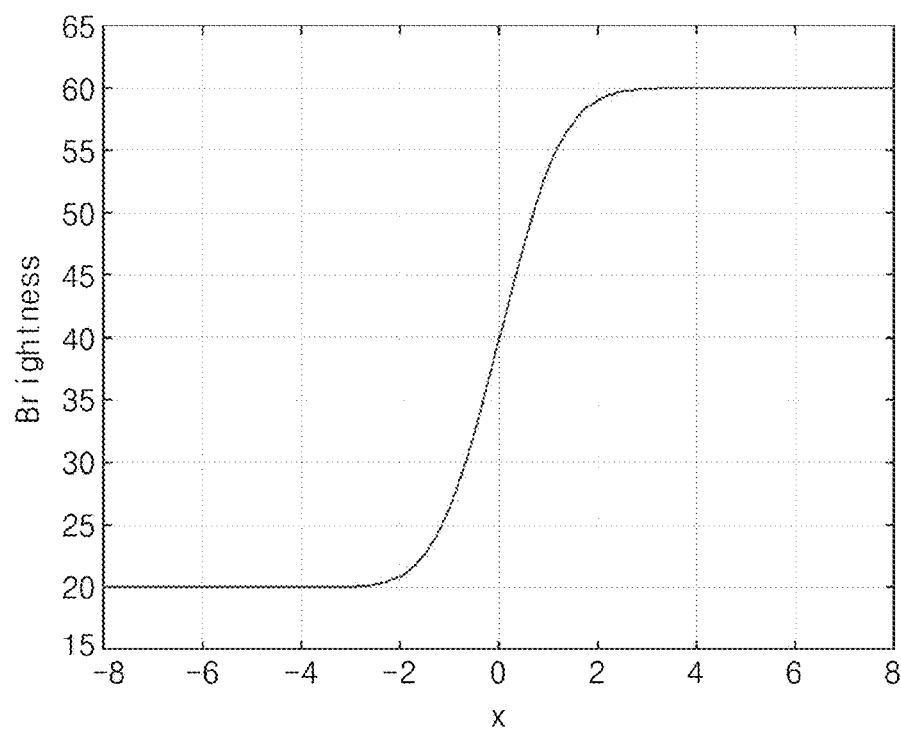
Figure 2C:
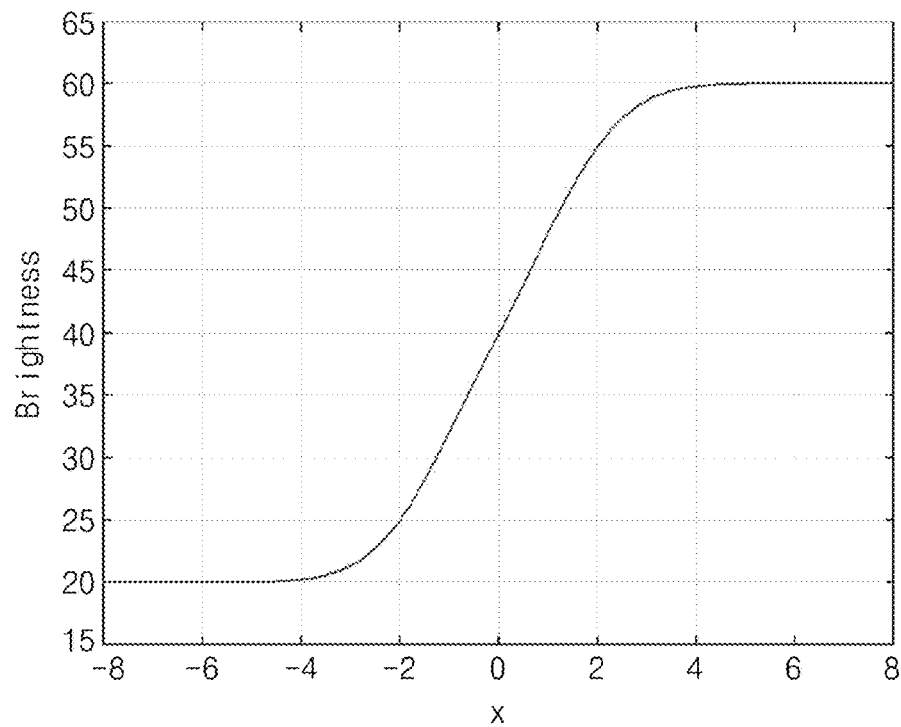
Figure 2D:
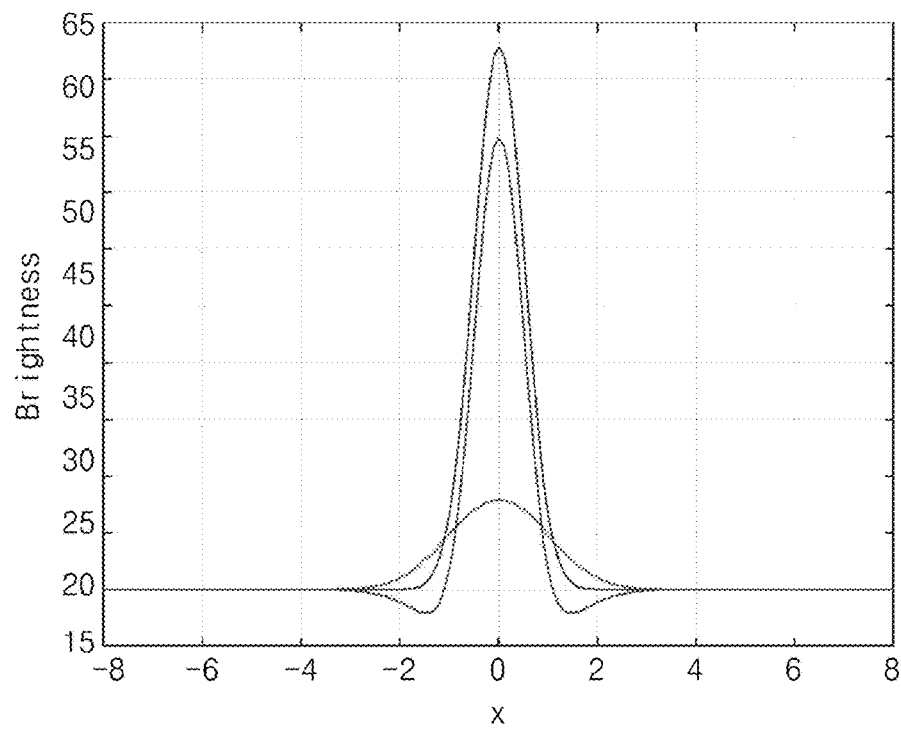
Figure 2E:
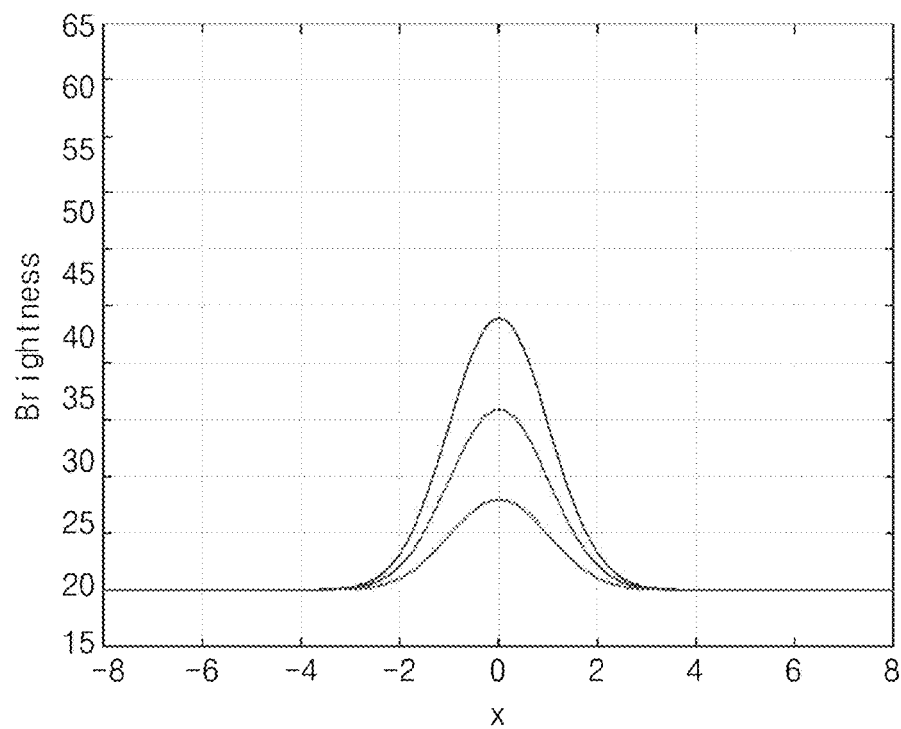
Figure 2F:
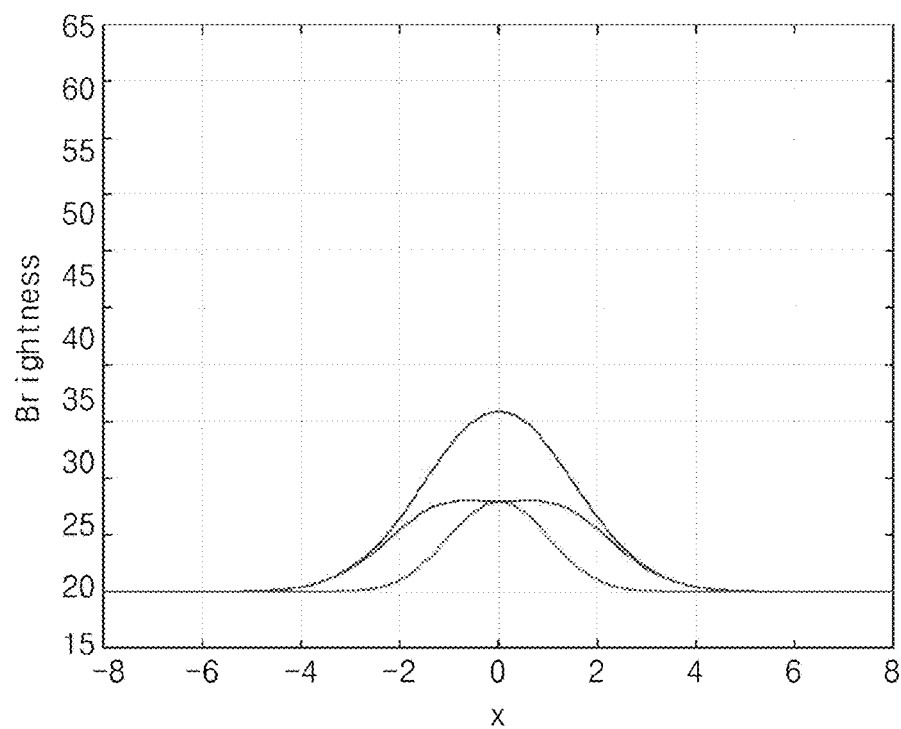

Hereinafter, the present invention will be described in more detail with reference to accompanying drawings. It should be noted that in the drawings, same reference numerals denote same components throughout the specification. On the other hand, terms and words used herein should not be construed limitedly by the common and dictionary meanings but should be interpreted by meaning and concepts conforming to the technical idea of this invention based on the principle that the concept of terms and words can be defined properly by the inventor in order to describe this invention in the best ways. Accordingly, it should be apparent to those skilled in the art that the following description of exemplary embodiments of the present invention are provided for illustration purpose only and not for the purpose of limiting the invention as defined by the appended claims and their equivalents.

The present invention estimates each edge blur parameter for two different brightness regions through brightness contrast for edge modeling, and sets an edge blur for the edge modeling using the same. Here, the edge blur parameter is divided into a background edge blur parameter according to a brightness blurring amount in a dark side (background region) of the edge, and a foreground edge blur parameter according to a brightness blurring amount in a bright side (foreground region) of the edge.

First, FIG. 1 illustrates an ideal step edge in two brightness regions, wherein $h_b$ is background brightness (BB) and $h_f$ is foreground brightness (FB). In FIG. 1, curves represent that amounts of blurring around the brightness of the background region and the brightness of the foreground region are modeled with a Gaussian function, and a brightness value at an arbitrary point x is modeled with a value obtained by adding the areas of shaded regions.

First, blur functions $f_b(x)$ and $f_f(x)$ for the BB and the FB are respectively modeled with Equation (1) and Equation (2) from FIG. 1.

$$f_b(x) = \frac{h_b}{\sigma_b \sqrt{2\pi}} e^{-\frac{x^2}{2\sigma_b^2}} \quad (1)$$

$$f_f(x) = \frac{h_f}{\sigma_f \sqrt{2\pi}} e^{-\frac{x^2}{2\sigma_f^2}} \quad (2)$$

where $\sigma_b$ is a standard deviation and an edge blur parameter for the background brightness, which is to be estimated in the present invention, and $\sigma_f$ is a standard deviation and the edge blur parameter for the foreground, which is to be estimated in the present invention.

In addition, typically, the brightness value (hatching area in FIG. 1) at position x is determined as the sum of surrounding brightness values, and thus a brightness function F(x) in FIG. 1 can be represented in a type of integrating blurs of the foreground region and the background region as the following Equation (3).

$$f(x) = \int_x^\infty f_b(t)dt + \int_{-x}^\infty f_f(t)dt = \quad (3)$$
$$\frac{h_b}{\sigma_b \sqrt{2\pi}} \int_x^\infty e^{-\frac{t^2}{2\sigma_b^2}} dt + \frac{h_f}{\sigma_f \sqrt{2\pi}} \int_{-x}^\infty e^{-\frac{t^2}{2\sigma_f^2}} dt$$

In addition, a gradient profile f(x) of the edge is derived from Equation (3) as the following Equation (4).

$$f(x) = \frac{dF}{dx} = -\frac{h_b}{\sigma_b \sqrt{2\pi}} e^{-\frac{x^2}{2\sigma_b^2}} + \frac{h_f}{\sigma_b \sqrt{2\pi}} e^{-\frac{x^2}{2\sigma_f^2}} = -f_b(x) + f_f(x) \quad (4)$$

FIG. 2 illustrates an edge profile (a, b, c) and a gradient profile (d, e, f) according to three different conditions. In FIG. 2, (a) and (d) are respectively an edge profile and a gradient profile, when the edge blur parameter $\sigma_b$ of the background brightness is larger than the edge blur parameter $\sigma_f$ of the foreground brightness ($\sigma_b > \sigma_f$), (b) and (d) are respectively an edge profile and a gradient profile, when the edge blur parameter $\sigma_b$ of the background brightness is equal to the edge blur parameter $\sigma_f$ of the foreground brightness ($\sigma_b = \sigma_f$), and (c) and (f) are respectively an edge profile and a gradient profile, when the edge blur parameter $\sigma_b$ of the background brightness is smaller than the edge blur parameter $\sigma_f$ of the foreground brightness ($\theta_b < \sigma_f$). In detail, the edge profiles shown in (a) to (c) of FIG. 2 are results obtained in a state in which the background brightness $h_b$ is set to "20" and the foreground brightness $h_f$ is set to "60" for F(x) in Equation (3), wherein (a) and (d) are the results obtained in a case in which the foreground edge blur parameter $\sigma_b$ is set to "1.0" and the background edge blur parameter $\sigma_f$ is set to "0.5", (b) and (e) are the results obtained in a case in which the foreground edge blur parameter $\sigma_b$ and the background edge blur parameter $\sigma_f$ are all set to "1.0", and (c) and (f) are the results obtained in a case in which the foreground edge blur parameter $\sigma_b$ is set to "1.0" and the background edge blur parameter $\sigma_f$ is set to "1.5". In addition, in FIG. 2, green (graphs respectively having the lowest peaks in (d), (e) and (f)), blue (graphs respectively having the highest peaks in (a), (b) and (c), and red (graphs respectively having the second highest peaks in (d), (e) and (f)) are respectively represent a background blur function $f_b(x)$ corresponding to Equation (1), a foreground blur function $f_f(x)$ corresponding to Equation (2), and a gradient profile f(x) corresponding to Equation (4).

As the case of (a) and (d) shown in FIG. 2, it can be understood that characteristics of a gutter G and a hump H appear when the background edge blur parameter $\sigma_b$ is larger than the foreground edge blur parameter $\sigma_f$. This means that the characteristics of the gutter and hump can be analyzed, when the edge modeling is performed through the edge blur determined using the two edge blur parameters estimated according to the present invention.

Then, an edge blur setting method using the two edge blur parameters based on various brightness contrasts will be described on the basis of the above-described theoretical basis.

Figure 3:
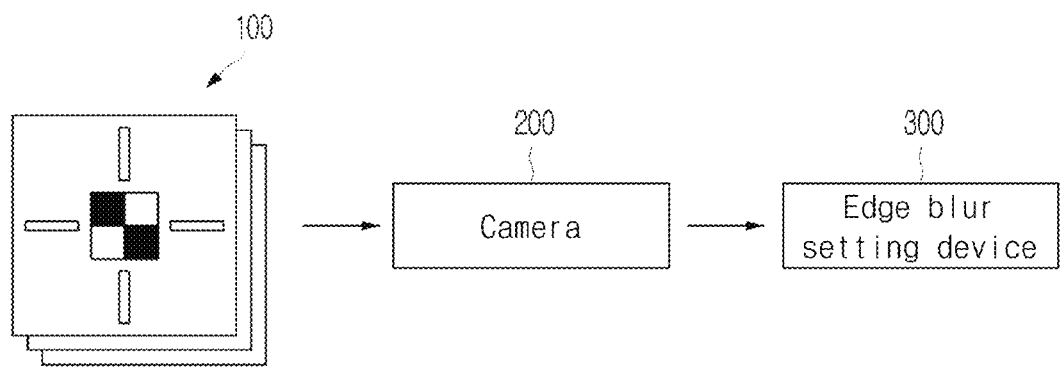
FIG. 3 illustrates a schematic configuration of an edge blur setting system to which the present invention is applied.

FIG. 3 illustrates a schematic configuration of an edge blur setting system to which the present invention is applied.

As shown in FIG. 3, the edge blur setting system applied to the present invention is configured by including a plurality of target sheets 100, a camera 200, and an edge blur setting device 300.

Figure 4:
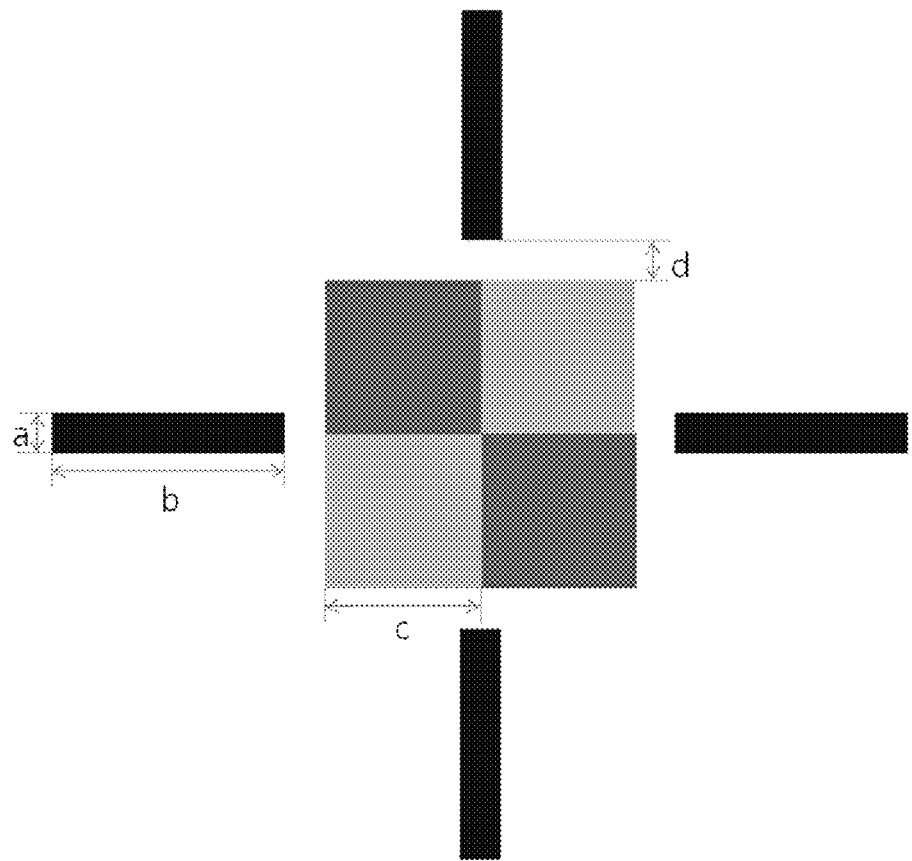
FIG. 4 illustrates a pattern image of a target sheet 100 in FIG. 3.
Figure 5A:
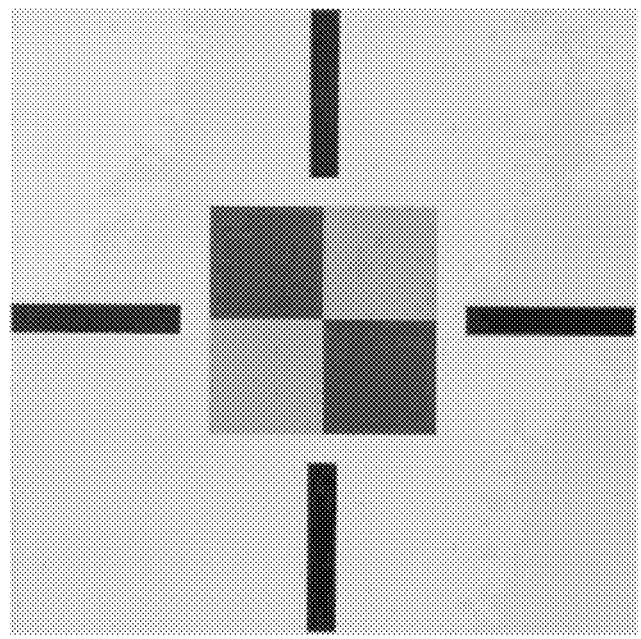
FIGS. 5A-5F illustrate a crop image designed to have the background brightness of about 0.3 and the foreground brightness of about 0.8.
Figure 5B:
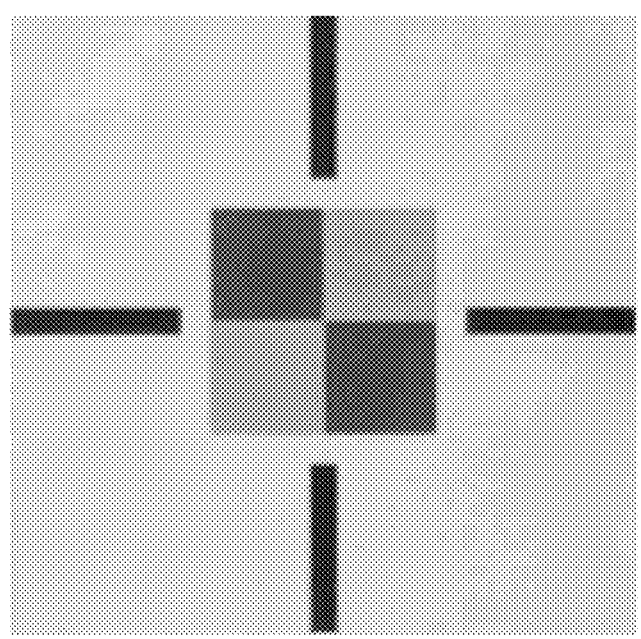
Figure 5C:
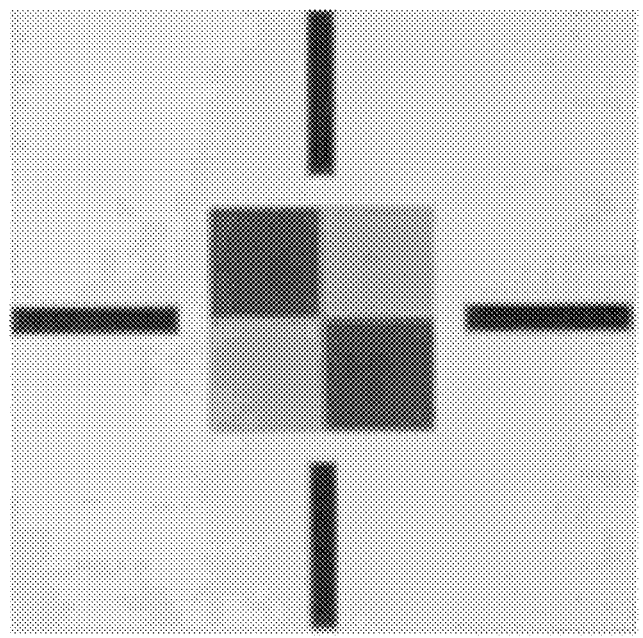
Figure 5D:
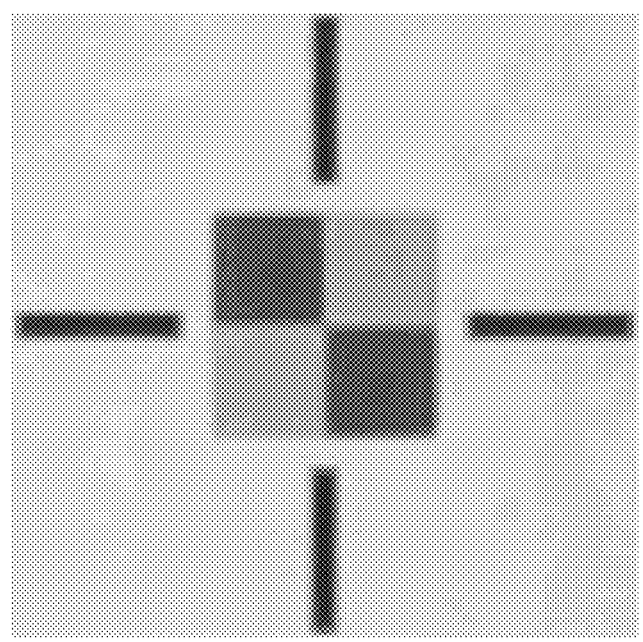
Figure 5E:
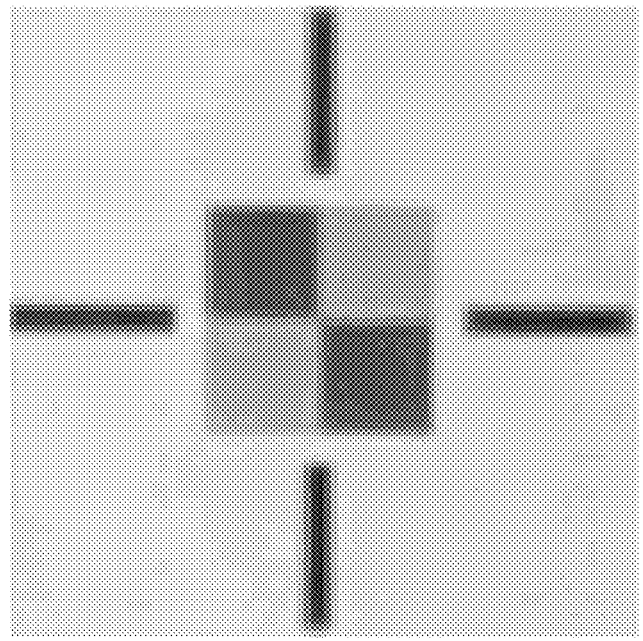
Figure 5F:
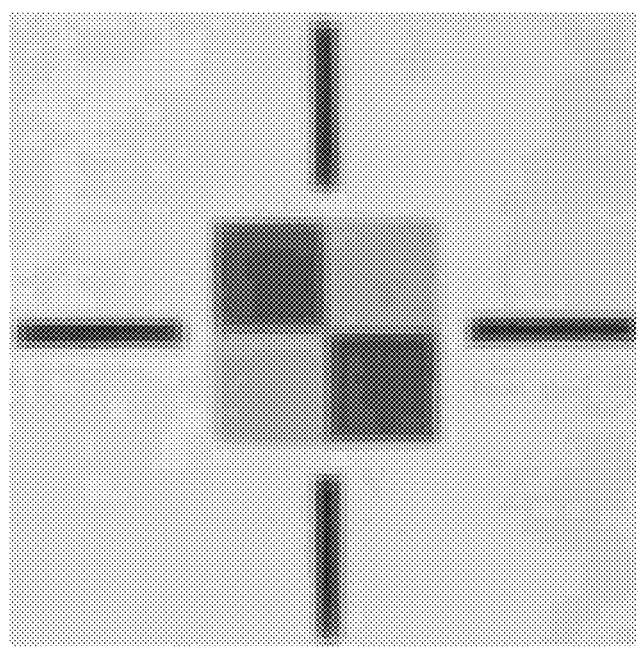

The target sheets 100 are configured by imaging a specific pattern for setting an edge blur. FIG. 4 illustrates a pattern image of the target sheets 100, and the pattern image has two pattern regions of a reference pattern and a grid pattern, the reference pattern being composed of a pair of vertical regions and two lateral regions having a segment shape and separated from each other with a central gap therebetween, and the grid pattern being composed of 4 squares provided in the central gap. The grid pattern is composed of two upper squares and two lower squares, and the left upper square and the right lower square in the diagonal direction thereto are used as the background and have a variable brightness value from 0.0 (black) to 0.9 in a 0.1 unit. In addition, the right upper square and the left lower square in the diagonal direction thereto are used as the foreground and have a variable brightness value from 0.1 to 1.0 (white) in a 0.1 unit. Here, the foreground brightness is set to a level higher by 0.1 to 1.0 level than that of the background brightness, and accordingly, total 55 target sheets 100 having different brightness patterns can be provided.

In FIG. 4, the dimension of each part of the pattern is as the following Table 1.

TABLE 1

| | Part | | | |
|---|---|---|---|---|
| | a | b | c | d |
| Length (mm) | 9 | 52.5 | 35 | 9 |

On the other hand, the camera 200 in FIG. 3 captures images of the target sheets 100 having the different brightness patterns and provides the captured images of the target sheets 100 (hereinafter, referred to as "target images") to the edge blur setting device 300. The camera 200 captures the images of the target sheets 100 while the distance (hereinafter, referred to as "COD") between the camera 200 and the target sheets 100 is changed from about 1 m to about 6 m by an about 1 m unit. In other words, the camera 200 captures 6 target images of the 55 target sheets 100 for each distance to provide total 330 target images to the edge blur setting device 300. In the present invention, the images of the target sheets 100 were captured using a digital signal lens camera, and in order to add a certain amount of an artificial blur, a JPEG compression ratio of 1:4 is applied to each image. FIG. 5 are crop images in which the background brightness is designed to be about 0.3 and the foreground brightness to be about 0.8, and (a) to (f) are images captured when the COD is sequentially set to 1 m, 2 m, 3 m, 4 m, 5 m and 6 m.

In addition, in FIG. 3, the edge blur setting device 300 is configured to analyze a plurality of target images corresponding to a plurality of brightness and CODs, which are provided from the camera 200, to collect edge profiles, estimate the edge blur parameters according to the contrast of the brightness values using the edge profiles, and set the edge blur on the basis of the estimated edge blur parameter to perform an edge modeling process.

Here, the edge blur setting device 300 is configured to apply, as observation values, pixel values (hereinafter, referred to as "DN") corresponding to the background brightness and the foreground brightness estimated on all the target images to a kriging scheme, and to set the edge blur for each DN grid position provided in a constant interval. Here, the DN is a digital number for a brightness value given as 0 to 255 in correspondence to the brightness intensity given as 0.1 to 1.0 in the target sheet.

FIG. 6 is a flowchart for describing a method for setting an edge blur according to the present invention.

First, a reference pattern for detecting a reference line and a grid pattern for detecting an edge position are provided, and the plurality of target sheets 100 having different brightness values are provided in a background region and a foreground region included in the grid pattern (step ST10). Here, the brightness values of the background region and the foreground region of the grid pattern are set to be different by about 0.1 to about 1.0.

Then, a plurality of images of the target sheets 100 are captured by the camera 200 while changing the distance (COD) between the camera 200 and the target sheets 100, and the plurality of target images acquired through the same are provided to the edge blur setting device 300 (step ST20).

In other words, the target images of the plurality of target sheets 100, which have different brightness contrast characteristics for each COD, are provided to the edge blur setting device 300.

The edge blur setting device 300 extracts the crop images corresponding to the target sheet pattern region illustrated in FIG. 4 from the plurality of the target images provided from the camera 200 (step ST30). Here, in order to remove a lens distortion, the edge blur setting device 300 performs re-sampling on all the target images using photomodeler software, and then, crops the result image so as to only include the target sheet pattern as shown in FIG. 4.

Then, for each COD, the edge blur setting device 300 analyzes the crop image for each target image to generate an edge profile for each target image according to the COD, and estimates the two edge blur parameters on the basis thereof (step ST40).

At this point, the edge blur setting device 300 uses a pair of reference lines in the vertical and lateral directions to collect the edge profiles.

Figure 9:
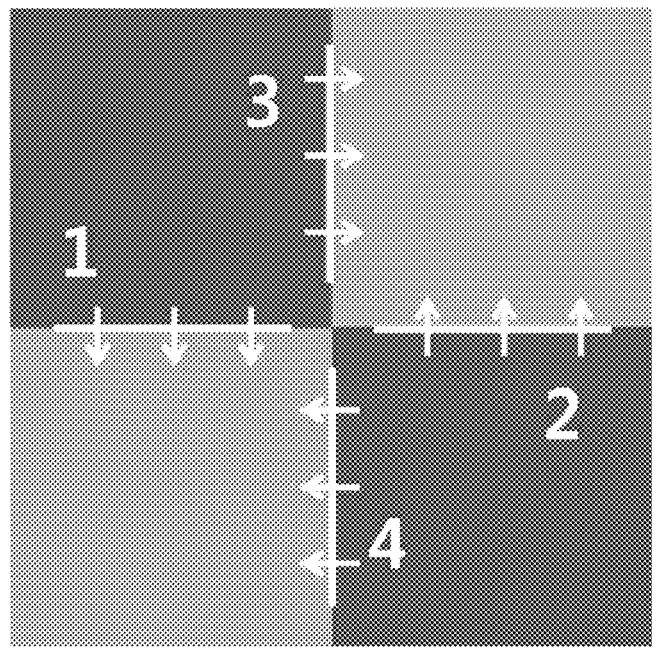
FIG. 9 illustrates a positive direction set for a grid pattern of a target sheet.

In other word, the edge blur setting device 300 detects a reference region using binary thresholding and region characteristics in order to detect an edge reference line. In the binary thresholding, binary images are generated from the crop images using a preset brightness threshold, and then, each binary image is labeled by connection-component-labeling having 4 connections. Since the labeling is performed in the lateral direction and vertical direction, a first region among labeled regions is set as a left region of a lateral reference region. Then, the dimension of each region is compared with the dimension of the left region to determine a right region of the lateral reference region among the labeled regions. In addition, a vertical region is determined by comparing the dimensions of the first region and the remaining regions. In addition, central reference lines of the lateral region and the vertical region are estimated by connecting, with a straight line, the respective center positions of the lateral region and the vertical region. At this point, the edge profiles are collected in a positive direction illustrated in FIG. 9 along the reference line. In other words, the positive direction is set from the background region (dark region) to the foreground region (bright region), as an arrow direction illustrated in FIG. 9.

Figure 10A:
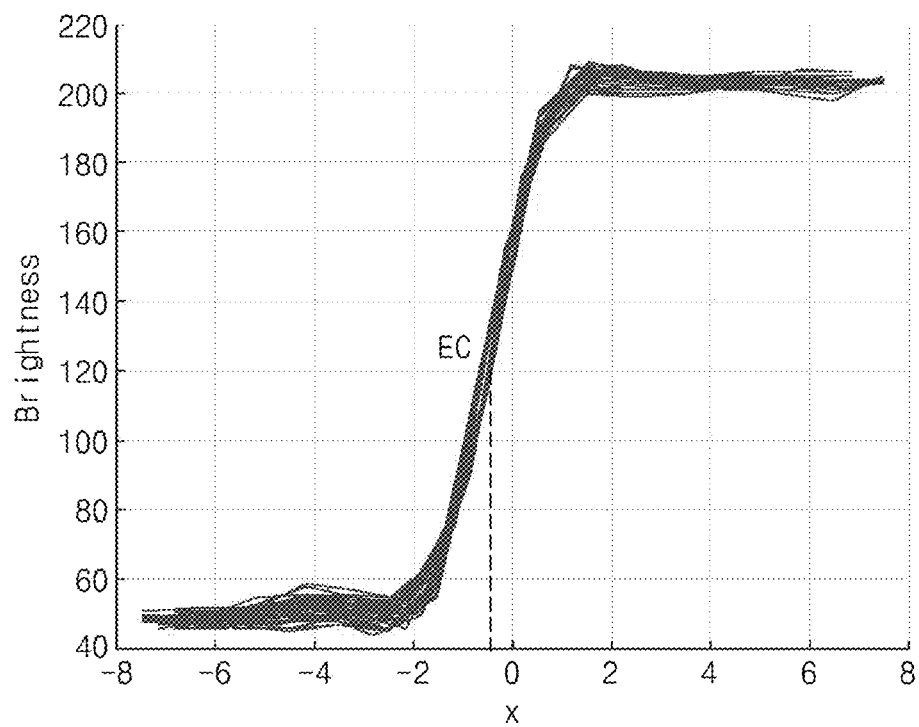
FIGS. 10A-10B illustrate an edge profile collected for a crop image having the foreground brightness of about "0.0", the background brightness of about "1.0", and a COD of about 4 m.
Figure 10B:
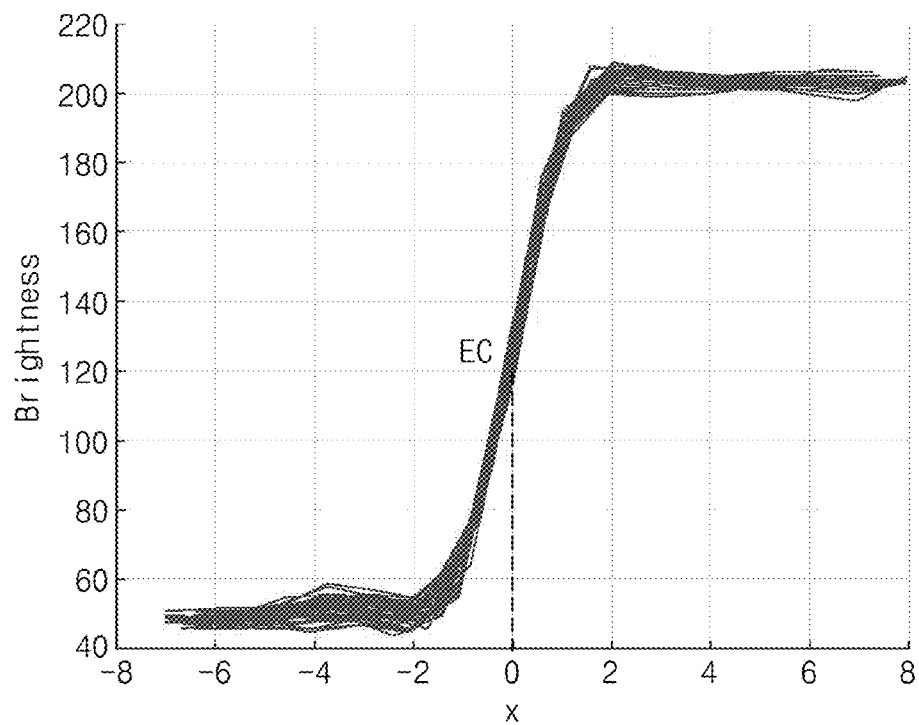
Figure 11A:
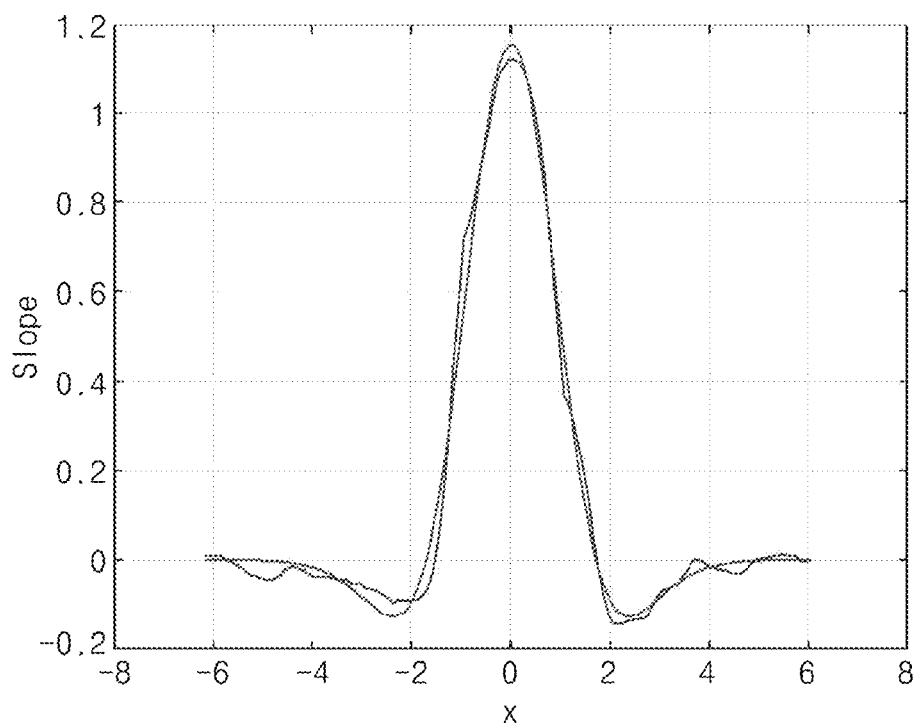
FIGS. 11A-11F illustrate a gradient profile according to the collected edge profile and an edge blur parameter curve estimated by a Brute-force method.
Figure 11B:
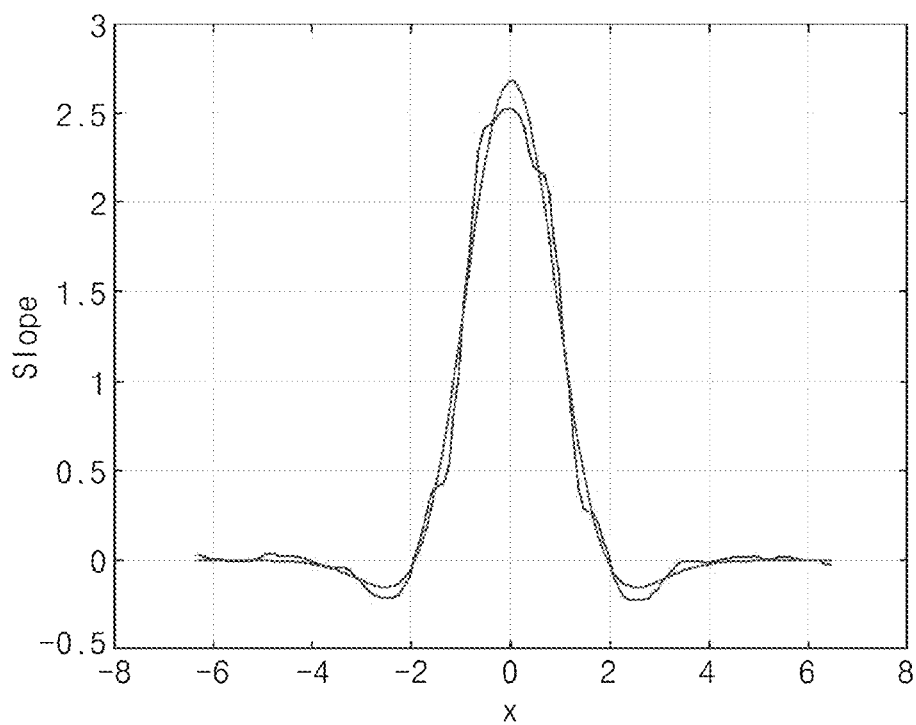
Figure 11C:
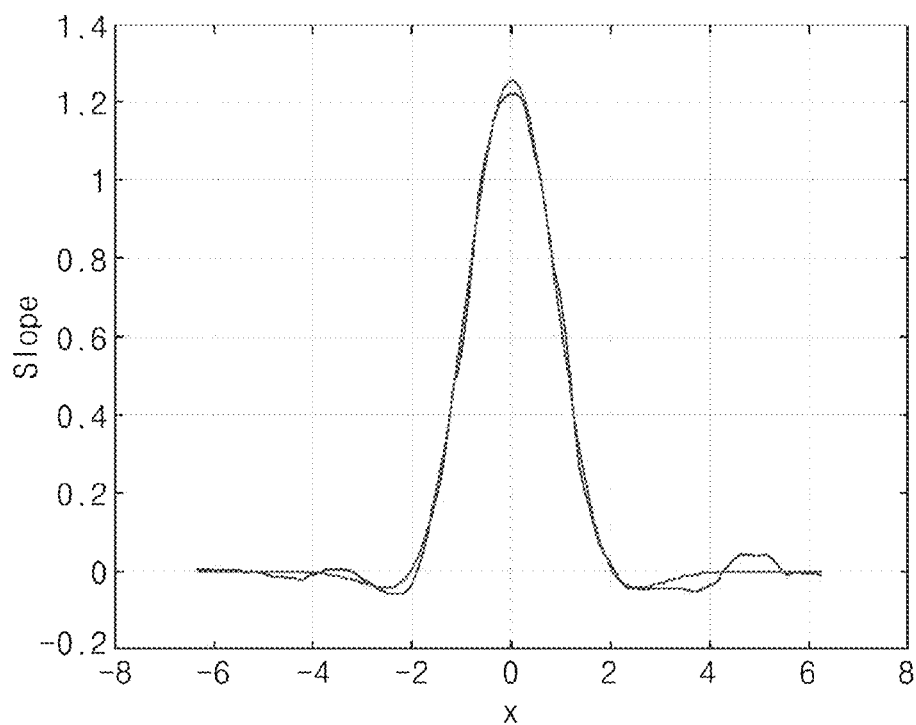
Figure 11D:
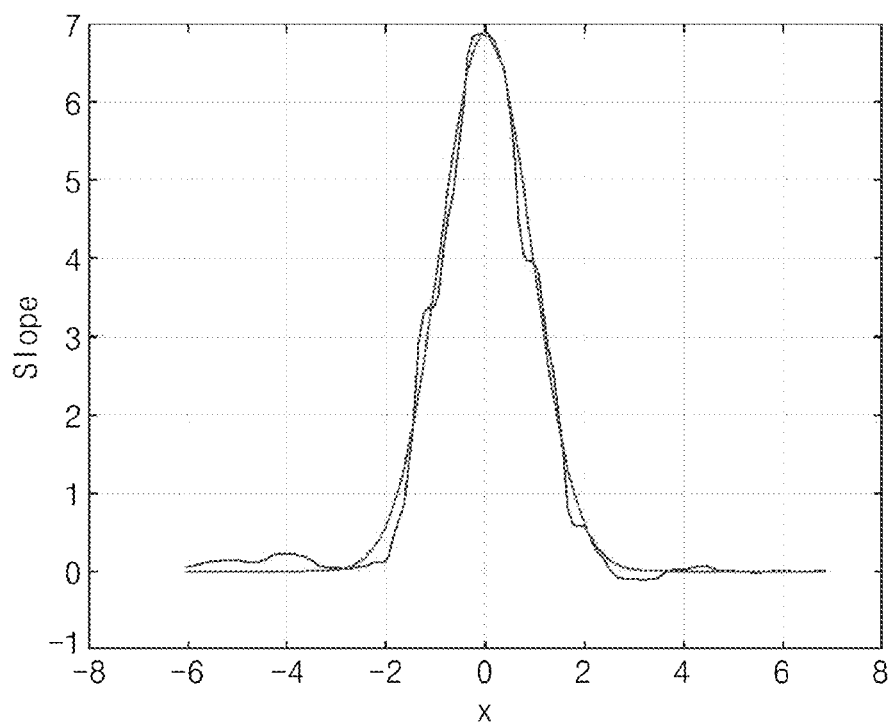
Figure 11E:
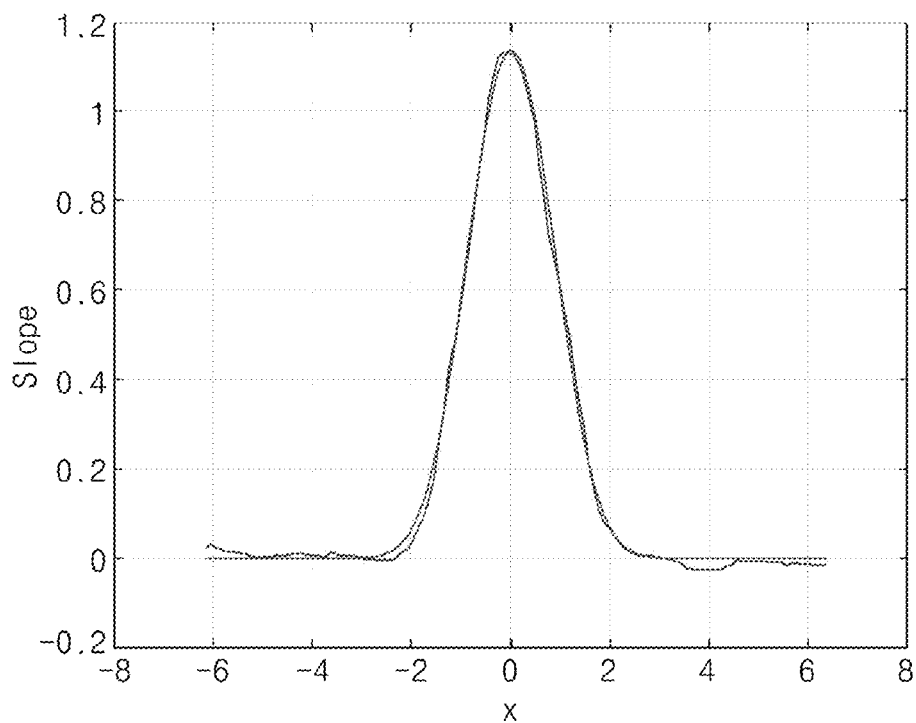
Figure 11F:
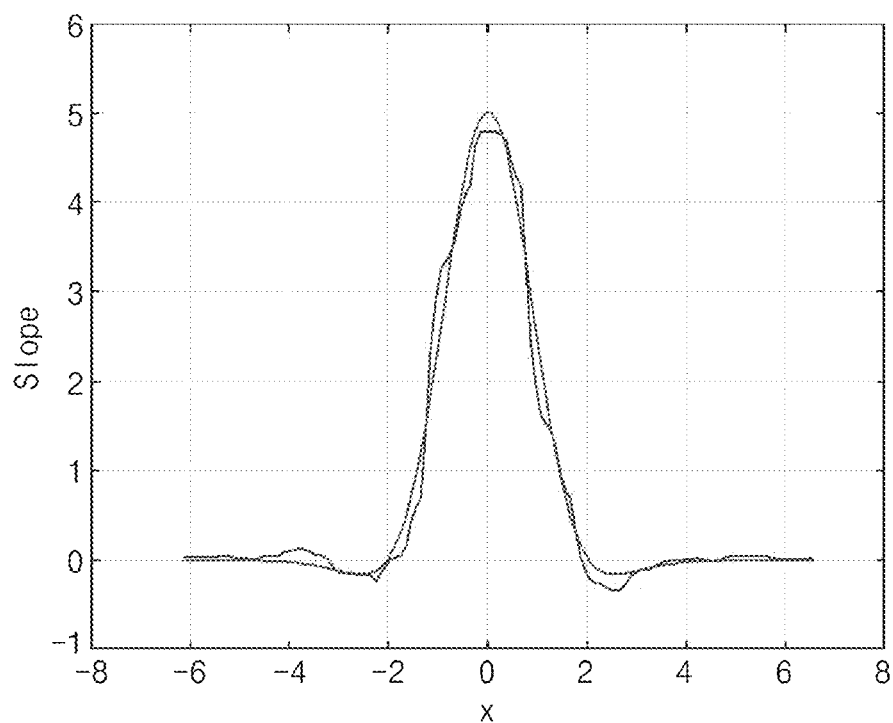
Figure 12A:
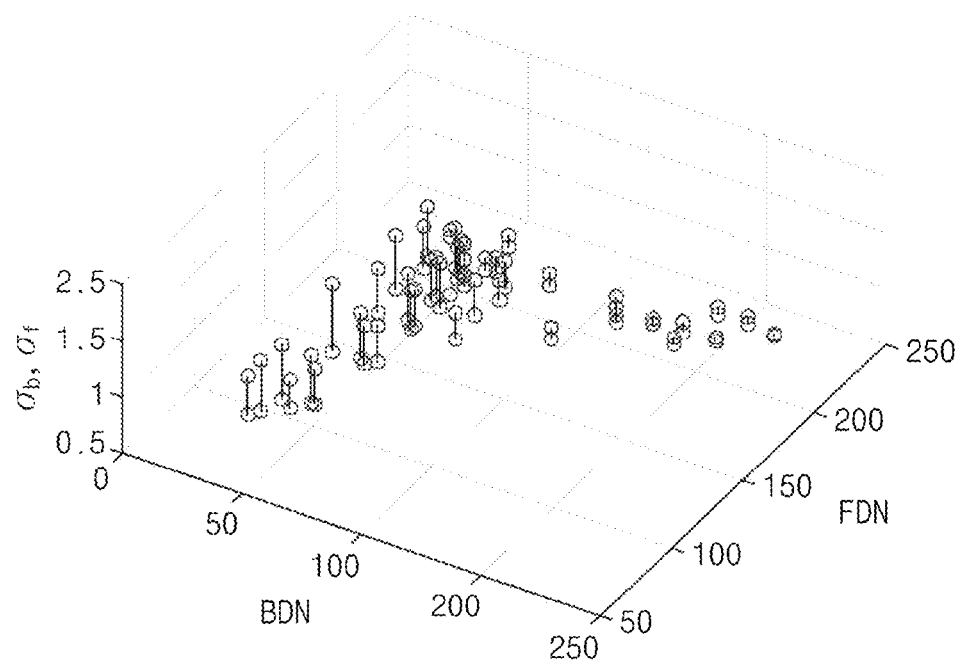
FIGS. 12A-12F illustrate distribution characteristics of an edge blur parameter, which are estimated for a background DN and a foreground DN.
Figure 12B:
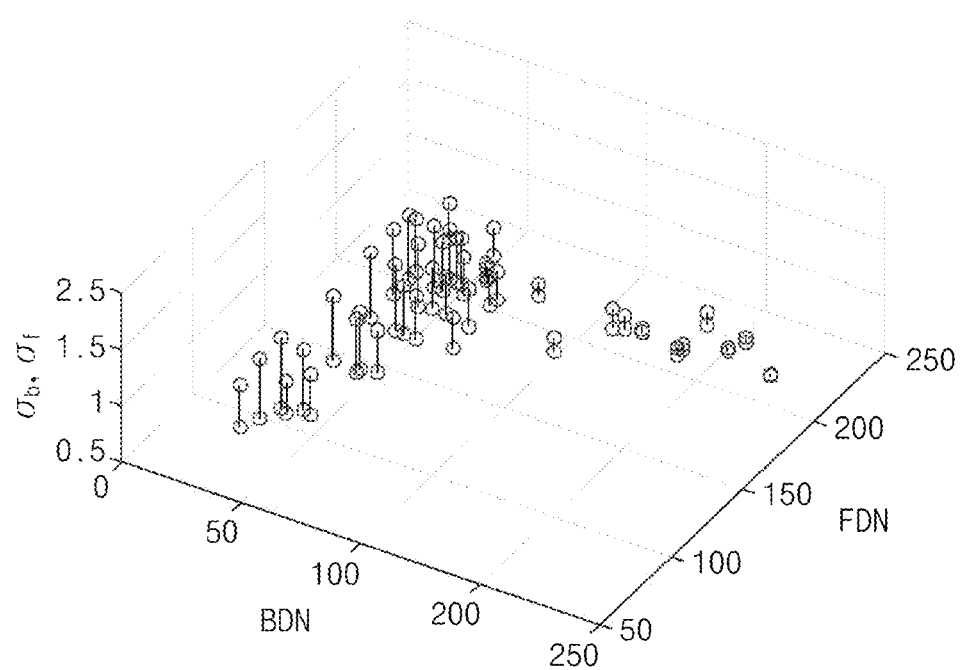
Figure 12C:
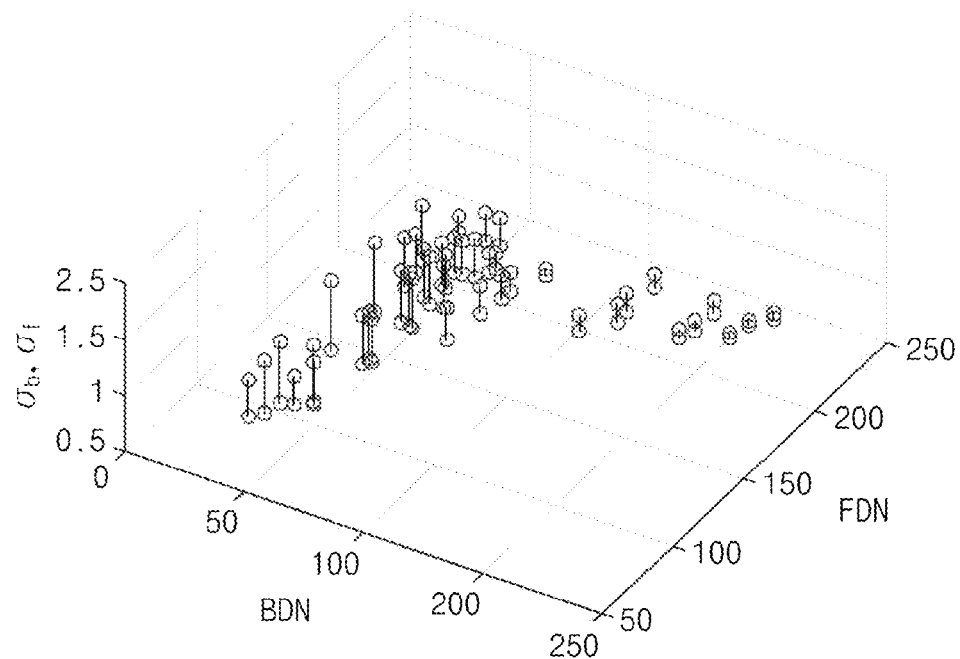
Figure 12D:
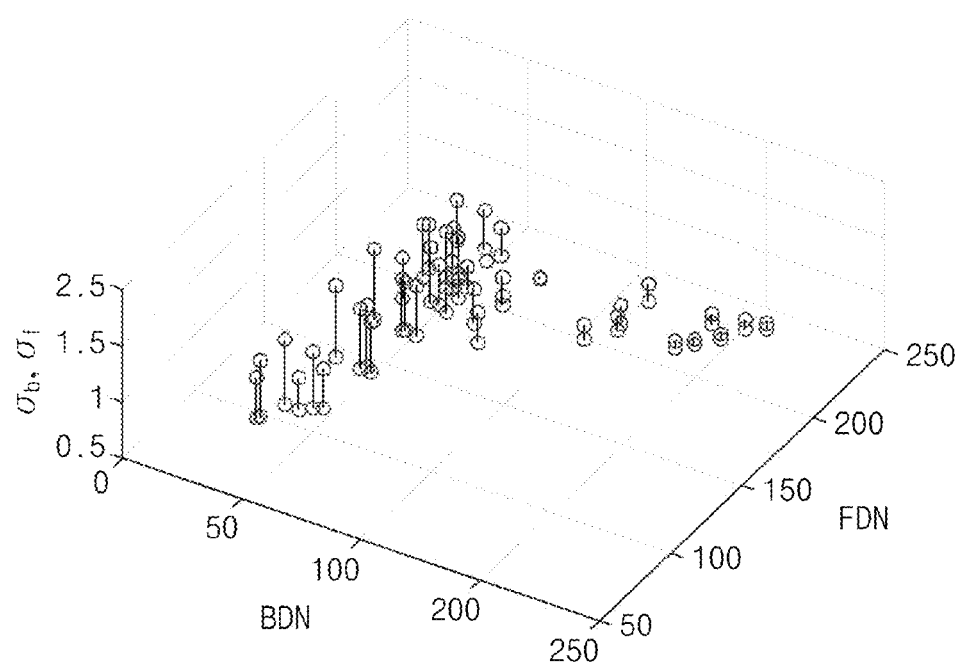
Figure 12E:
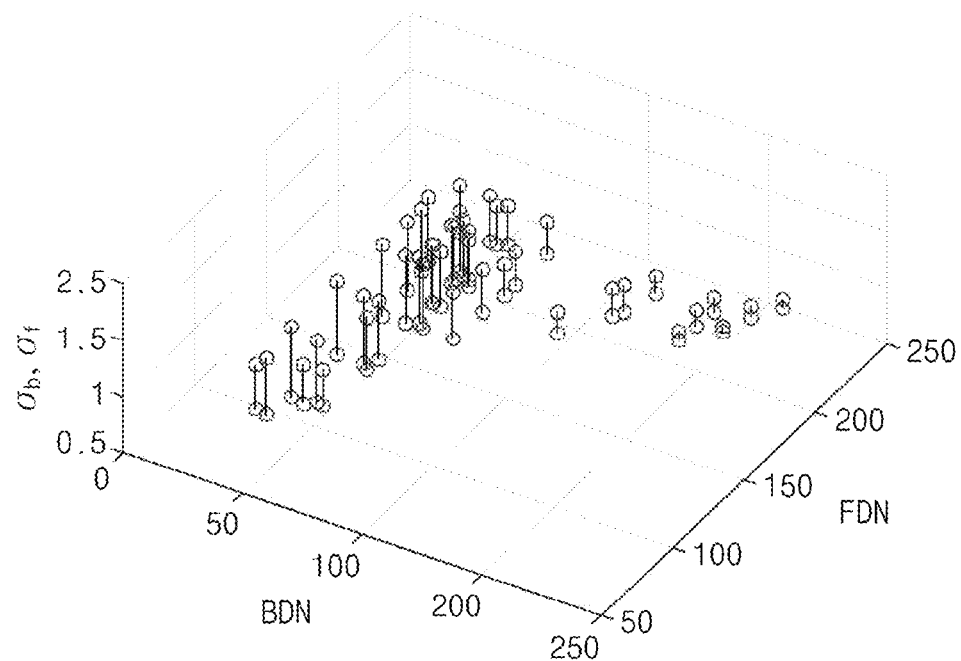
Figure 12F:
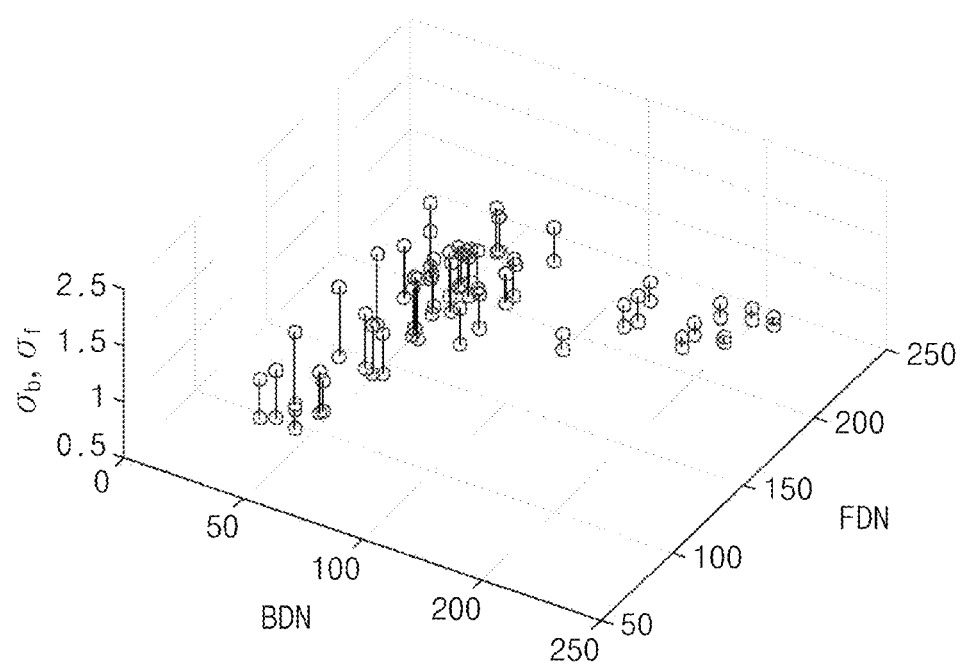
Figure 13A:
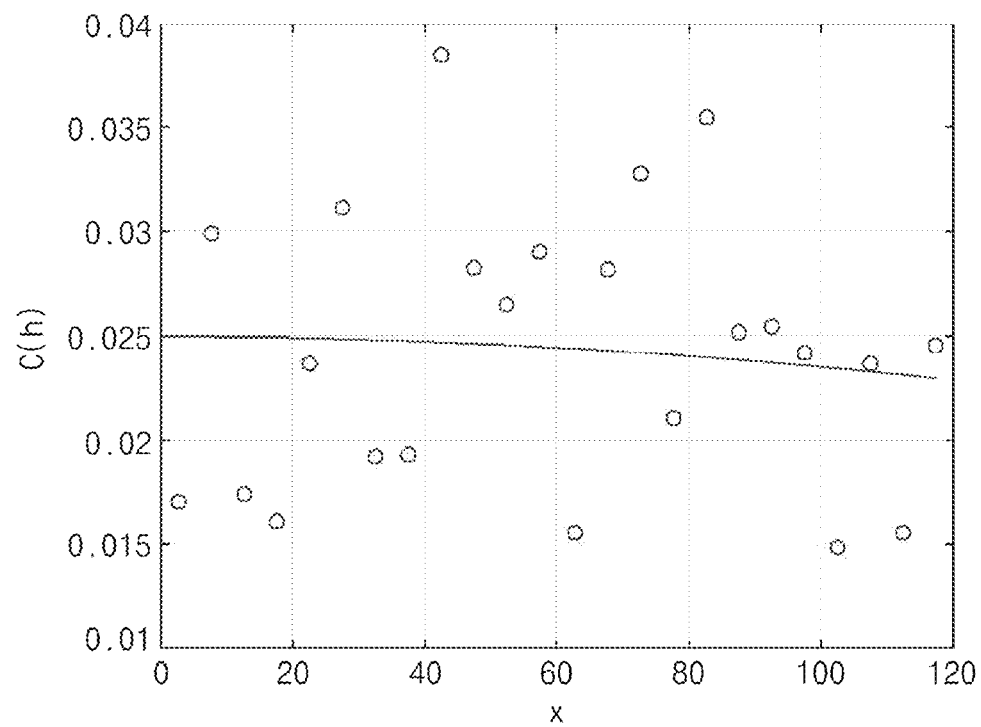
FIGS. 13A-13D illustrate a variogram and a covariance function thereof, when the COD is about 1 m and COD is about 6 m.
Figure 13B:
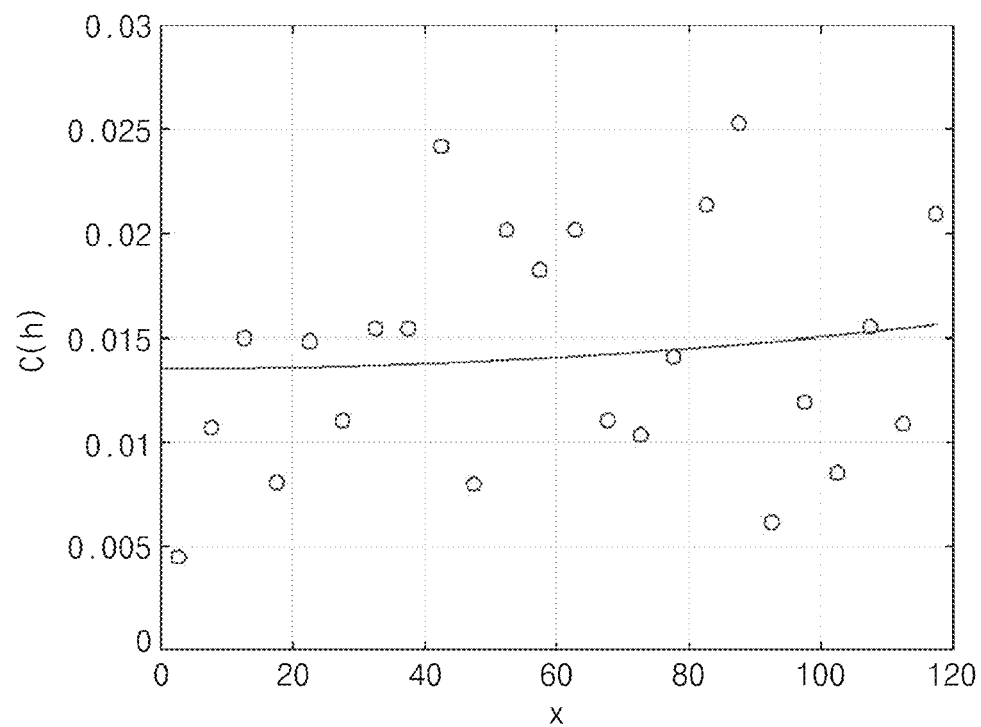
Figure 13C:
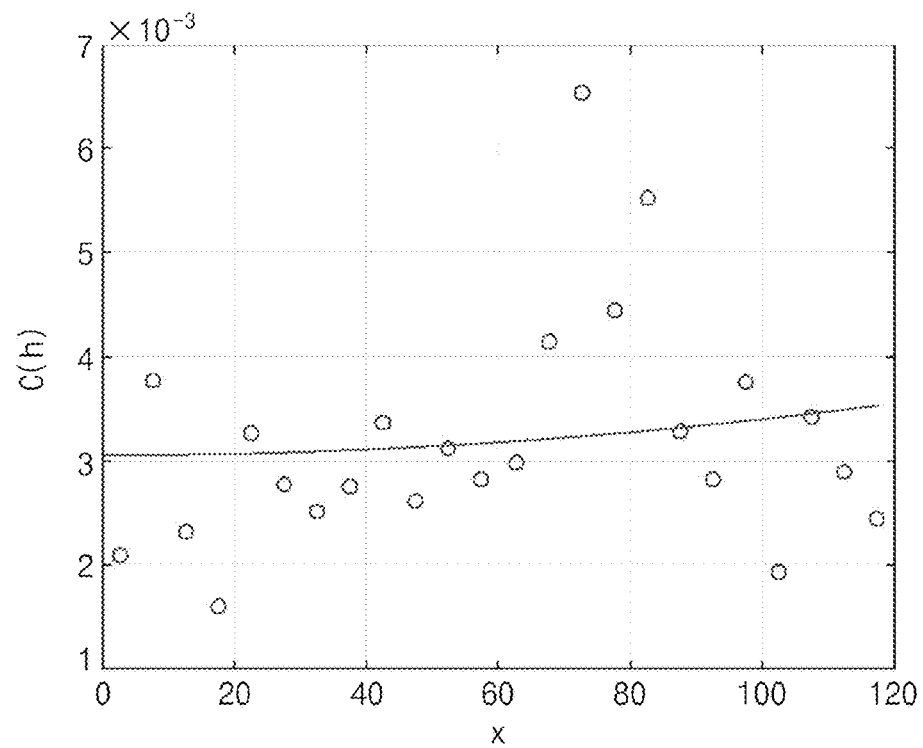
Figure 13D:
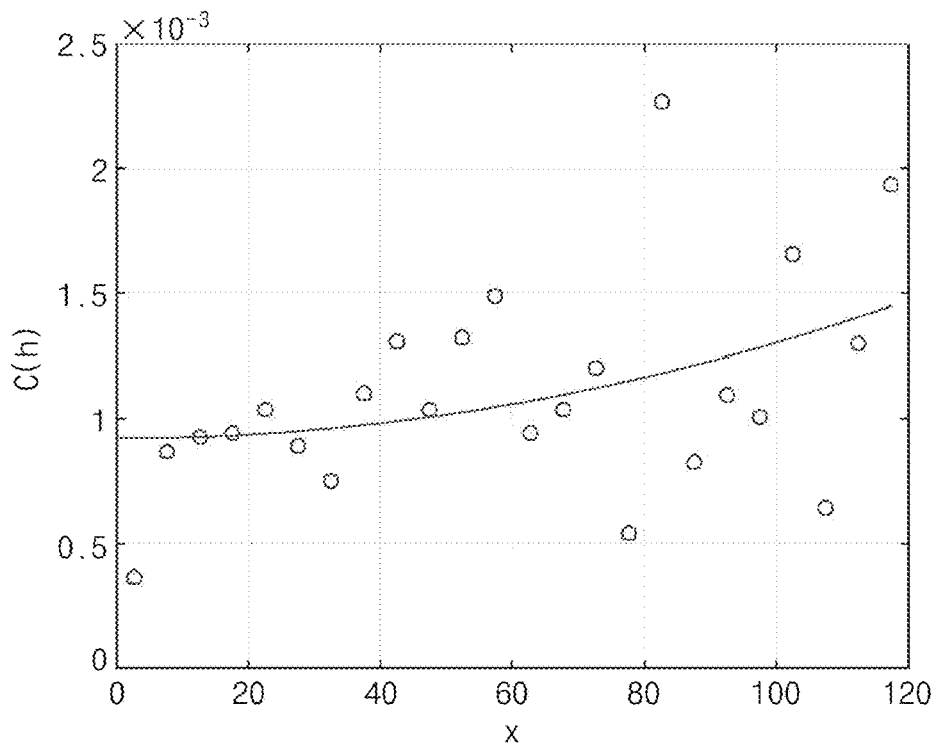
Figure 14A:
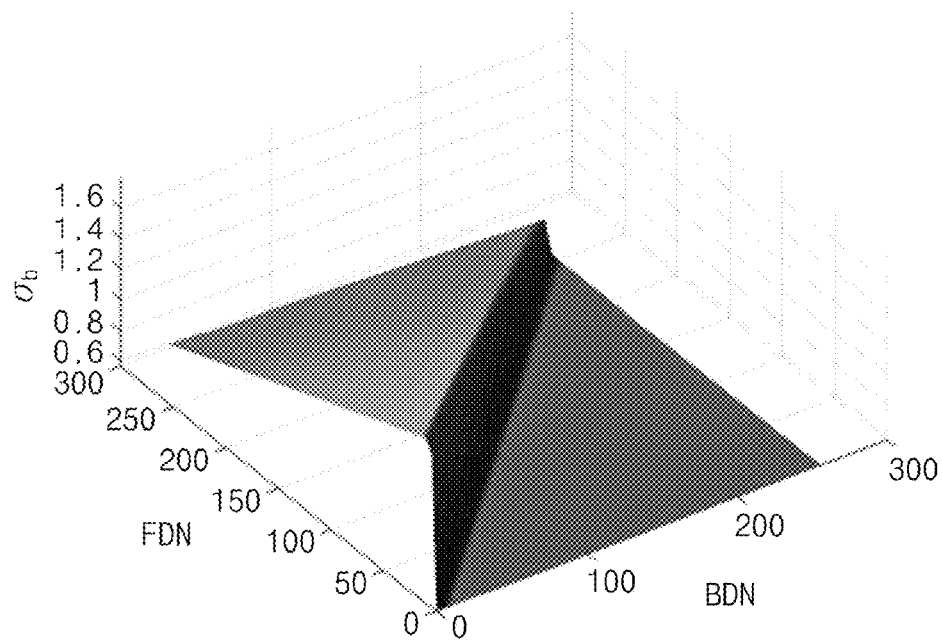
FIGS. 14A-14F illustrate planar surface characteristics generated by kriging between a background edge blur parameter and a foreground edge blur parameter.
Figure 14B:
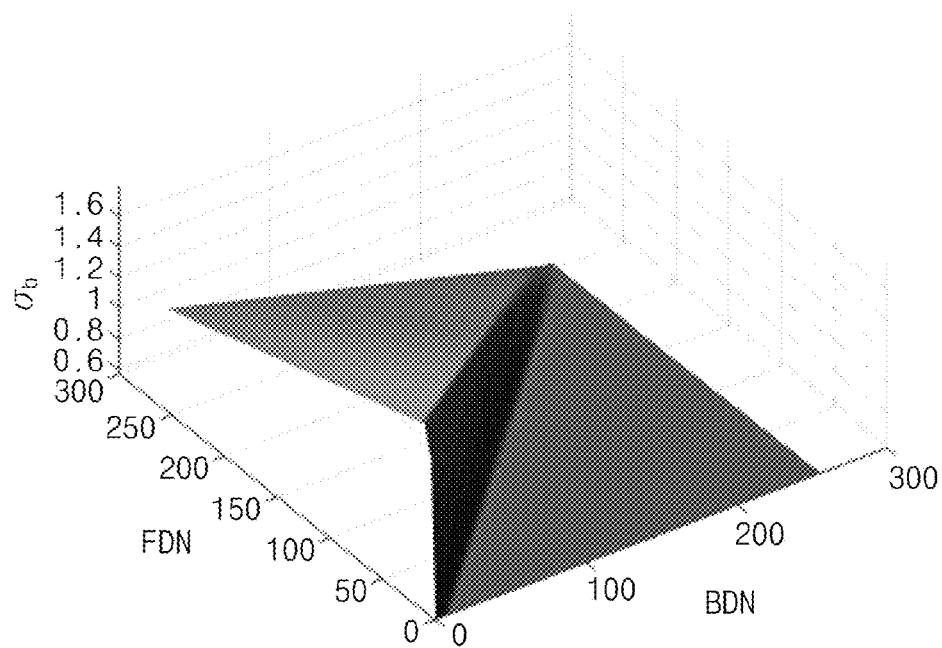
Figure 14C:
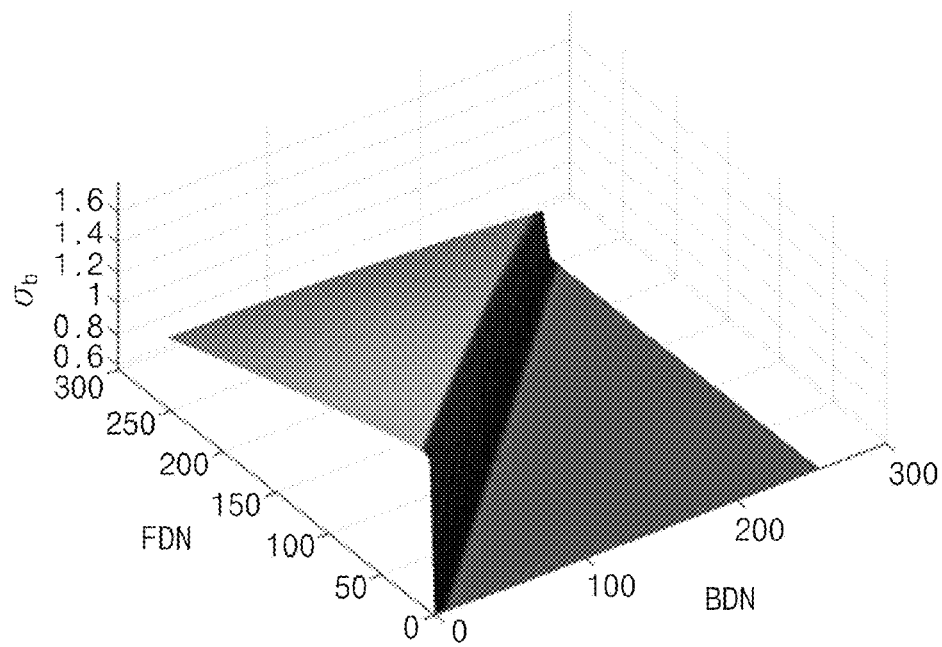
Figure 14D:
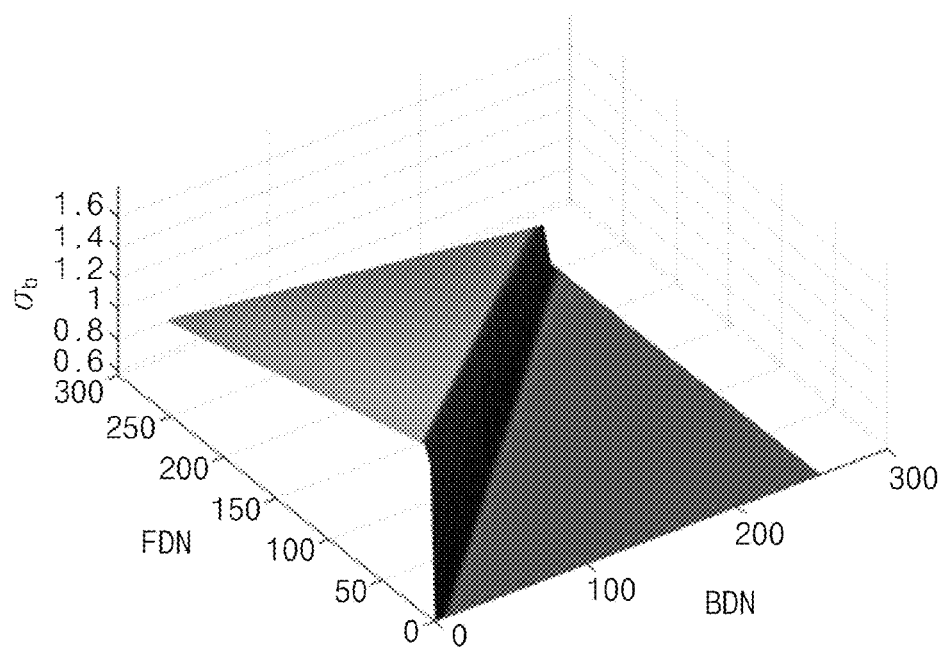
Figure 14E:
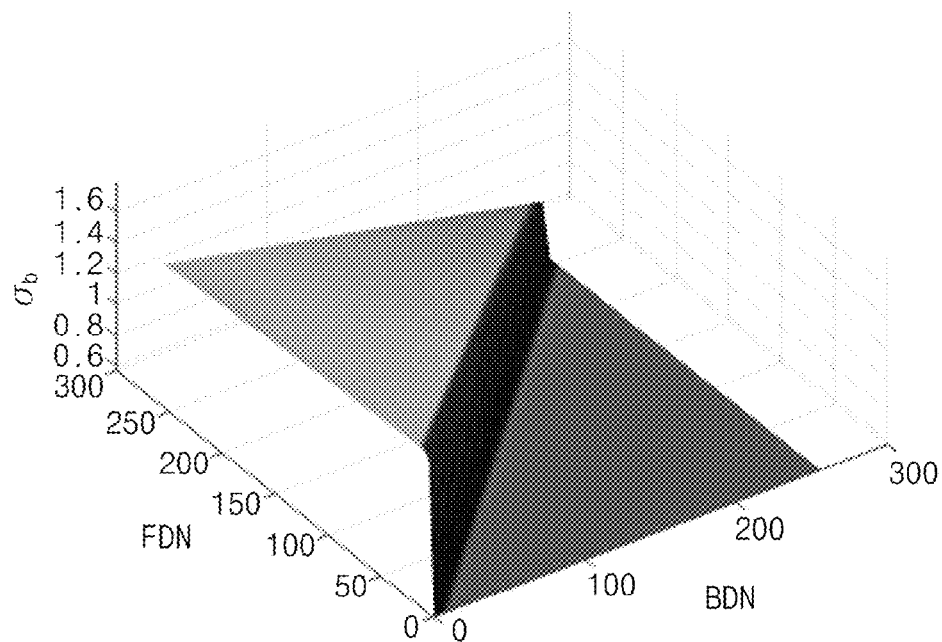
Figure 14F:
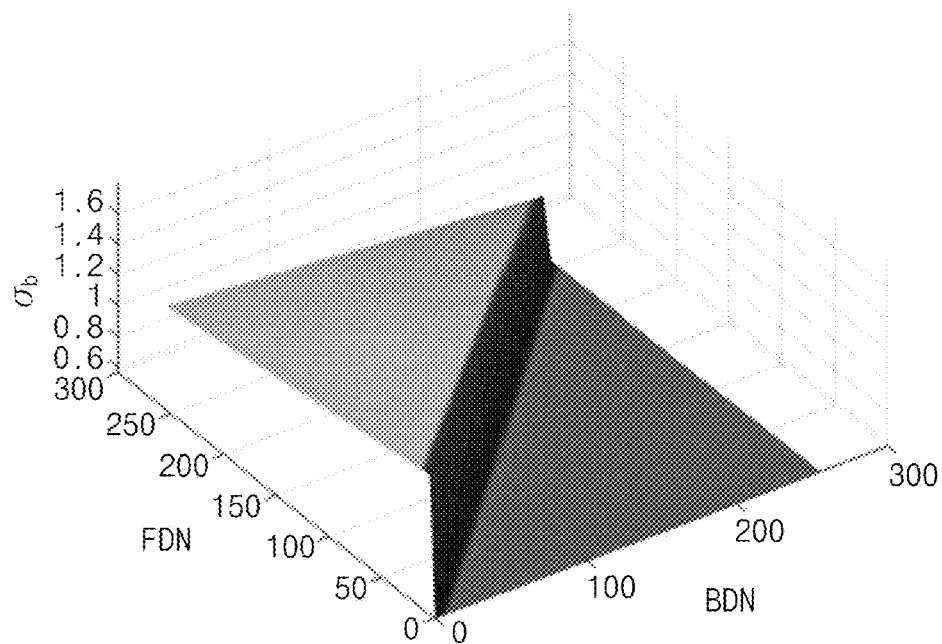
Figure 15A:
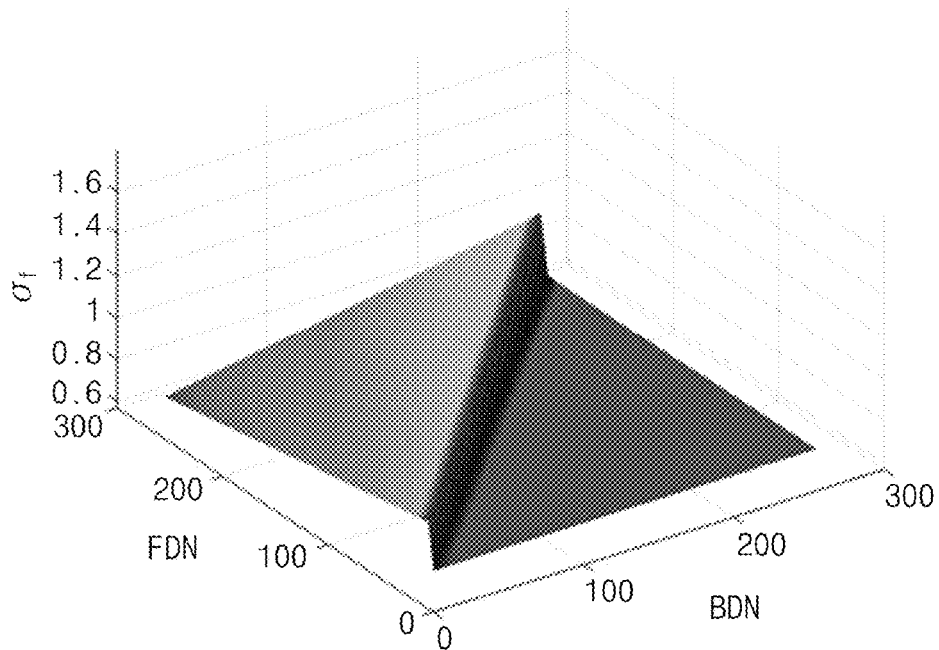
FIGS. 15A-15F illustrate planar surface characteristics generated by kriging between a background edge blur parameter and a foreground edge blur parameter.
Figure 15B:
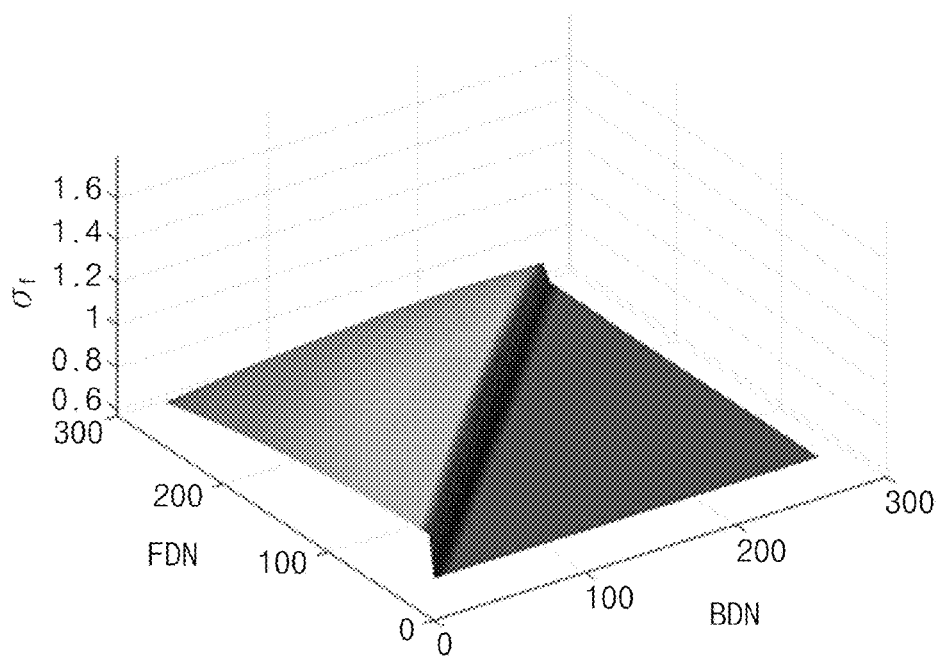
Figure 15C:
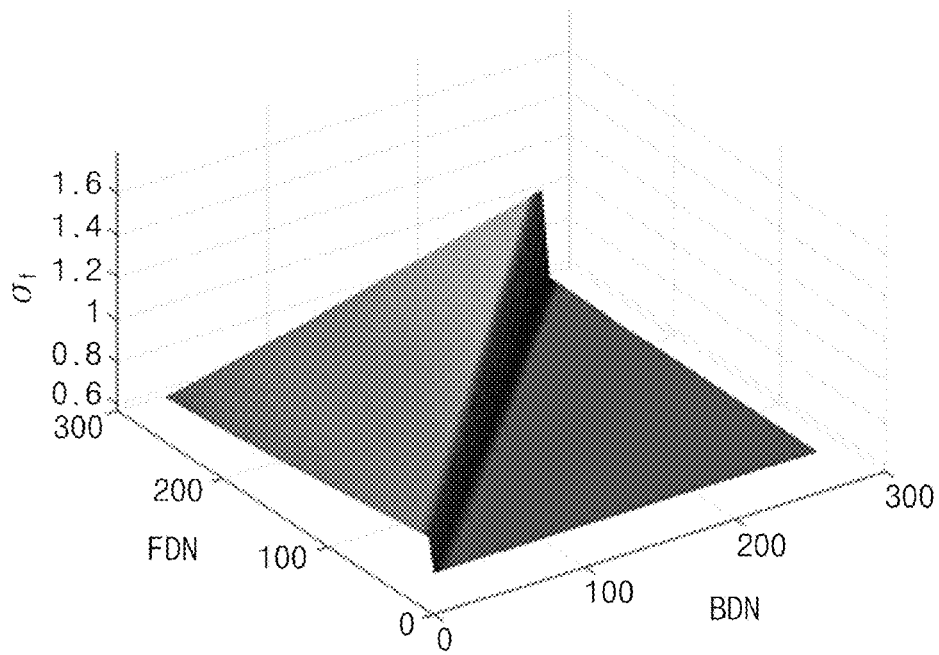
Figure 15D:
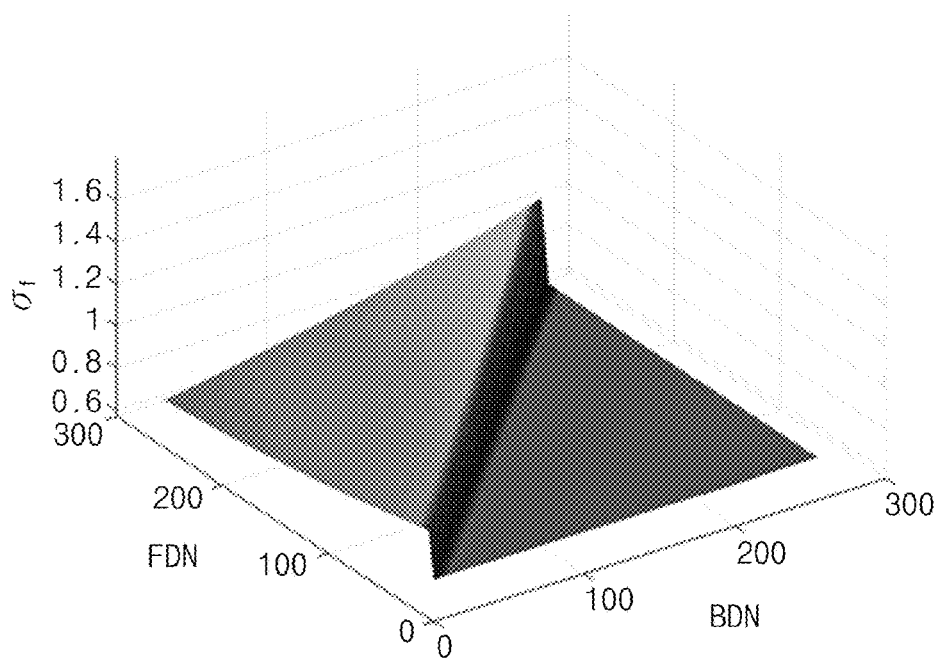
Figure 15E:
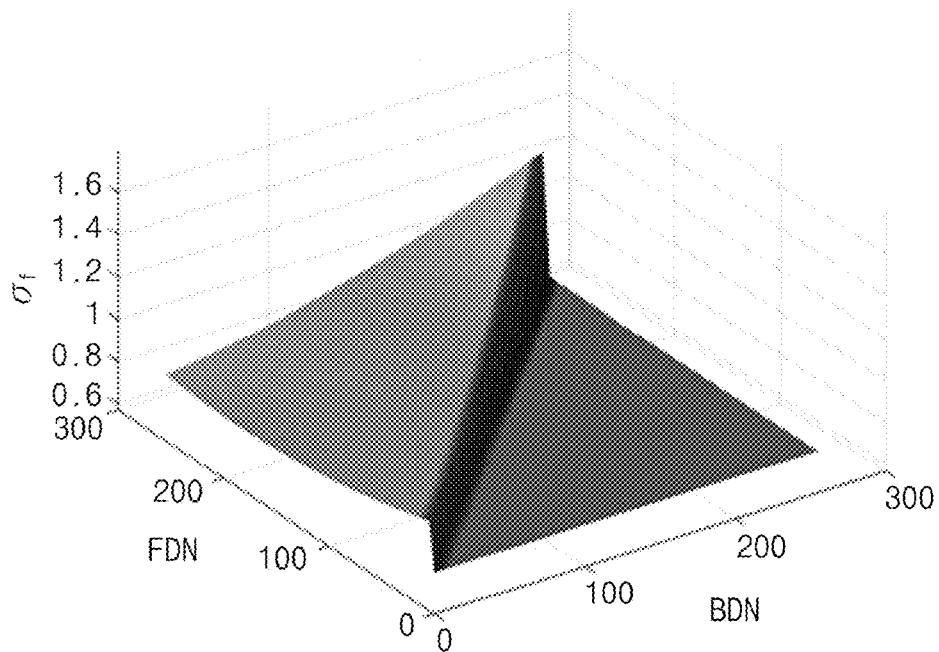
Figure 15F:
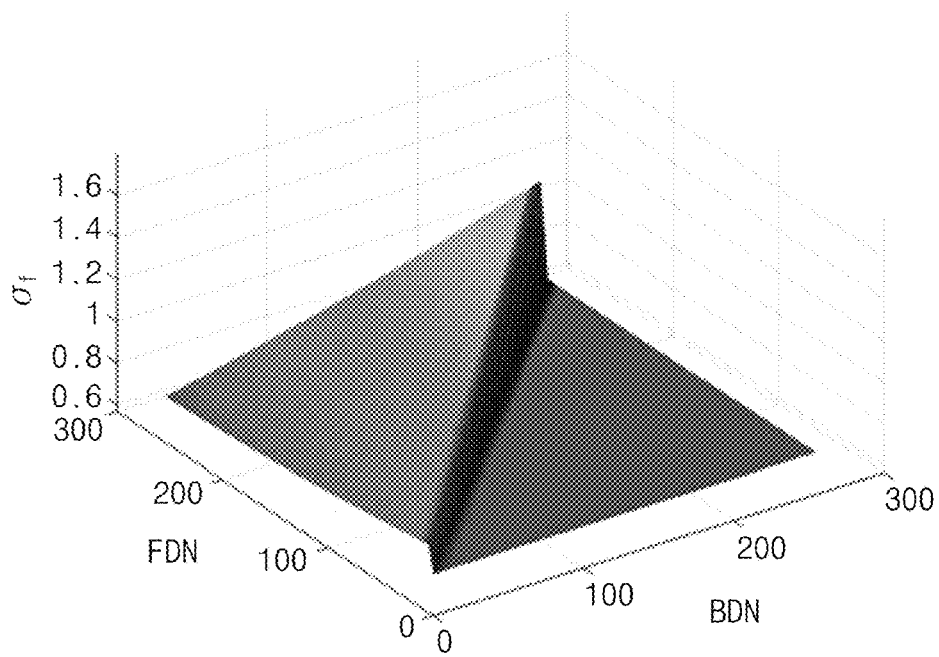
Figure 16A:
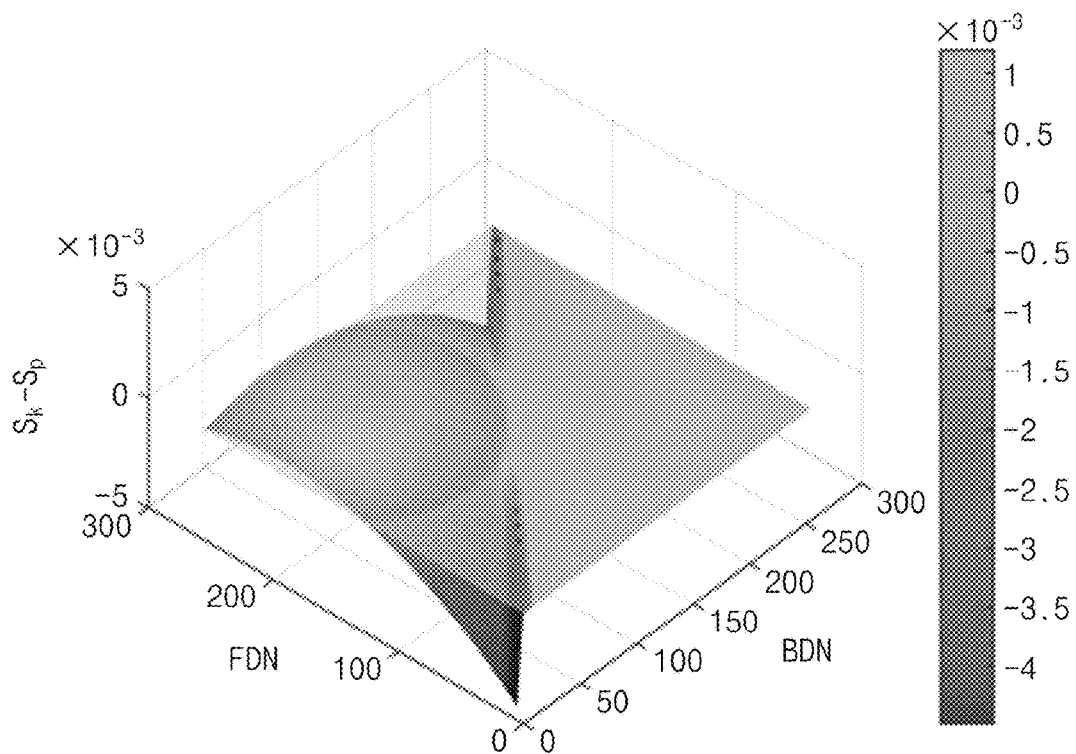
FIGS. 16A-16F illustrate edge blur surface characteristics generated by the kriging and a planar surface difference between the background edge blur parameter and the foreground edge blur parameter.
Figure 16B:
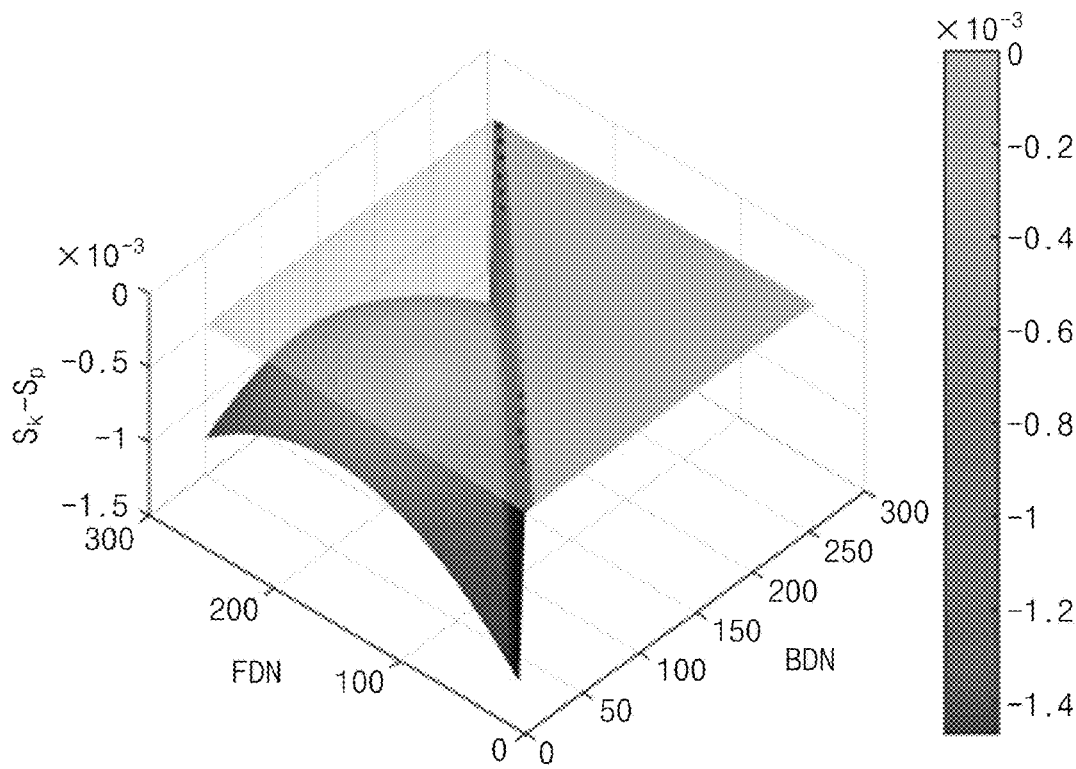
Figure 16C:
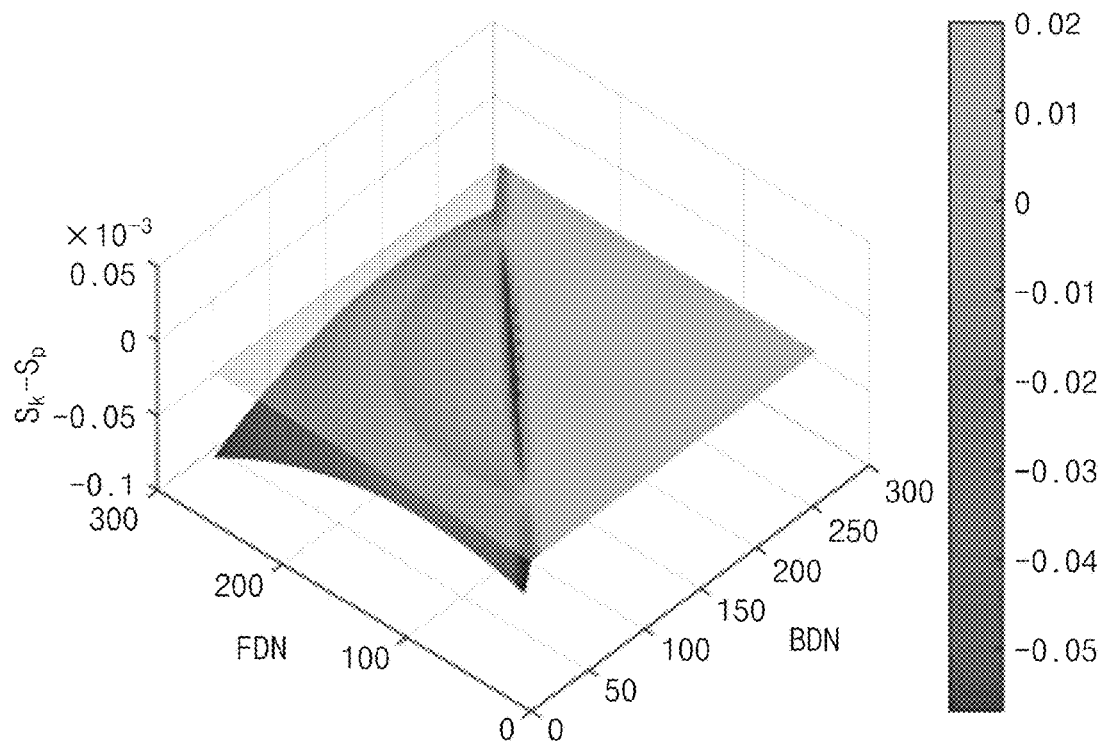
Figure 16D:
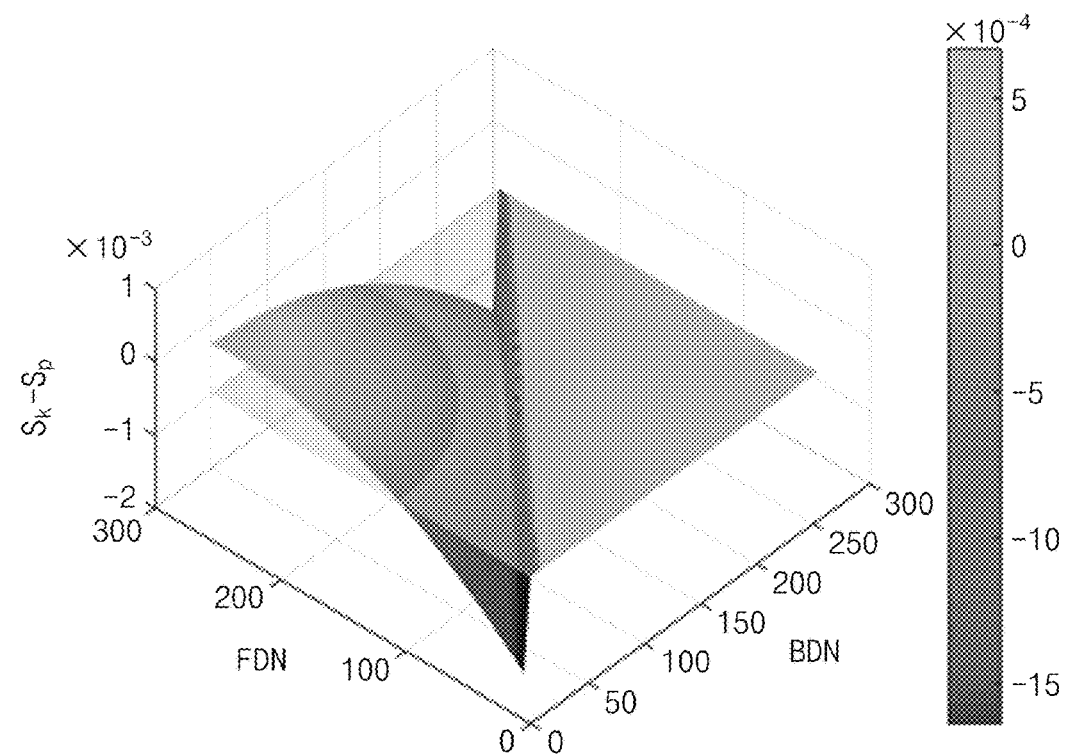
Figure 16E:
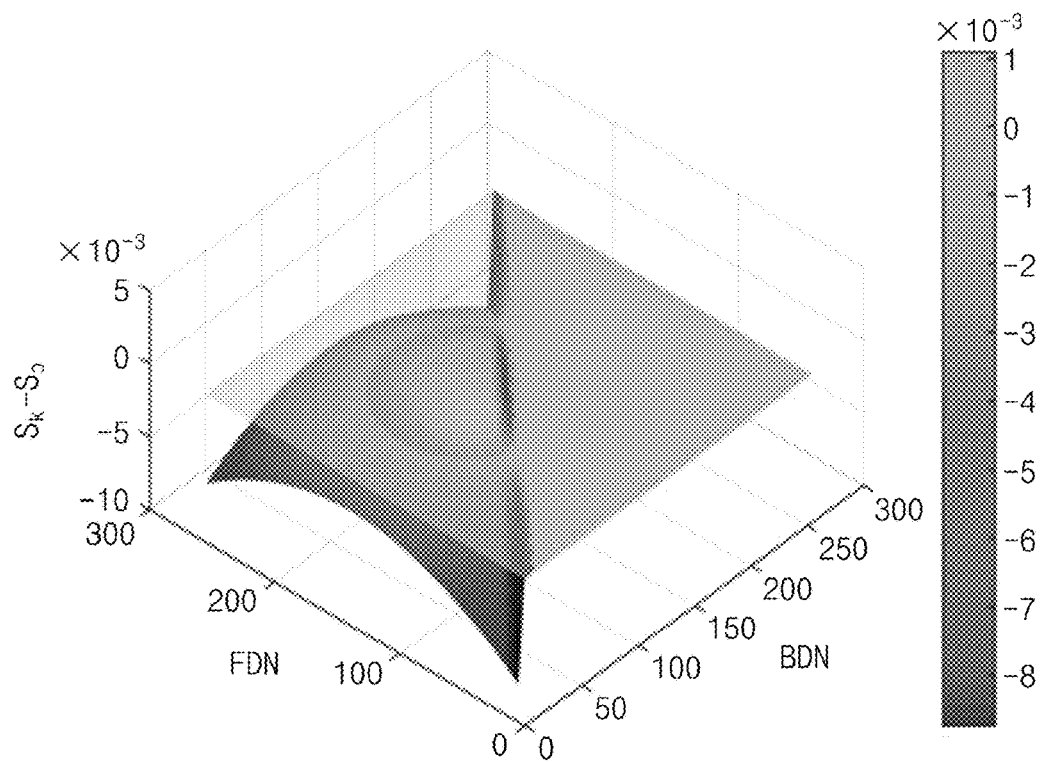
Figure 16F:
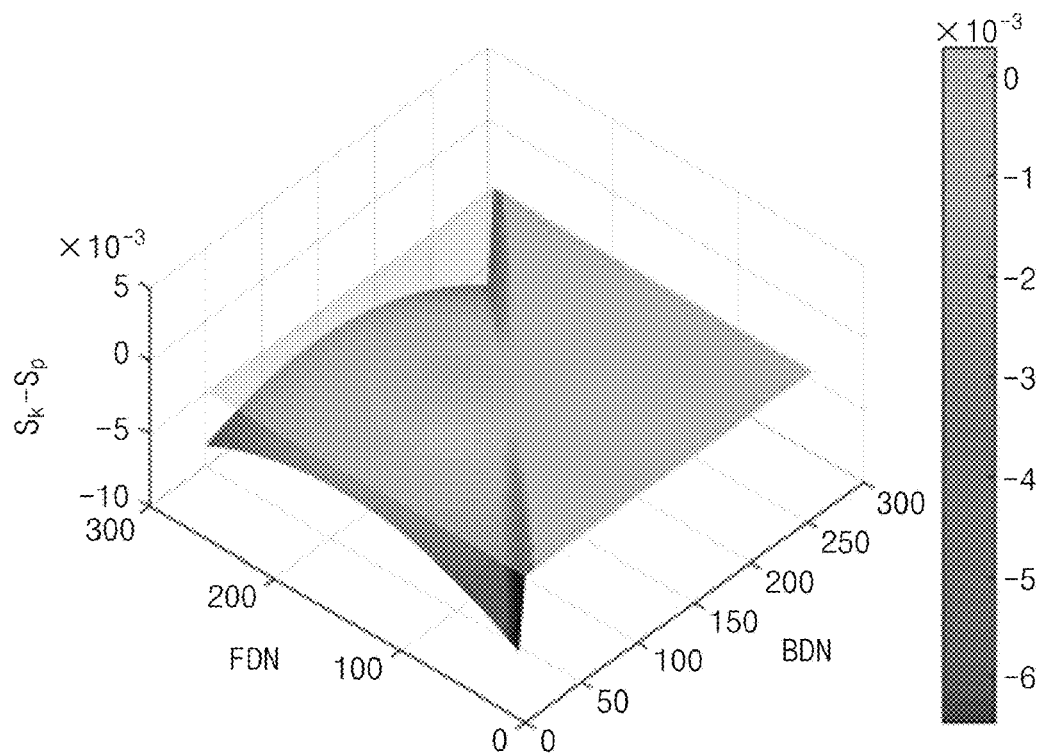
Figure 17A:
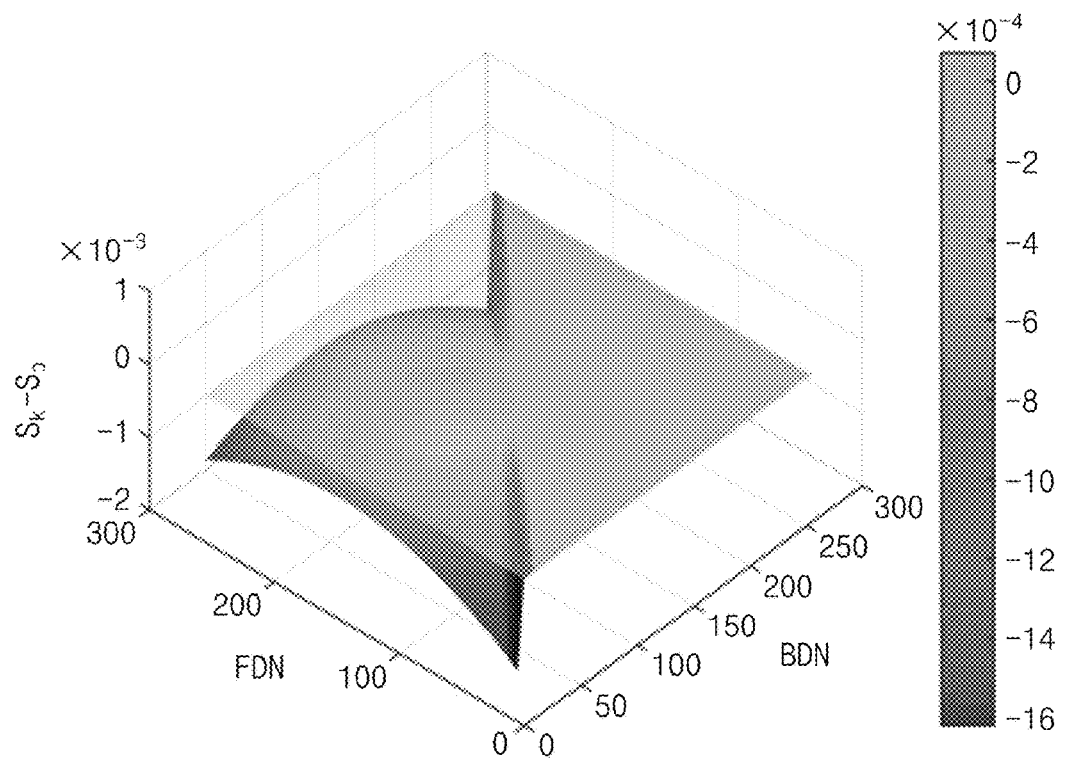
FIGS. 17A-17F illustrate edge blur surface characteristics generated by the kriging and a planar surface difference between the background edge blur parameter and the foreground edge blur parameter.
Figure 17B:
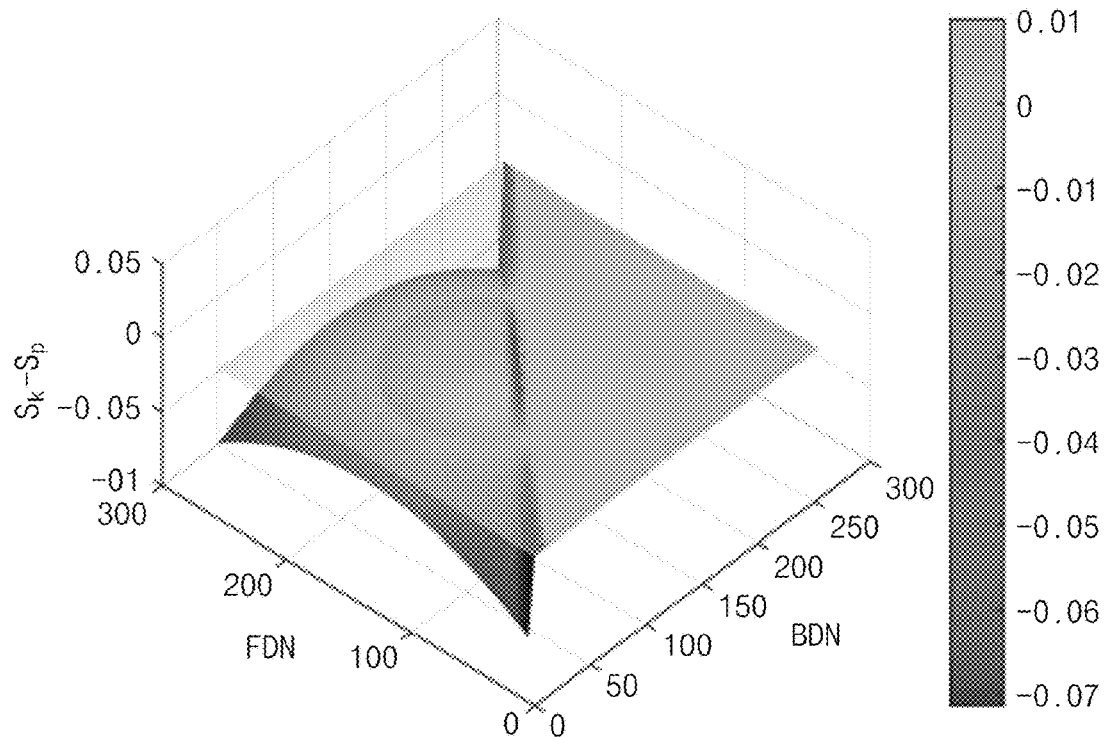
Figure 17C:
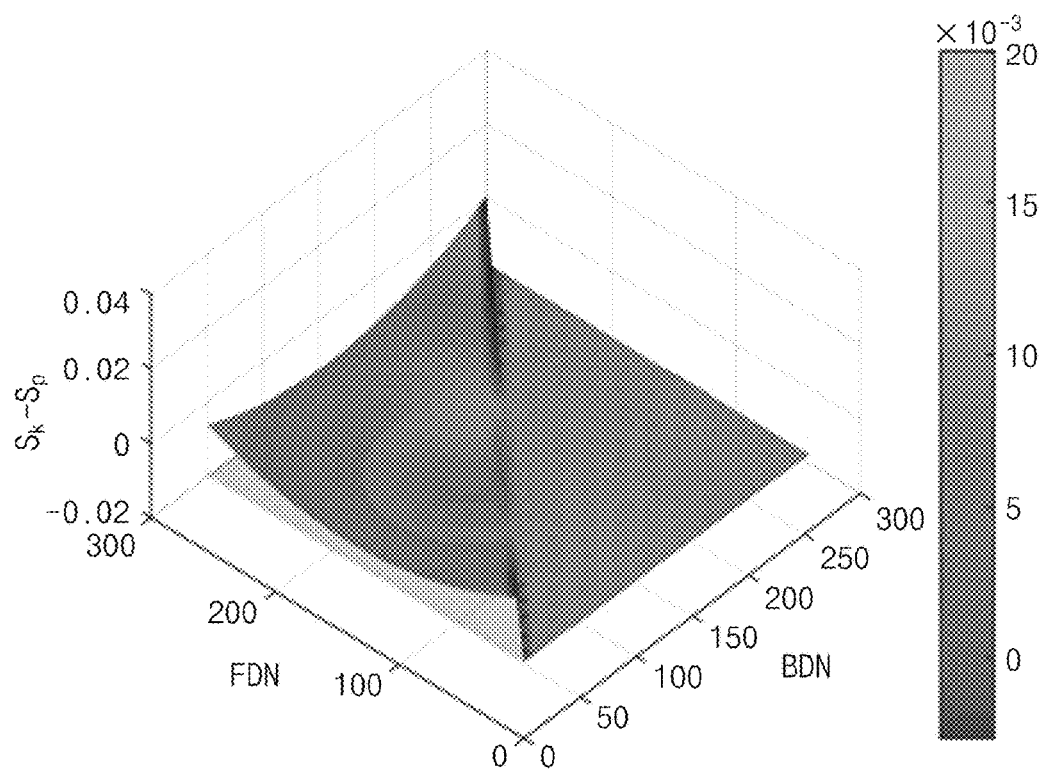
Figure 17D:
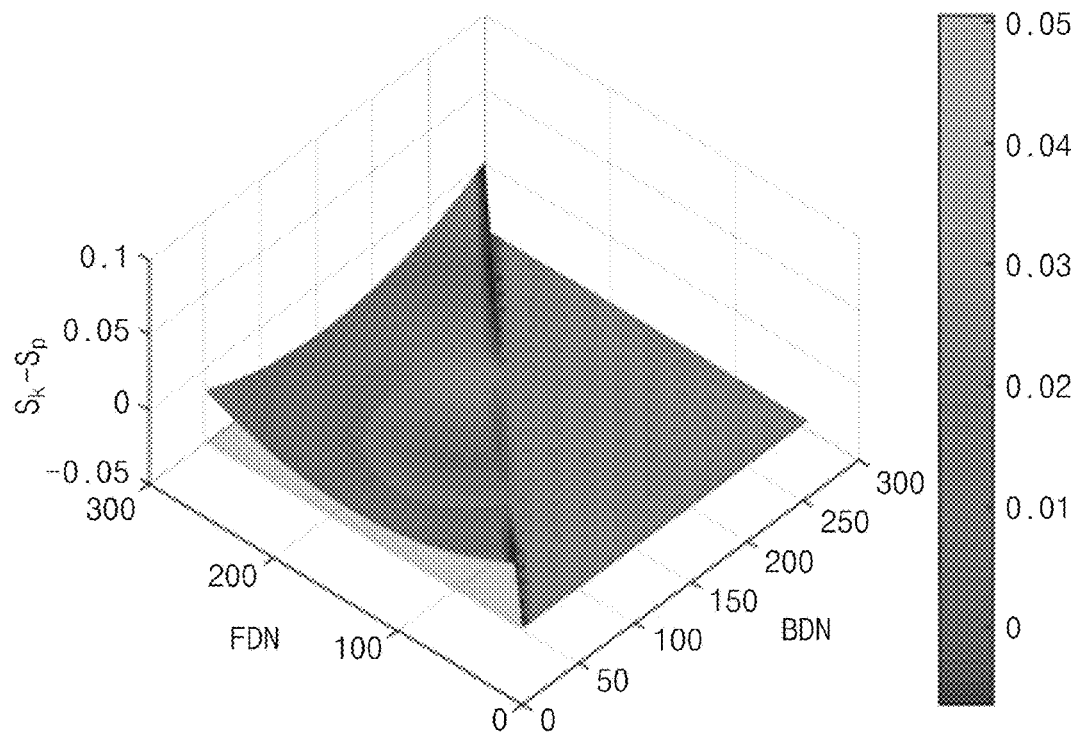
Figure 17E:
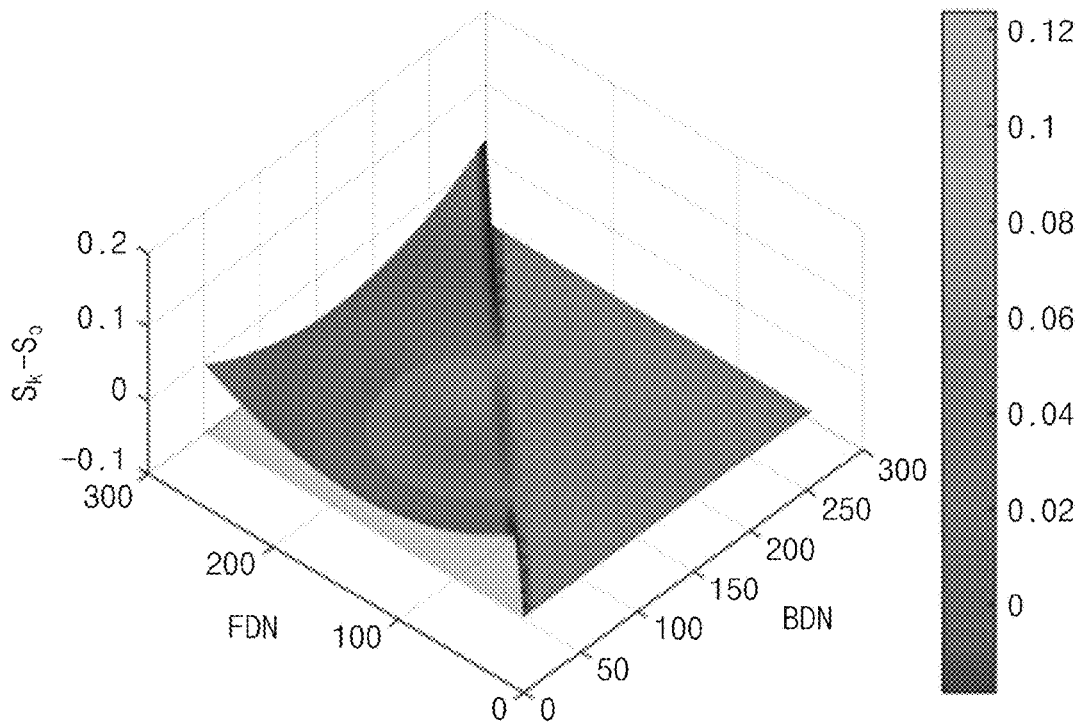
Figure 17F:
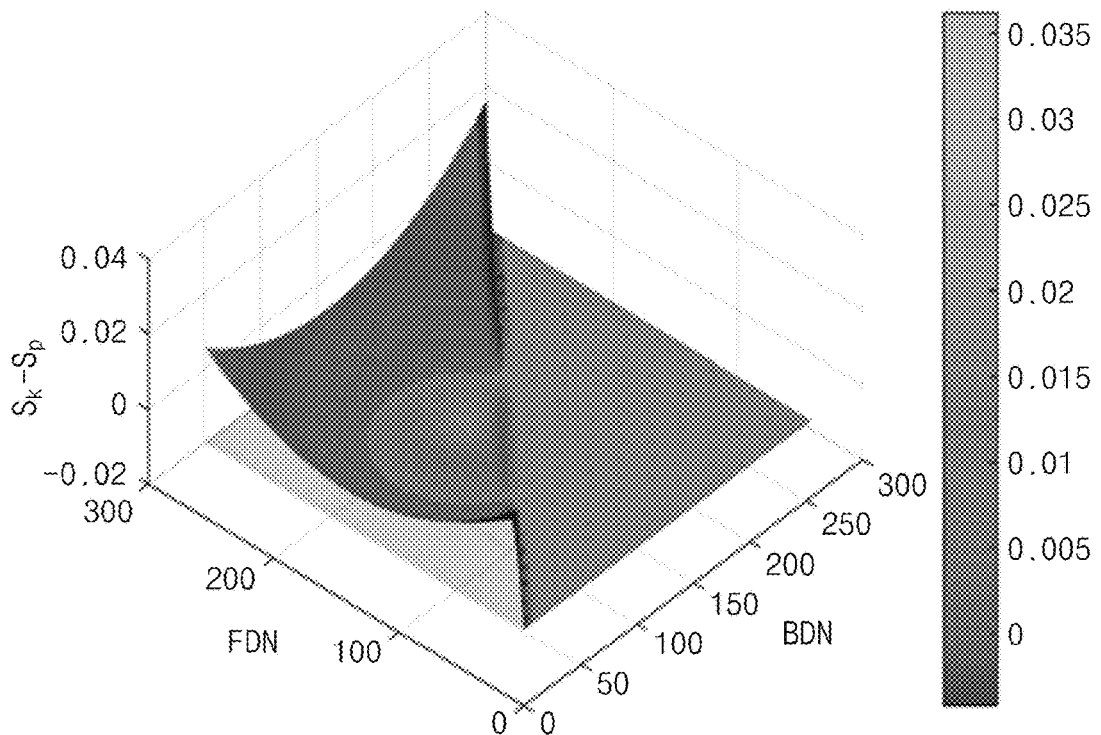
Figure 18A:
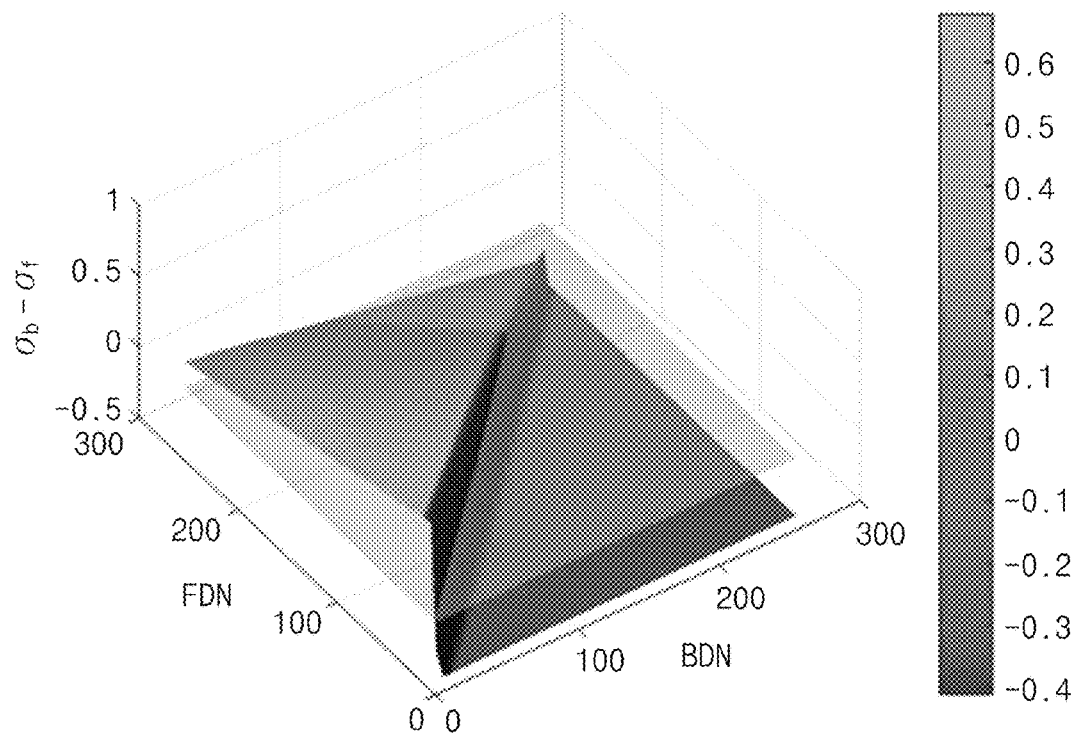
FIGS. 18A-18F illustrate surface characteristics generated by the difference between a background edge blur parameter surface and a foreground edge blur parameter surface.
Figure 18B:
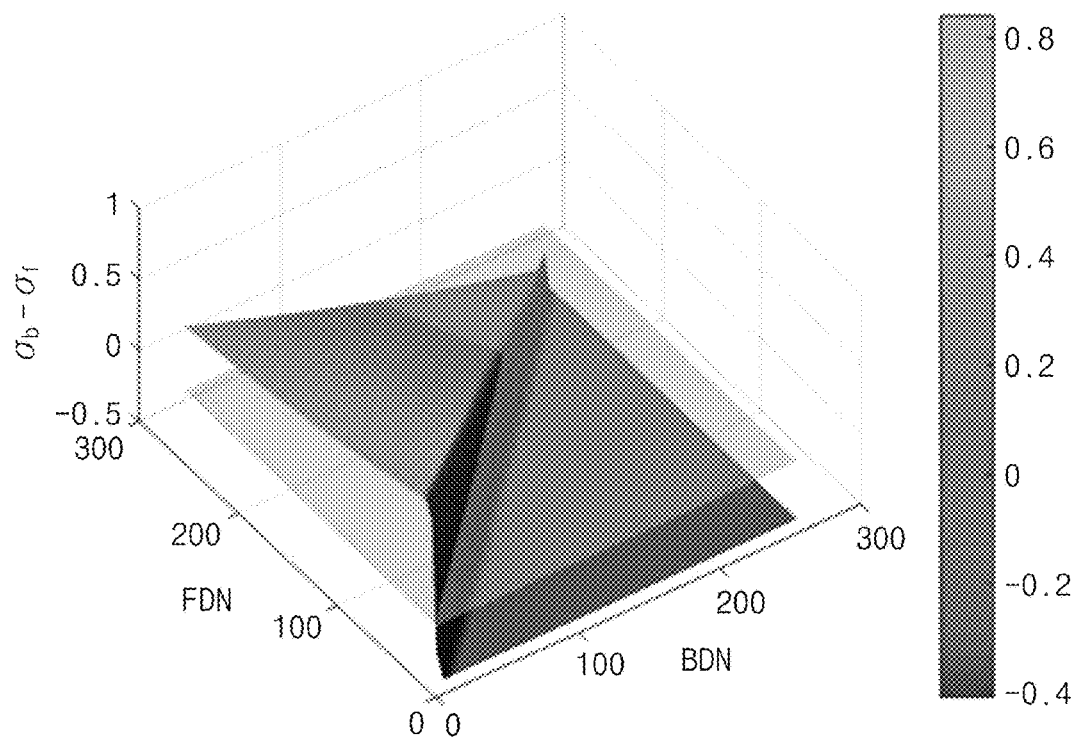
Figure 18C:
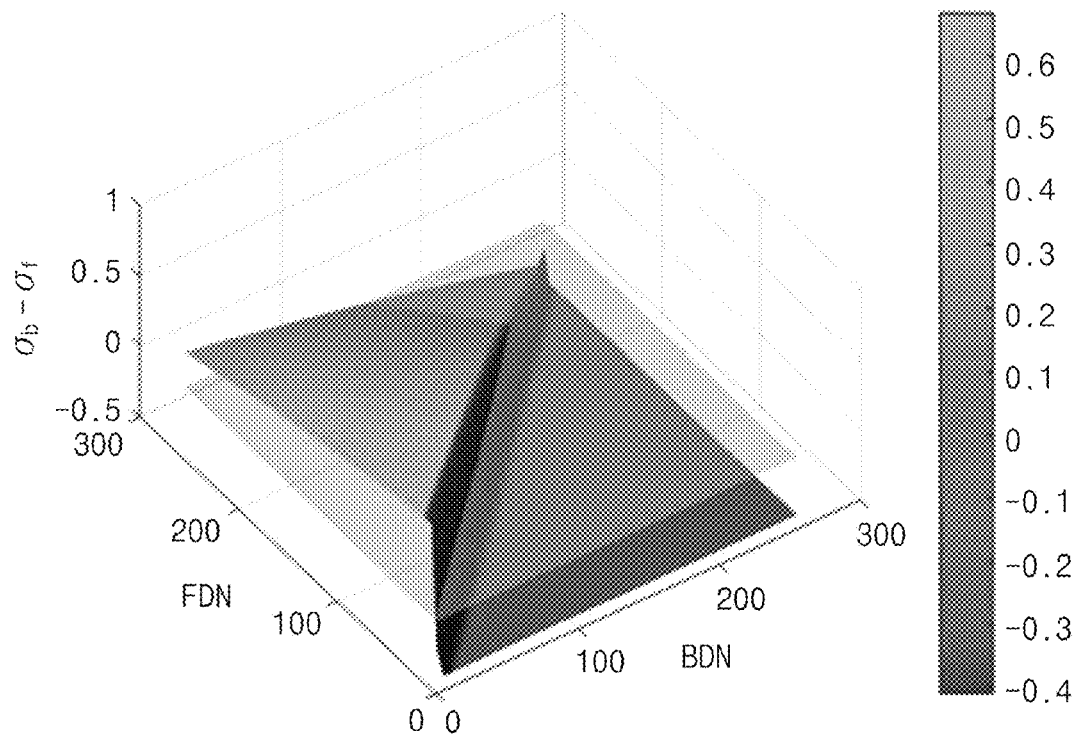
Figure 18D:
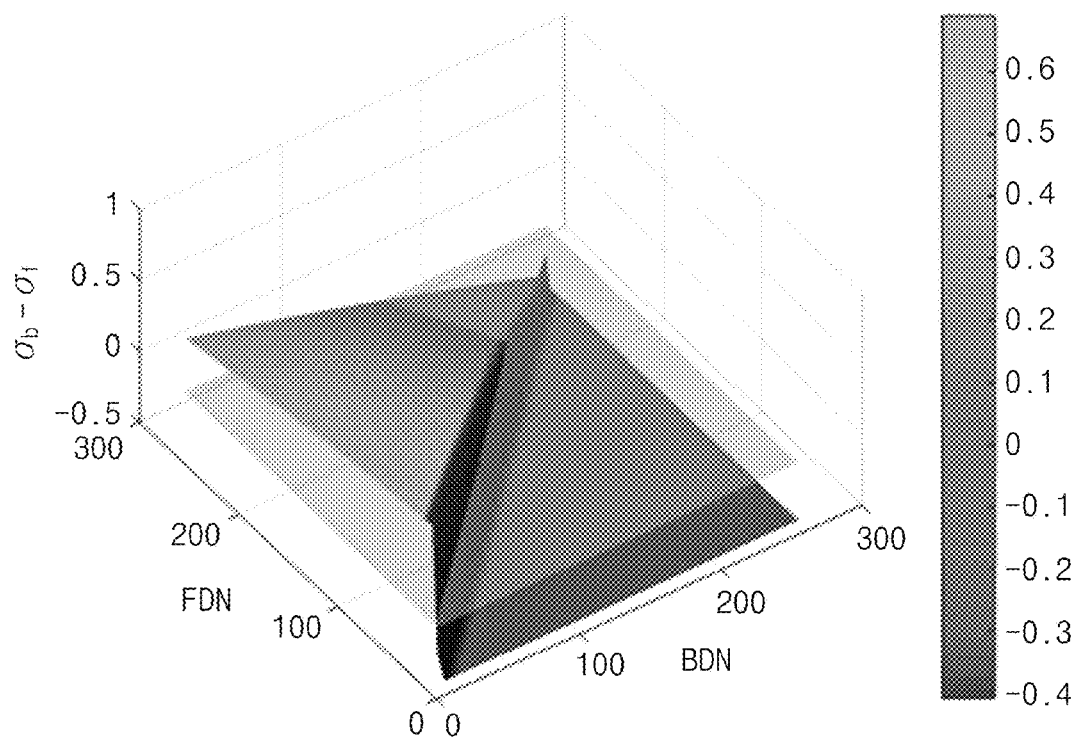
Figure 18E:
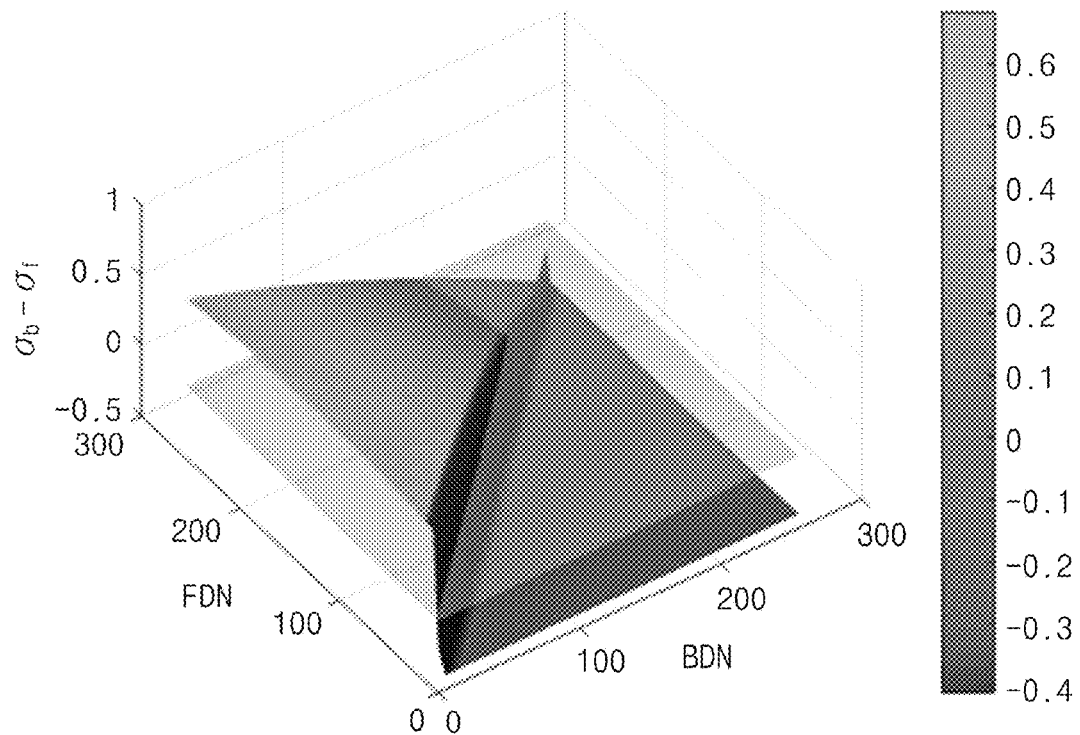
Figure 18F:
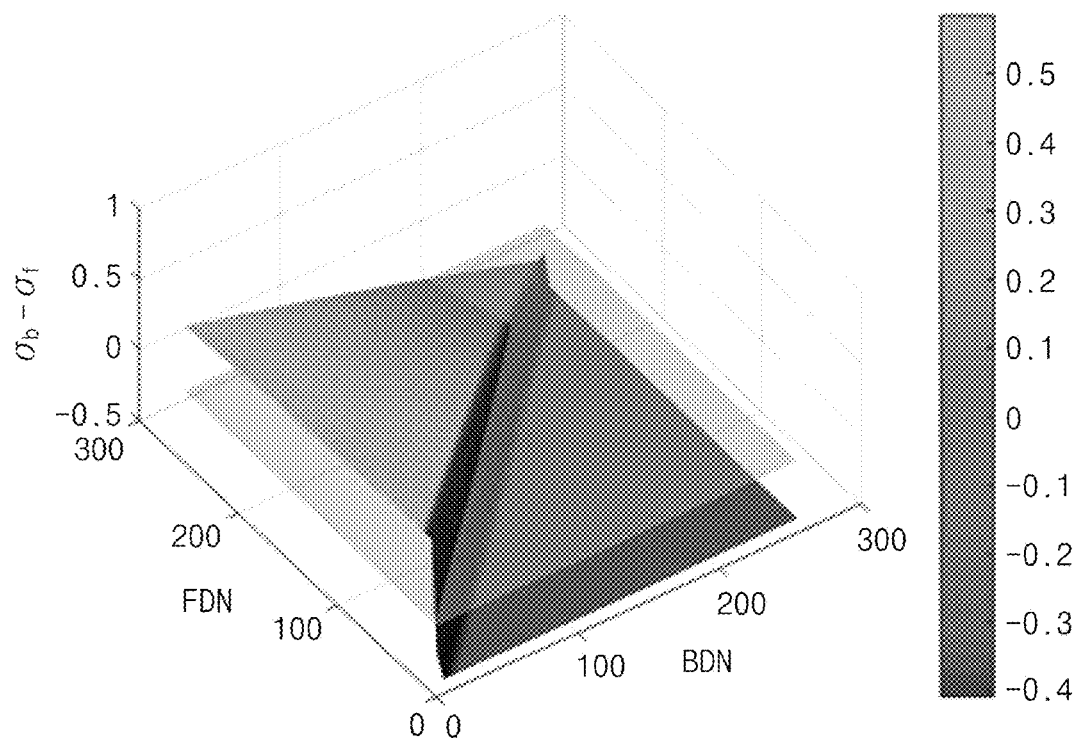

In FIG. 10, (a) shows an edge profile collection result for the crop images in which the foreground brightness of about "0.0", the background brightness is about "1.0", and the COD is about 4 m, and (b) shows corrections for the collection results of (a). In other words, FIG. 10(a) shows that the center EC of the edge with respect to position x is deviated from position "0" in the lateral direction. This is removed by calculating a displacement of each profile using an edge position determination algorithm based on the symmetric areas of the edge profile. As a result, as shown in FIG. 10(b), an edge profile result can be acquired in which the center EC of the edge is corrected to "0". Here, a process for generating the edge profile as shown in FIG. 10 is described in detail in Korean Patent Application No. 10-2016-0021722, which was previously applied by the present inventor, and the edge position determination algorithm based on the area symmetry is described in detail in Korean Patent Application No. 10-2016-0077856, which was previously applied by the present inventor. Therefore descriptions thereabout will be omitted.

Figure 7:
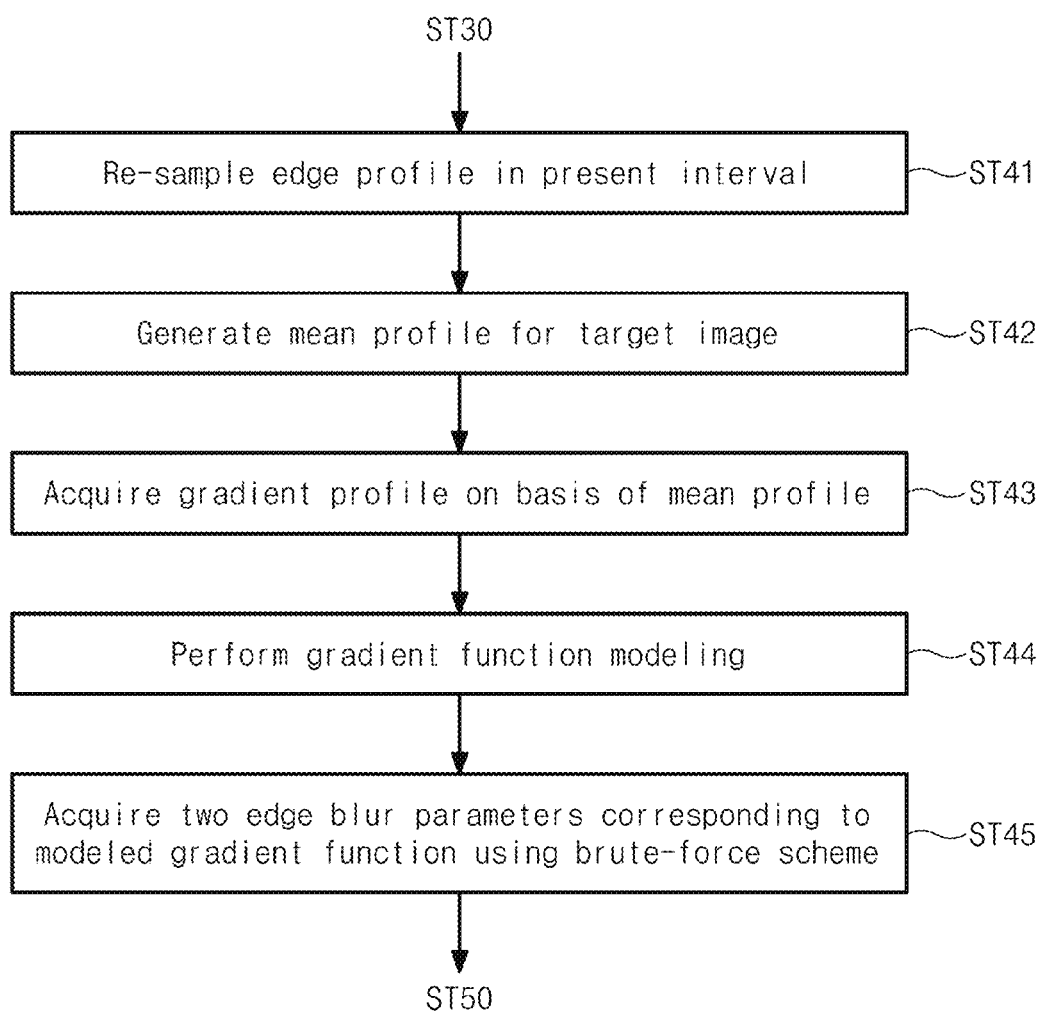
FIG. 7 is a flowchart for describing a method for setting an edge blur for edge modeling according to the present invention.

In addition, the edge blur setting device 300 estimates the edge blur parameters on the basis of the edge profiles collected from each crop image for each COD, and a process for estimating the edge blur parameters will be described with reference to the flowchart illustrated in FIG. 7.

First, the edge blur setting device 300 re-samples the collected edge profiles in a preset interval (step ST41). At this point, the edge profile can be the corrected edge profile as shown in FIG. 10(b), and the re-sampling interval can be about "0.1" pixel.

Then, the edge blur setting device 300 calculates the mean of all the edge profiles for a preset re-sampling interval. In other words, the edge blur setting device 300 generates a mean profile for all the target images for each COD (step ST42).

Then, the gradient profile is acquired which is calculated as central values for consecutive periods using difference values of the consecutive mean profiles (step ST43). FIG. 11 illustrates an example of the gradient profile acquired using such a scheme.

In addition, the edge blur setting device 300 models a gradient value S at an arbitrary position x as the following Equation (5).

$$s = f(\sigma_b, \sigma_f, x) + e = \left( -\frac{h_b}{\sigma_b\sqrt{2\pi}} e^{-\frac{x^2}{2\sigma_b^2}} + \frac{h_f}{\sigma_f\sqrt{2\pi}} e^{-\frac{x^2}{2\sigma_f^2}} \right) + e \quad (5)$$

where e denotes a random error. At this point, the foreground brightness $h_f$ and the background brightness $h_b$ are set as mean pixel brightness values for the grid pattern of the target sheet shown in FIG. 4. In other words, the gradient value S corresponding to all x positions is used so as to estimate the background edge blur parameter $\sigma_b$ and the foreground edge blur parameter $\sigma_f$.

In addition, the edge blur setting device 300 sets a combination of two blur parameters having values of about "0.2" to about "2.0" with an interval of about "0.01" through a brute-force method and selects a pair of values that make the least square error sum from Equation (5), and then obtains the background edge blur parameter $\sigma_b$ and the foreground edge blur parameter $\sigma_f$ according to the brightness contrast (step ST45). FIG. 11 illustrates edge blur parameter curves estimated by the brute-force method. In addition, the following Table 2 shows estimation parameters corresponding to image feature, in other words, shows the estimation parameters ($\sigma_b$, $\sigma_f$) of each image feature when the separation distance with the target sheets 100, namely, the COD is about 1 m. At this point, the image feature values include the COD, the background brightness (BI), the foreground brightness (FI), the background DN (BDN), and the foreground DN (FDN) as shown in Table 2. Here, the BI and FI are brightness values corresponding to the grid patterns of the target sheets, and the BDN and the FDB are the pixel values corresponding to the target images acquired through the camera 200.

TABLE 2

| | Input image characteristics | | | | | Blur parameter estimates | |
|---|---|---|---|---|---|---|---|
| FIG. | COD | BI | FI | BDN | FDN | $\sigma_b$ | $\sigma_f$ |
| FIG. 8(a) | 1 m | 0.0 | 0.2 | 44.8 | 62.7 | 1.35 | 1.01 |
| FIG. 8(b) | 1 m | 0.3 | 0.5 | 67.2 | 116.5 | 1.33 | 0.99 |
| FIG. 8(c) | 1 m | 0.6 | 0.8 | 154.0 | 178.4 | 1.10 | 1.04 |

TABLE 2-continued

| | Input image characteristics | | | | | Blur parameter estimates | |
|---|---|---|---|---|---|---|---|
| FIG. | COD | BI | FI | BDN | FDN | $\sigma_b$ | $\sigma_f$ |
| FIG. 8(d) | 1 m | 0.0 | 1.0 | 46.3 | 202.4 | 0.98 | 0.92 |
| FIG. 8(e) | 1 m | 0.8 | 1.0 | 180.3 | 204.7 | 1.00 | 0.98 |
| FIG. 8(f) | 1 m | 0.3 | 0.7 | 66.1 | 161.8 | 1.32 | 0.92 |

On the other hand, FIG. 12 illustrates the distribution characteristics of the edge blur parameters estimated for the background DN and the foreground DN. In FIG. 12, small circles represent the background edge blur parameter $\sigma_b$ and the foreground edge blur parameter $\sigma_f$, and black lines are connection lines of the two edge blur parameters corresponding to the background DN and the foreground DN. In addition, in FIG. 12, (a) to (f) illustrate the distribution characteristics of the edge blur parameters for the target images acquired in states in which the COD are sequentially 1 m, 2 m, 3 m, 4 m, 5 m, and 6 m.

According to FIG. 12, it can be understood that, in most cases, the value of the background edge blur parameter $\sigma_b$ is larger than the value of the foreground edge blur parameter $\sigma_f$.

On the other hand, in step ST50 of FIG. 6, the edge blur setting device 300 generates edge blur prediction information corresponding to the brightness value in a constant interval on the basis of two edge blur parameters estimated in step ST40 (step ST50).

Figure 8:
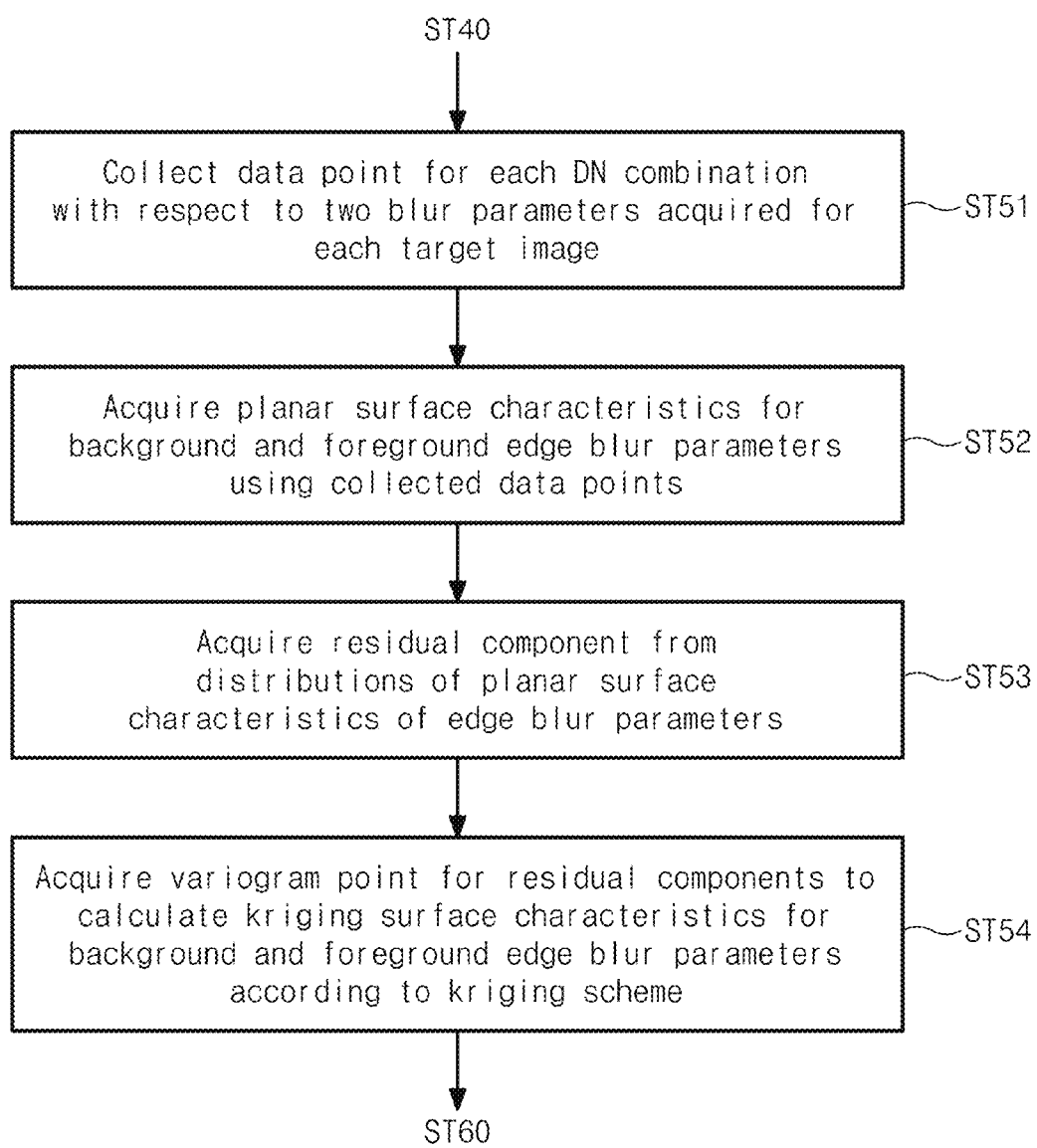
FIG. 8 is a flowchart for describing a method for setting an edge blur for edge modeling according to the present invention.

A process for generating the edge blur prediction information will be described with reference to the flowchart in FIG. 8.

First, the edge blur setting device 300 collects data points for each DN combination for the two edge blur parameters acquired for the target images for each COD (step ST51).

Then, the edge blur setting device (300) acquires planar surface characteristics for the background and foreground edge blur parameters using the collected data points (step ST52), and acquires residual components from the distribution of the planar surface characteristics of the edge blur parameters (step ST53).

First, an edge blur Z is modeled as the following Equation (6).

$$Z = aX + bY + c + e \quad (6)$$

where X denotes the background DN, Y denotes the foreground DN, Z denotes the edge blur, a, b, and c denote planar parameters to be estimated, and e denotes a random error estimated to be present in the edge blur parameters.

When n edge blurs are given, the plane is modeled as the following Equation (7).

$$\begin{bmatrix} Z_1 \\ Z_2 \\ \vdots \\ Z_n \end{bmatrix} = \begin{bmatrix} X_1 & Y_1 & 1 \\ X_2 & Y_2 & 1 \\ \vdots & \vdots & \vdots \\ X_n & Y_n & 1 \end{bmatrix} \begin{bmatrix} a \\ b \\ c \end{bmatrix} + \begin{bmatrix} e_{Z_1} \\ e_{Z_2} \\ \vdots \\ e_{Z_n} \end{bmatrix} \quad (7)$$

The above Equation (7) can be represented in a vector matrix type, and is the same as Equation (8).

$$y = A\xi + e \tag{8}$$

where $$y = \begin{bmatrix} Z_1 \\ Z_2 \\ \vdots \\ Z_n \end{bmatrix}$$

$$A = \begin{bmatrix} X_1 & Y_1 & 1 \\ X_2 & Y_2 & 1 \\ \vdots & \vdots & \vdots \\ X_n & Y_n & 1 \end{bmatrix}$$

$$\xi = \begin{bmatrix} a \\ b \\ c \end{bmatrix}$$

$$e = \begin{bmatrix} e_{Z_1} \\ e_{Z_2} \\ \vdots \\ e_{Z_n} \end{bmatrix} \quad e \sim N(0, \sigma_0^2 I)$$

where a parameter vector is estimated according to Equation (9).

$$\xi = (A^T A)^{-1} A^T y \tag{9}$$

In addition, the residual vector (R) is calculated according to Equation (10).

$$R = y - A\xi \tag{10}$$

The following Table 3 shows the planar parameters on the background edge blur (BBP, $\sigma_b$) and the planar parameters on the foreground edge blur (BBP, $\sigma_b$), and a Mean Absolute Difference (MAD) of the residuals.

TABLE 3

| COD | Plane for BBP, $\sigma_b$ | | | Plane for FBP, $\sigma_f$ | | | MAD of residuals of planar fitting | |
|---|---|---|---|---|---|---|---|---|
| (m) | a | b | c | a | b | c | $\sigma_b$ | $\sigma_f$ |
| 1 | −4.84e−4 | −2.86e−3 | 1.6775 | 1.25e−3 | −8.64e−4 | 0.9825 | 0.1106 | 0.0413 |
| 2 | −2.62e−3 | −2.29e−3 | 1.8141 | 4.64e−4 | −7.60e−4 | 1.0169 | 0.1139 | 0.0441 |
| 3 | −5.70e−4 | −2.18e−3 | 1.6269 | 1.65e−3 | −5.74e−4 | 0.9043 | 0.0763 | 0.0303 |
| 4 | −1.26e−3 | −2.06e−3 | 1.6876 | 1.51e−3 | −7.46e−4 | 0.9424 | 0.0818 | 0.0301 |
| 5 | −2.10e−3 | −4.74e−4 | 1.6194 | 1.84e−3 | −3.89e−4 | 0.8838 | 0.0500 | 0.0325 |
| 6 | −8.69e−4 | −9.79e−4 | 1.4848 | 1.81e−3 | −3.97e−4 | 0.8553 | 0.0777 | 0.0257 |

In other words, it can be understood through Table 3 that the background edge blur parameters increase, as the background DN increases and the foreground DN decreases. In addition, from the results obtained by excluding the plane of a case in which the COD is about 2 m from the background blur parameter planar coefficient values a, b and c, it can be understood that an increase in foreground edge blur parameter according to the increase in the background DN is larger than a decrease in foreground edge blur parameter according to the increase in the foreground DN. In addition, the MAD values of the residuals in Table 3 represent that the three-dimensional plane fits the blur values within about 0.12 pixel for all the CODs and the two blur parameters.

Even when the blur parameter estimation value is well fitted to the three-dimensional plane, when the blur parameters include a specific amount of nonlinearity, it may not be sufficient to model the blur estimation values. In order to address such an issue, the present applicant proposes a kriging-based plane fitting method.

According thereto, the edge blur setting device 100 fits pre-estimated edge blur parameters on a 3D plane using the kriging-based plane fitting method to acquire kriging planar characteristics (step ST55).

First, the edge blur setting device 300 acquires variogram on the residuals acquired by Equation (10). In other words, the variogram for arbitrary distance h is calculated as the following Equation 11.

$$\gamma(h) = \frac{1}{2|N(h)|} \Sigma_{(i,j) \in N(h)} (R_i - R_j)^2 \tag{11}$$

where |N(h)| denotes the number of adjacent residual pairs with the distance being within h, and $R_i$ and $R_j$ are respective residual values at an ith point and a jth point.

In the present embodiment, the variogram is set to have a magnitude unit of "5" and the maximum adjacent distance of "60", and as an experiment result thereto, FIG. 13 illustrates the variogram and the covariance function thereof in cases where the CODs are respectively 1 m and 6 m. In other words, in FIG. 13, circles are the variogram, the line is the covariance function thereof, (a) is a covariance result on the background edge blur profile $\sigma_b$ for the COD of about 1 m, (b) is a covariance result on the background edge blur profile $\sigma_b$ for the COD of about 6 m, (c) is a covariance result on the foreground edge blur profile $\sigma_f$ for the COD of about 1 m, and (d) is a covariance result on the foreground edge blur profile $\sigma_f$ for the COD of about 6 m.

At this point, a variogram point (the circle in FIG. 13) is set to an observation value for estimating the covariance function C(h) as Equation (13).

$$\gamma(h) = C(h) + e \tag{12}$$

where e is a random error.

From a visual analysis for the variogram, the covariance function is modeled with a quadratic function (Equation 13) including two parameters.

$$C(h) = a + bh^2 \tag{13}$$

where a and b denote estimation parameters. At this point, with respect to all CODs, the parameters (a and b in Equation (13)) are estimated using the least square scheme.

In addition, the edge blur I(P) for the DN, which has a constant interval in a grid configuration, can be predicted using the covariance function.

$$I(P) = k^T K^{-1} R \tag{14}$$

where P denotes an arbitrary point in a grid configuration predicted by residuals, and k, K, and R are defined as in Equation (15).

$$k = [C(\overline{PP_1})\ C(\overline{PP_2})\ ...\ C(\overline{PP_m})]^T \quad (15)$$

$$K = \begin{bmatrix} 0 & C(\overline{P_1P_2}) & ... & C(\overline{P_1P_m}) \\ C(\overline{P_1P_2}) & 0 & ... & C(\overline{P_2P_m}) \\ \vdots & \vdots & \ddots & \vdots \\ C(\overline{P_1P_m}) & C(\overline{P_2P_m}) & ... & 0 \end{bmatrix}$$

$$R = [R_1\ R_2\ ...\ R_m]^T$$

where $PP_i$ denotes the distance between point P and point $P_i$, $P_iP_j$ is the distance between point $P_i$ and point $P_j$, and $R_i$ is a residual at point $P_i$. In the present embodiment, a grid size of DN was set to "5".

The edge blur setting device 300 predicts a residual at a grid point, and then considers a trend and the predicted residual in order to calculate an edge blur. Table 4 shows MADs between kriging residuals, and it can be understood that the MADs are similar to the planar fitting result shown in Table 3. In other words, as shown in Tables 3 and 4, the distribution of edge blur parameters on the DN closes to a liner type.

TABLE 14

| COD (m) | BBP, $\sigma_b$ | FBP, $\sigma_f$ |
|---|---|---|
| 1 | 0.1102 | 0.0413 |
| 2 | 0.1140 | 0.0440 |
| 3 | 0.0769 | 0.0300 |
| 4 | 0.0817 | 0.0297 |
| 5 | 0.0500 | 0.0315 |
| 6 | 0.0777 | 0.0249 |

FIGS. 14 and 15 respectively illustrate surface characteristics generated by the kriging subject to the background edge blur parameter and the foreground blur parameter. In FIG. 14, (a) to (f) are surface characterization results for the background blur parameter, when the CODs are sequentially 1 m, 2 m, 3 m, 4 m, 5 m, and 6 m, and in FIG. 15, (a) to (f) are surface characterization results for the foreground blur parameter, when the CODs are sequentially 1 m, 2 m, 3 m, 4 m, 5 m, and 6 m.

In FIG. 14, it can be understood that the background edge blur parameter decreases, as the background DN or the foreground DN increases, as predicted in Table 3. In addition, it can be understood that a ratio of the background edge blur parameter to the foreground DN decreases, as the COD increases.

When comparing the background edge blur parameter distributions illustrated in FIG. 14, it can be checked, from the foreground edge blur parameter distributions shown in FIG. 15, that a certain amount of nonlinear characteristics appear despite of a relatively small value.

In other words, it can be understood in FIG. 15 that the foreground edge blur parameters increase together with the background DN, and decrease together with the foreground DN. At this point, the variation rate of the foreground edge blur parameter, which vary together with the background DN, has more meanings that that together with the foreground DN.

On the other hand, in FIG. 6, the edge blur setting device 300 generates edge blur prediction information according to the surface characteristics of the background and foreground edge blur parameters (step ST60). In other words, the edge blur setting device 300 generate the background edge blur prediction information using a difference value between planar surface characteristics and kriging surface characteristics of the background edge blur parameter according to a brightness value, and generates foreground edge blur prediction information on the basis of a difference value between planar surface characteristics and kriging surface characteristics of the foreground edge blur parameter according to the brightness value.

FIGS. 16 and 17 respectively illustrate edge blur surface characteristics generated by the difference between the kriging and the planar surface with respect to the background edge blur parameter and the foreground edge blur parameter, wherein a translucent region represent a surface in which the difference between the kriging and the planar surface is 0. In FIG. 16, (a) to (f) are respective results of background edge blur surface characterization in cases in which the COD is sequentially 1 m, 2 m, 3 m, 4 m, 5 m, and 6 m, and In FIG. 17, (a) to (f) are respective results of foreground edge blur surface characterization in cases in which the COD is sequentially 1 m, 2 m, 3 m, 4 m, 5 m, and 6 m.

Through FIG. 16, it can be understood that the background edge blur parameter surface derived by the kriging has a concave down pattern with respect to all the CODs. In addition, it can be understood, through FIG. 17, that the foreground edge blur parameter surface derived by the kriging has a concave down pattern in cases in which the COD is about 1 m and about 2 m, but has a concave up pattern for CODs otherwise.

The difference between the kriging and the planar surface, which can be visually checked in the above-described drawings, were numerically calculated through an MDA calculation between two surface types for the edge blur parameters for each COD. Table 5 shows MAD values acquired by the difference between the kriging and the planar surface for each COD.

TABLE 5

| | BBP, $\sigma_b$ | | FBP, $\sigma_f$ | |
|---|---|---|---|---|
| COD (m) | value | rank | value | Rank |
| 1 | 8.60e-4 | 9 | 2.38e-4 | 11 |
| 2 | 1.74e-4 | 12 | 1.25e-2 | 2 |
| 3 | 1.22e-2 | 3 | 3.44e-3 | 6 |
| 4 | 3.94e-4 | 10 | 8.68e-3 | 4 |
| 5 | 1.52e-3 | 7 | 2.25e-2 | 1 |
| 6 | 9.61e-4 | 8 | 6.20e-3 | 5 |

The above Table 5 shows the MAD values and the order of MAD values set in descending order. Through Table 5, for all the CODs other than cases in which COD is about 1 m and COD is about 3 m, it can be understood that the foreground edge blur parameters are further non-linear than the background edge blur parameters.

Then, in FIG. 6, the edge blur setting device 300 acquires the background DN and the foreground DN for the captured image, determines the background edge blur and the foreground edge blur corresponding to the background DN and the foreground DN acquired on the basis of the surface characteristic information as in FIGS. 16 and 17, and then performs the edge modeling using the two edge blurs (step ST70). In other words, the edge blur setting device 300 applies the values of the background edge blur and the foreground edge blur, which are determined in step ST70, to Equation 4 to determine the edge position.

On the other hand, in the present invention, in order to classify the edge profiles under a condition illustrated in FIG. 2, the difference between the surfaces for the foreground edge blur parameter and the background edge blur parameter is calculated, and an edge modeling process using the same can be performed in step ST70.

FIG. 18 shows the surface characteristics generated by the difference between the background edge blur parameter surface and the foreground edge blur parameter surface, and (a) to (f) show surface characterization results according to the surface difference in cases in which the CODs are sequentially 1 m, 2 m, 3 m, 4 m, 5 m, and 6 m.

As shown in FIG. 18, it can be understood that the edge profile in the type of FIG. 2(*a*) is dominant over all DN combinations other than a high foreground DN region and a high background DN region, and these edges will be predicted in the type of FIG. 2(*c*).

In other words, according to the above-described embodiments, it is configured to model the edge profile having the two edge blur parameters, and to predict parameters thereof using the target sheets. At this point, it can be checked that each of the edge blur parameters depends on the brightness region of the edge through the distributions of the foreground edge blur parameter and the background edge blur parameter, and an edge blur variation amount is set to the DN having the constant interval, and is linearized. In addition, through the kriging-based edge blur parameter prediction, the edge blur parameters can be predicted which can accommodate the non-linear characteristics present in the distributions of the foreground edge blur parameter and the background edge blur parameter distribution.

Figure 19A:
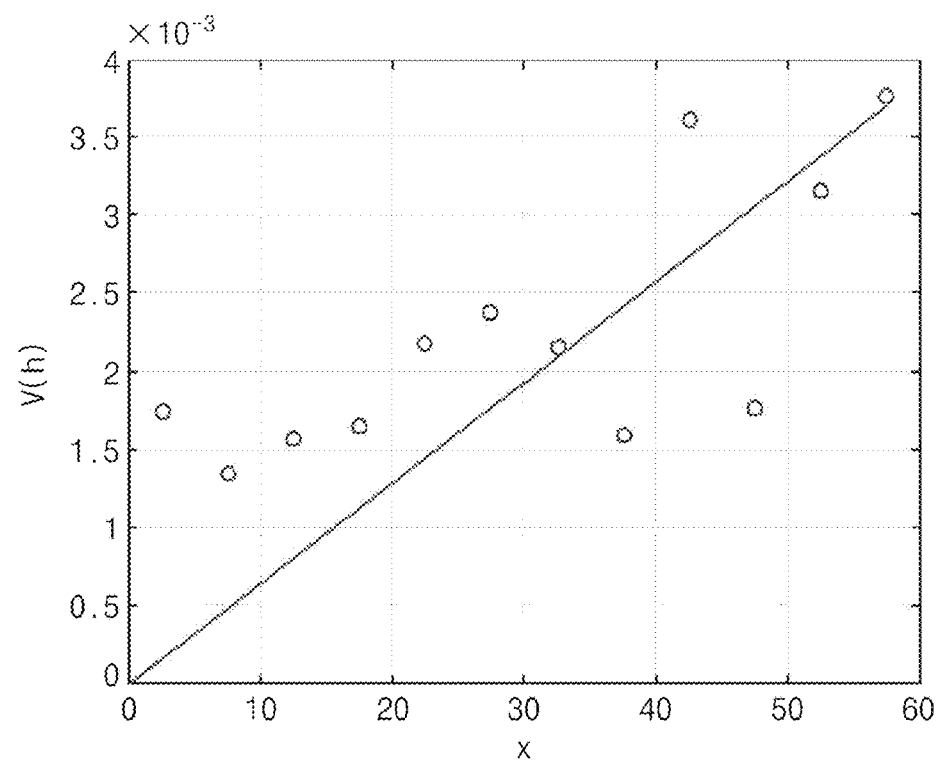
FIGS. 19A-19B illustrate variogram and a covariance function thereof, when the COD is about 1 m and the COD is about 6 m.
Figure 19B:
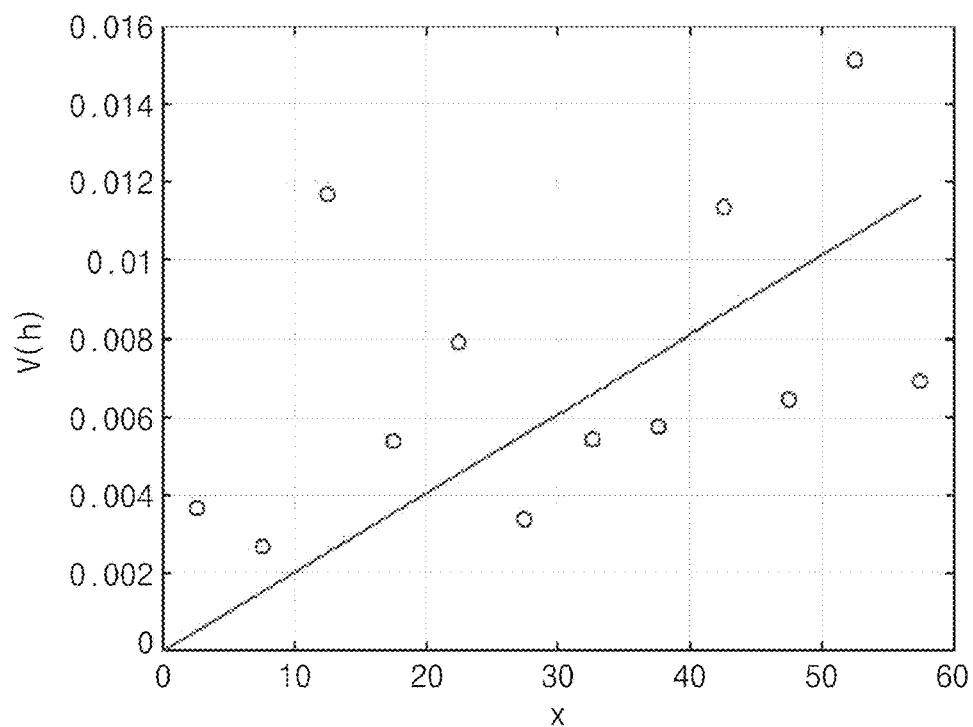
Figure 20A:
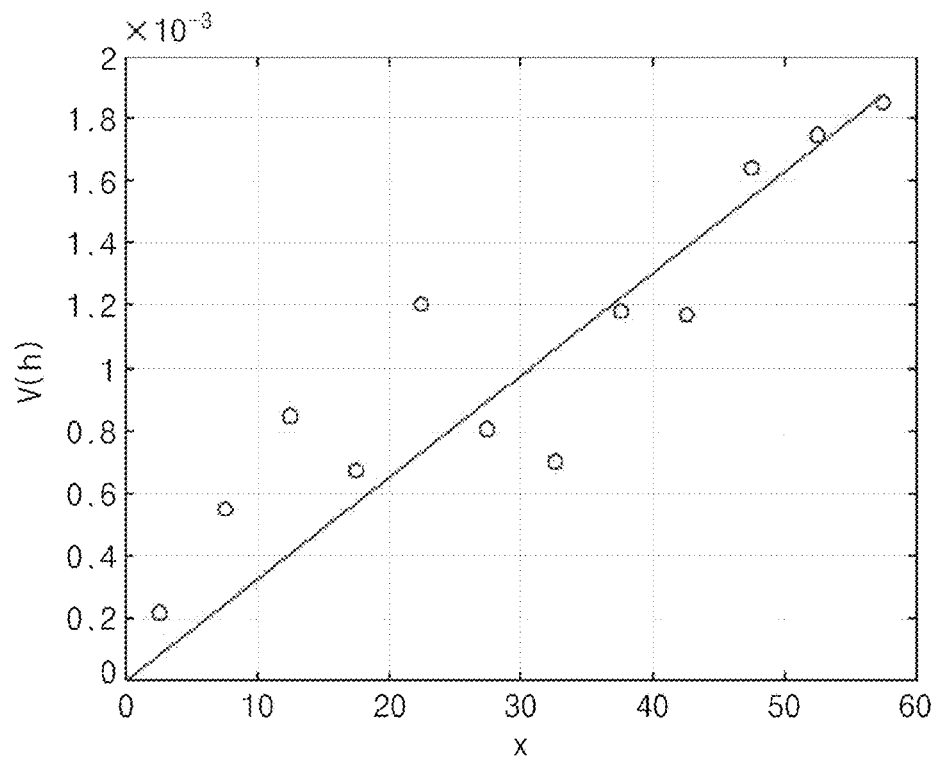
FIGS. 20A-20B illustrate variogram and a covariance function thereof, when the COD is about 1 m and the COD is about 6 m.
Figure 20B:
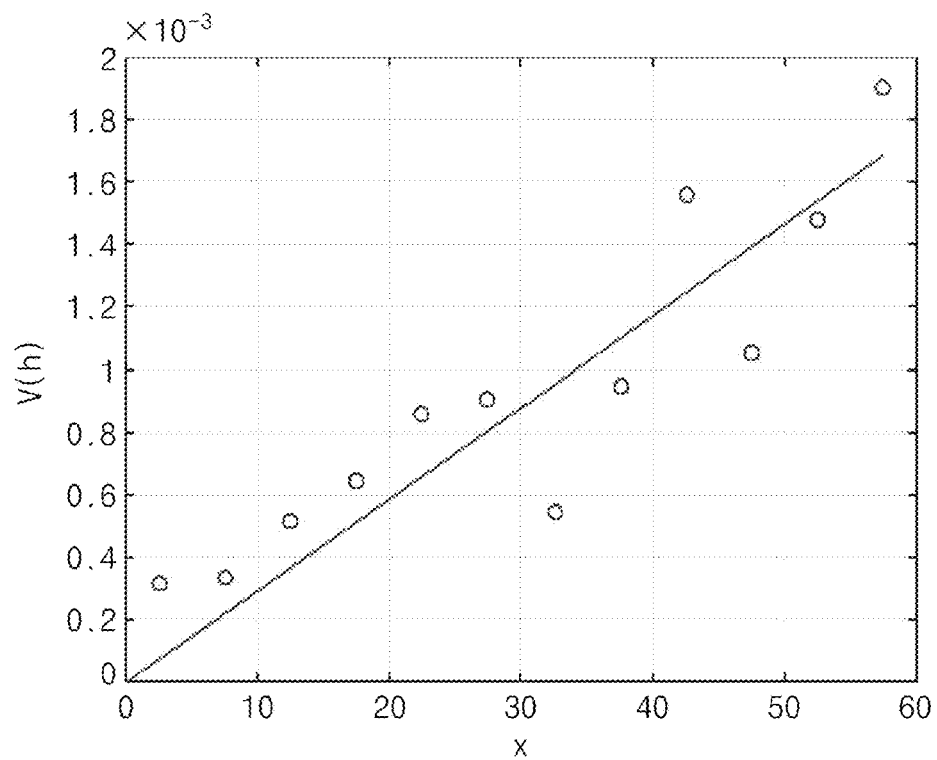
Figure 21A:
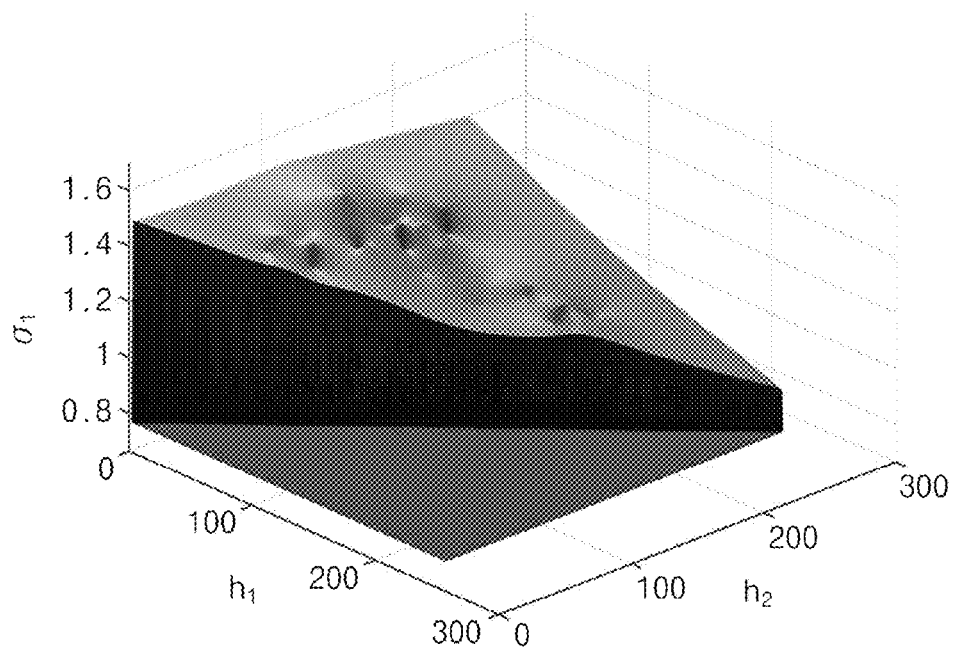
FIGS. 21A-21F illustrate planar surface characteristics generated by the kriging between the background edge blur parameter and the foreground edge blur parameter.
Figure 21B:
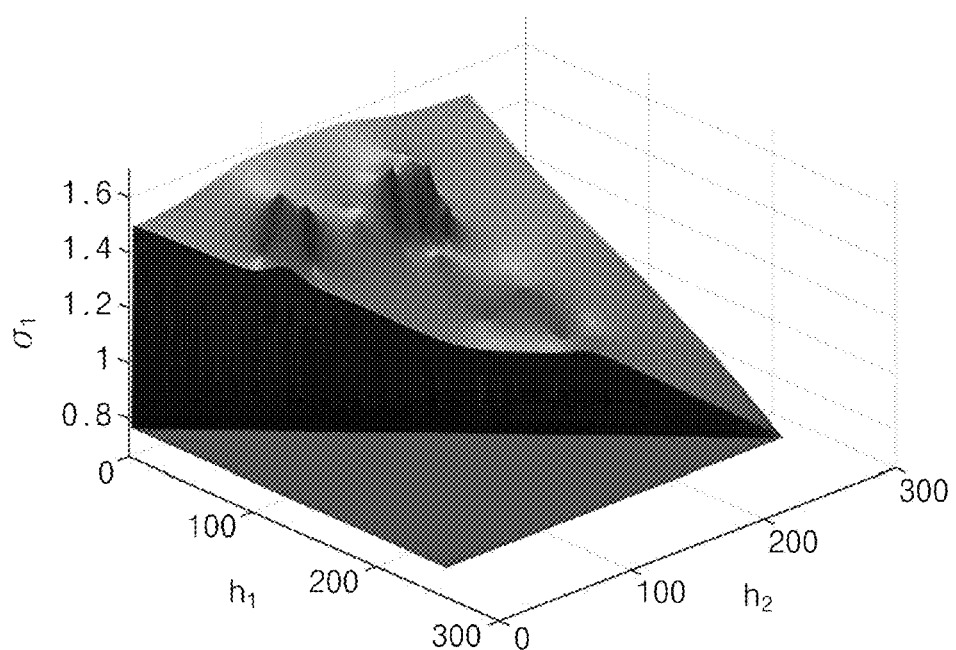
Figure 21C:
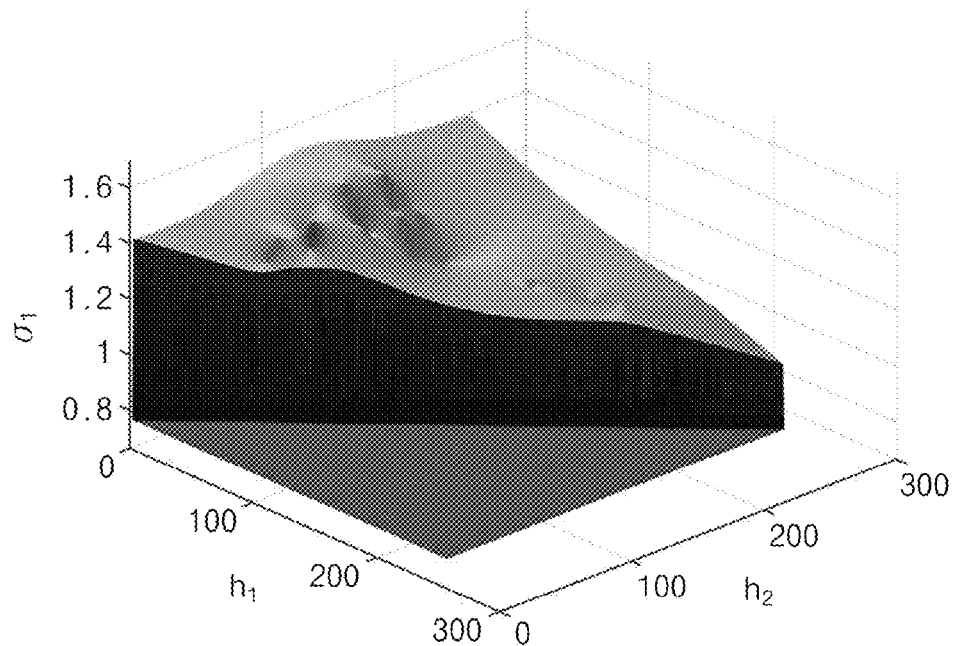
Figure 21D:
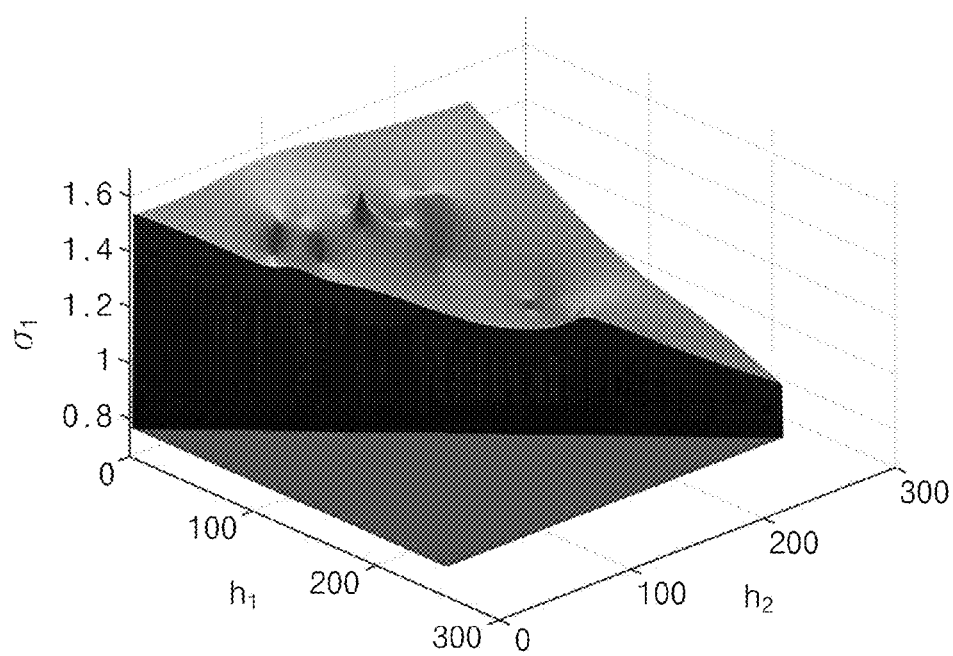
Figure 21E:
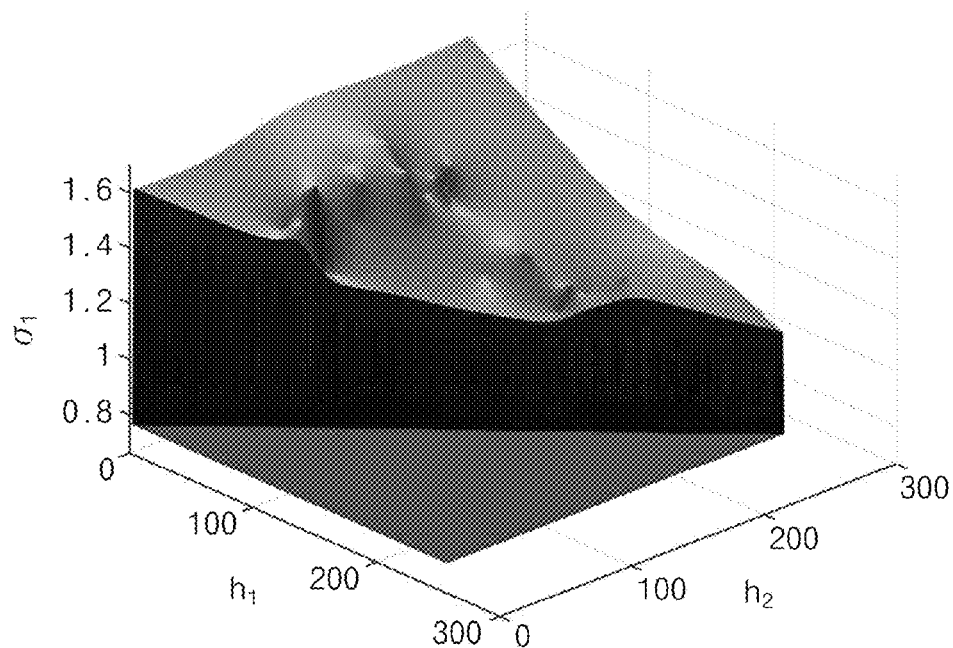
Figure 21F:
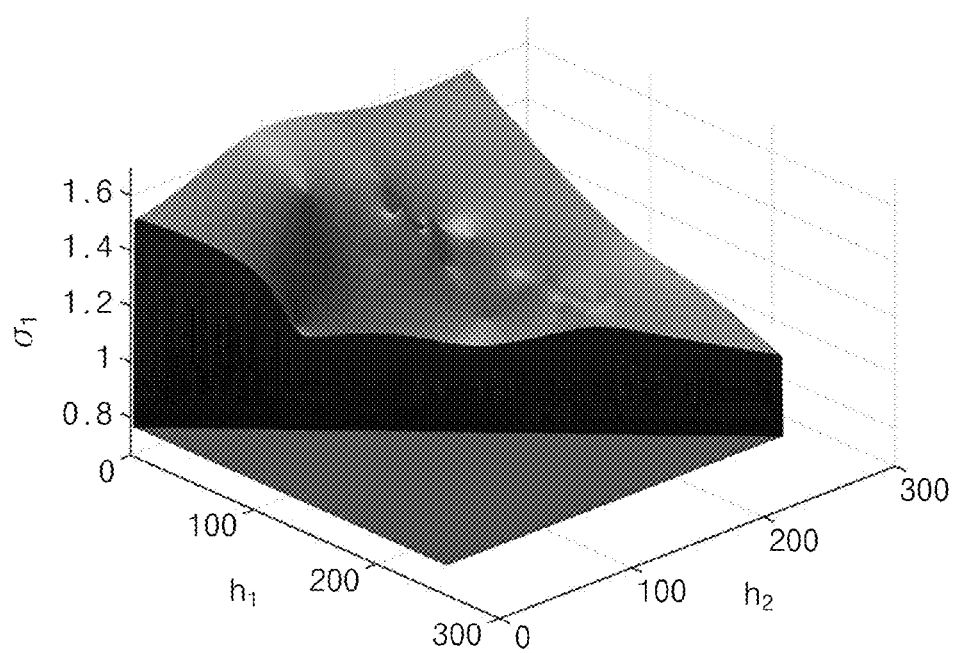
Figure 22A:
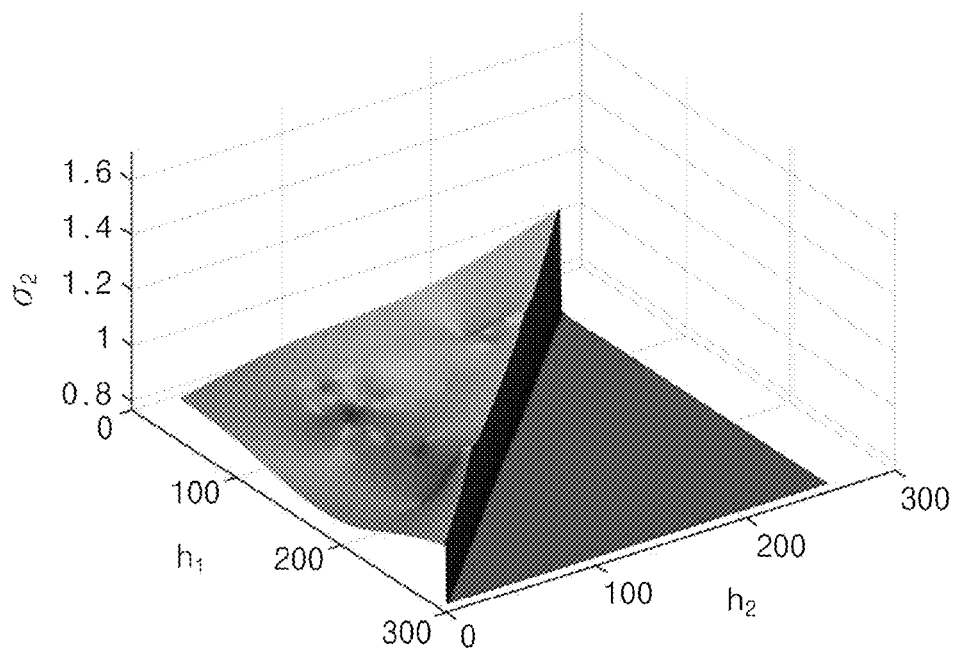
FIGS. 22A-22F illustrate planar surface characteristics generated by the kriging between the background edge blur parameter and the foreground edge blur parameter.
Figure 22B:
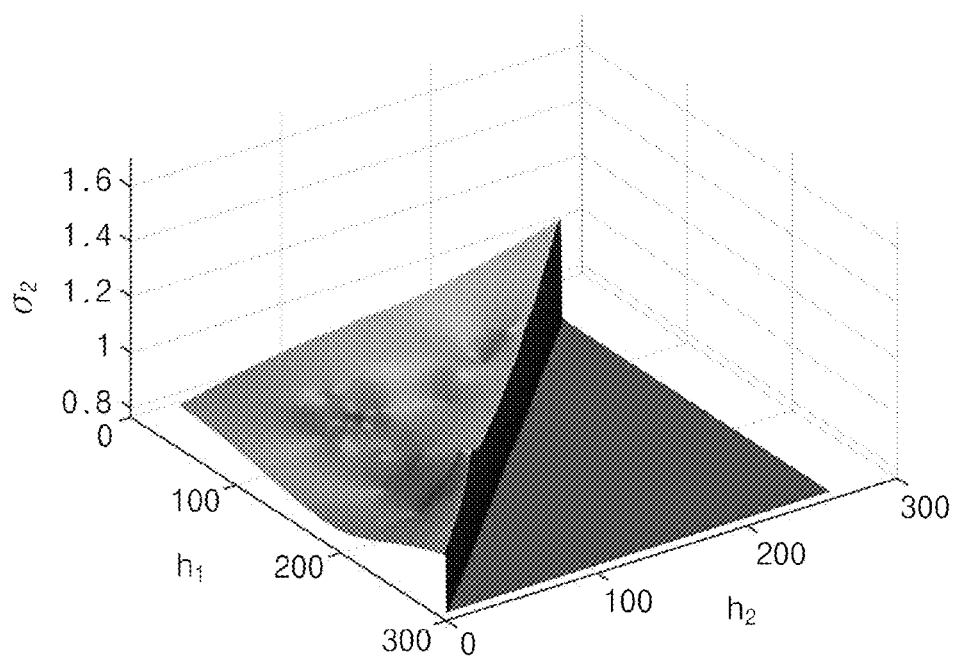
Figure 22C:
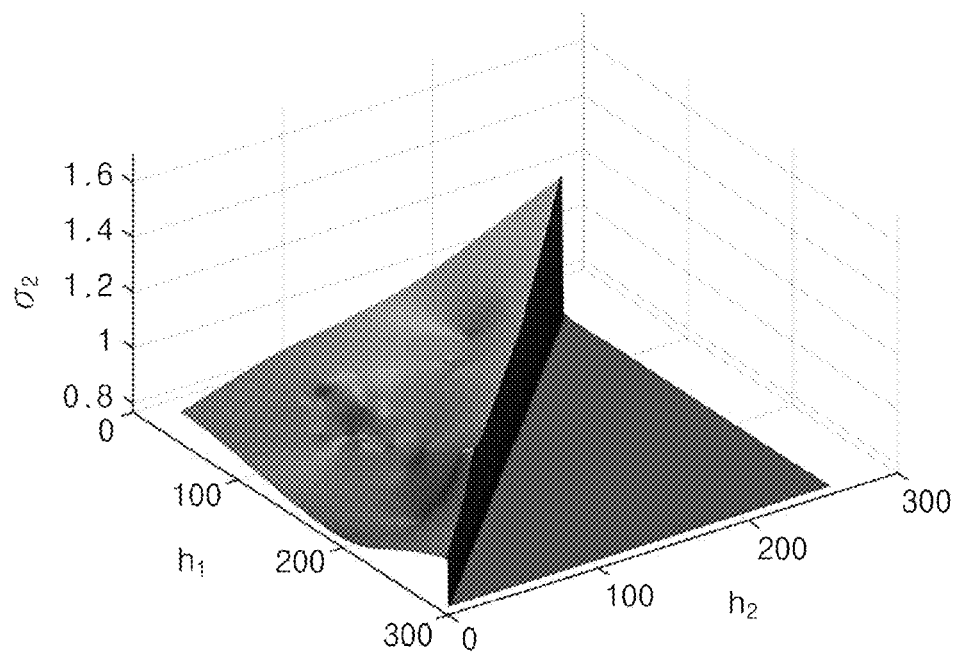
Figure 22D:
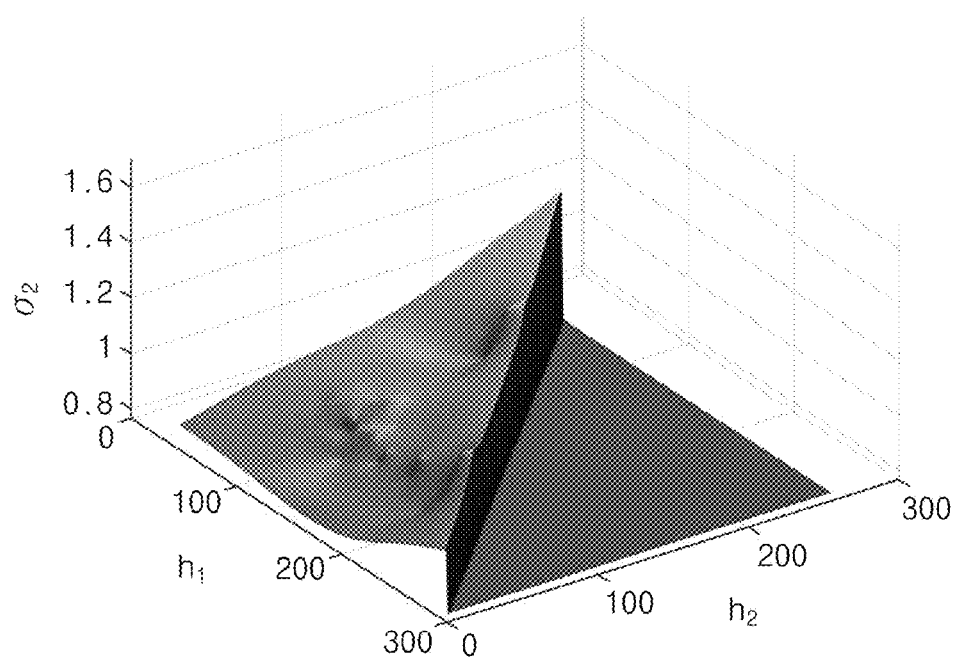
Figure 22E:
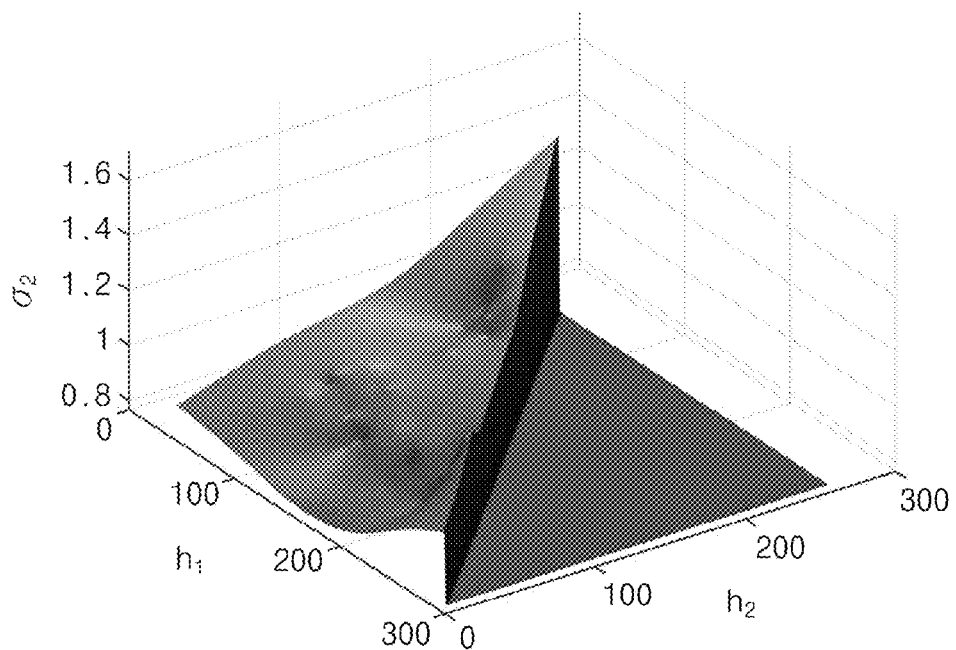
Figure 22F:
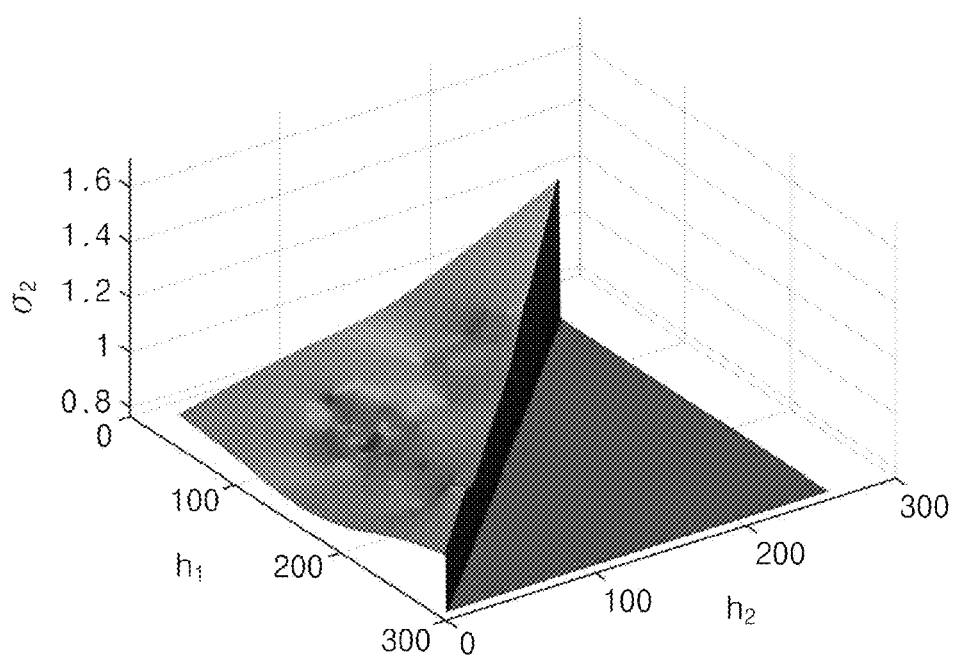
Figure 23A:
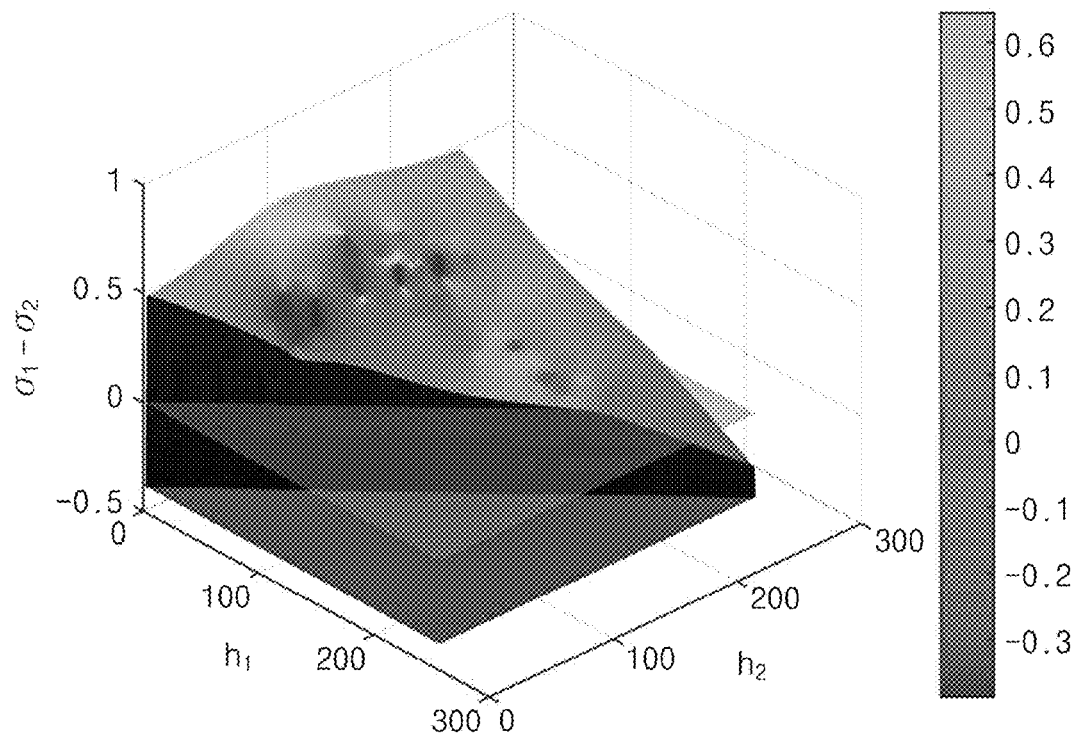
FIGS. 23A-23F illustrate a difference value between the background edge blur parameter and the foreground edge blur parameter.
Figure 23B:
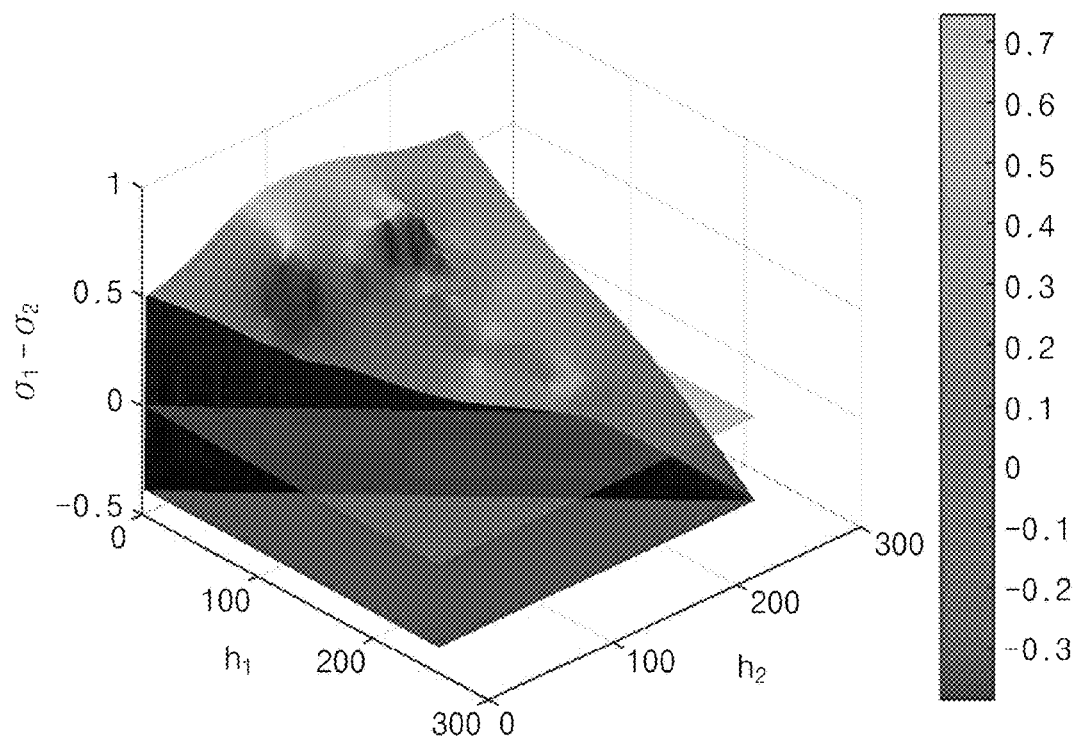
Figure 23C:
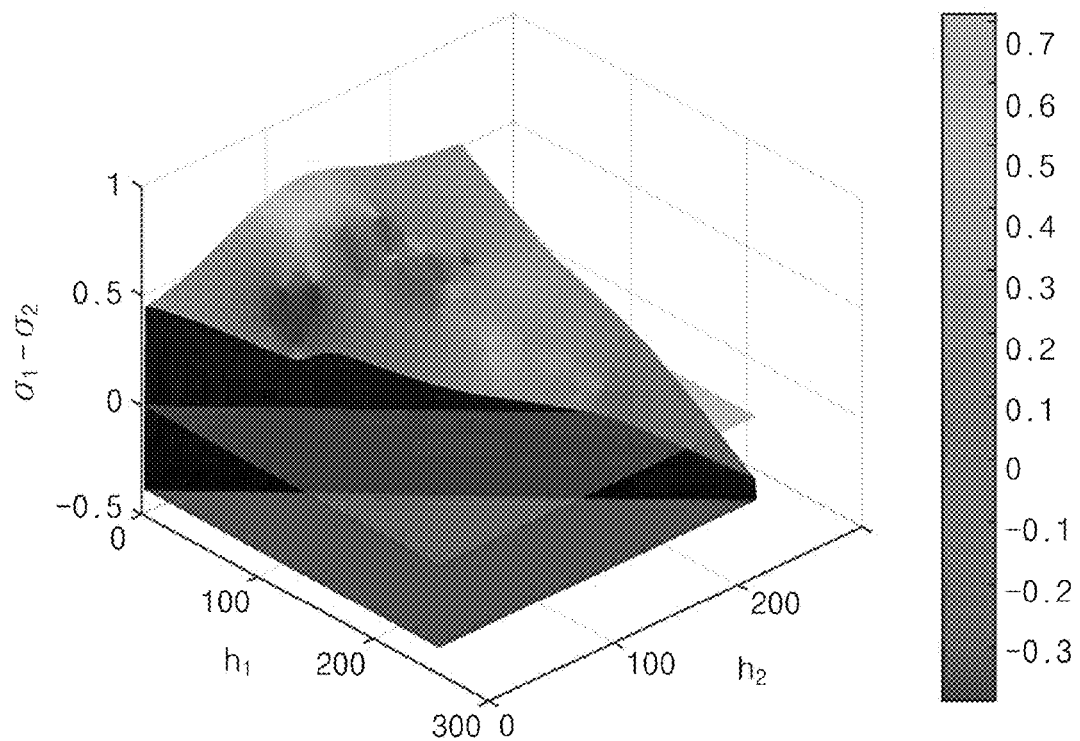
Figure 23D:
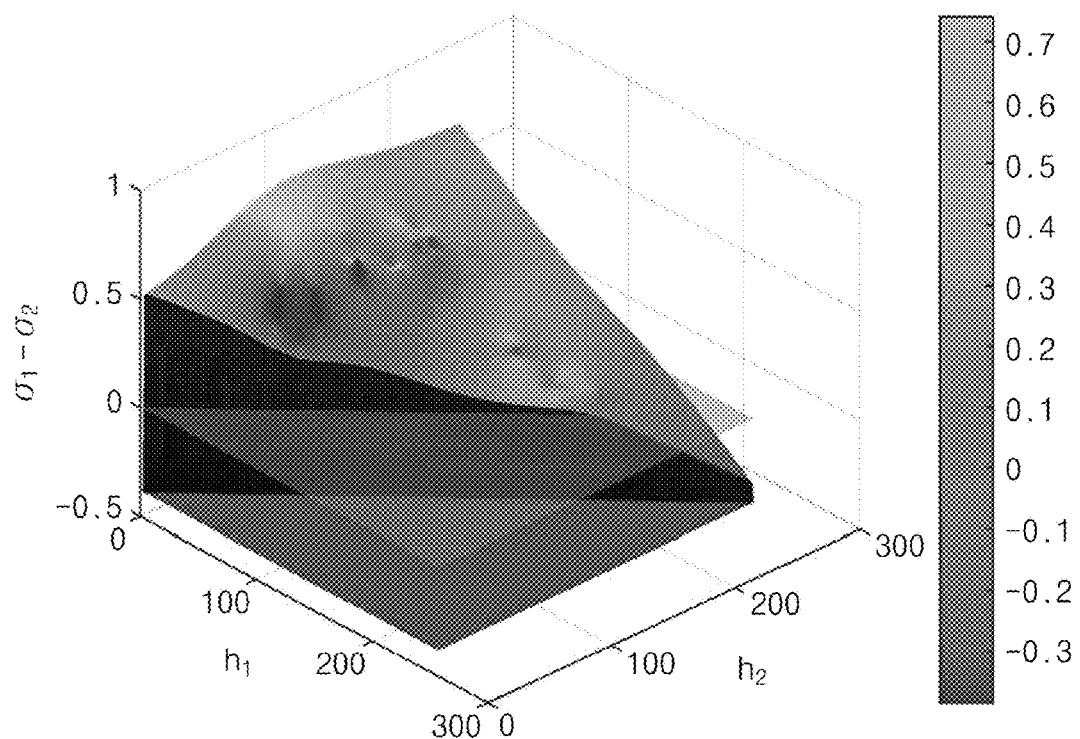
Figure 23E:
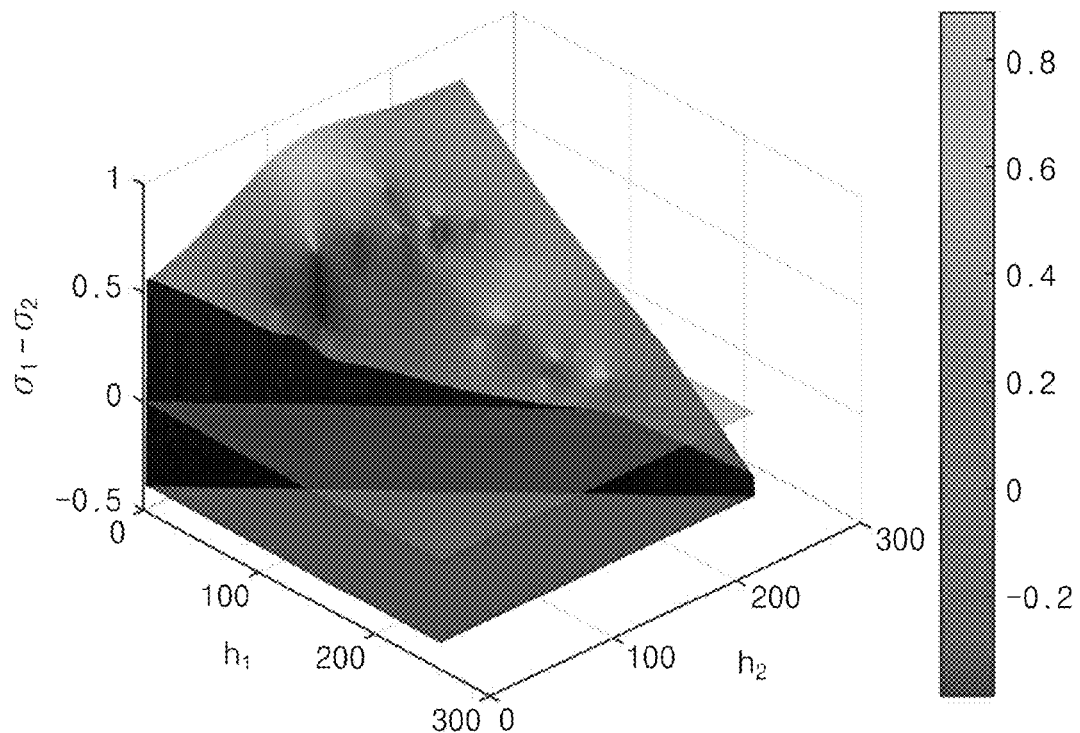
Figure 23F:
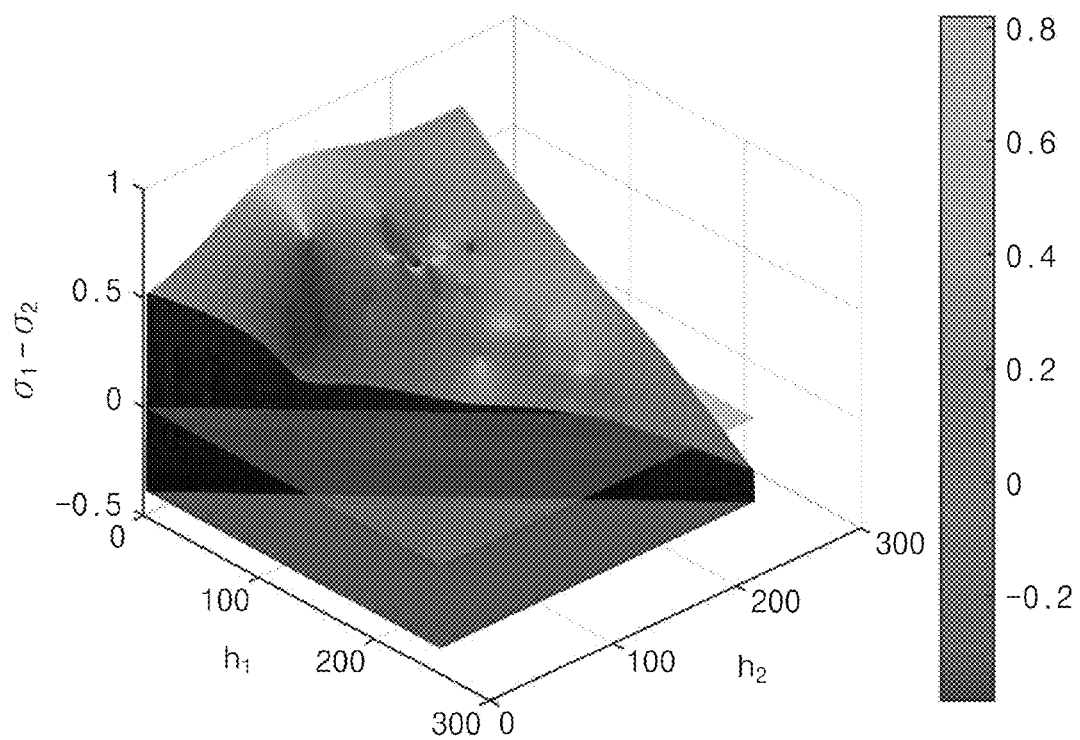
Figure 24A:
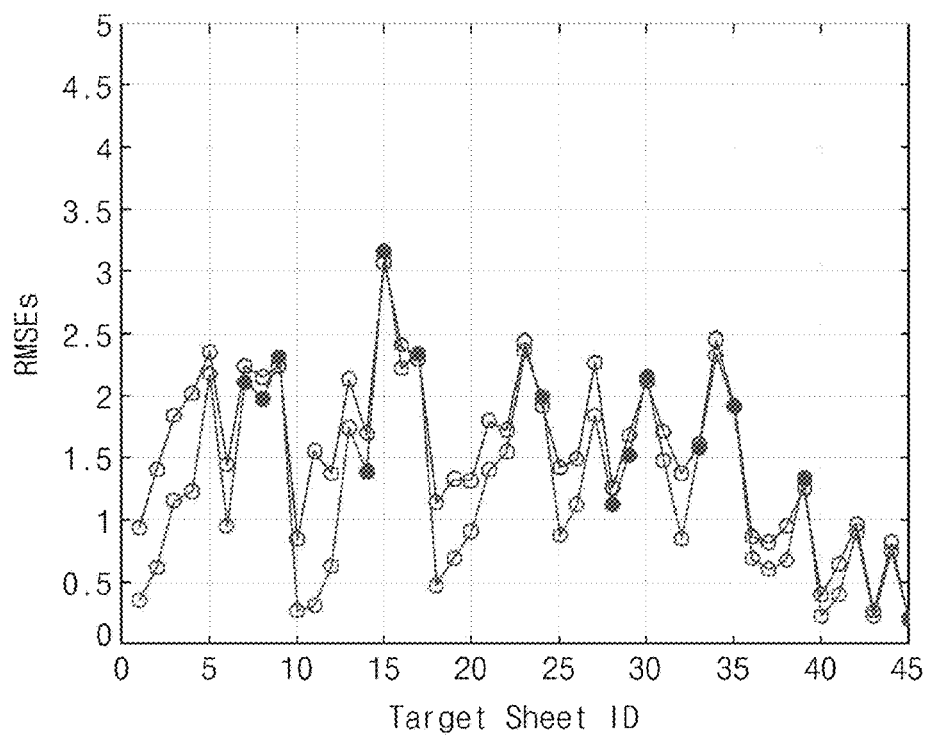
FIGS. 24A-24F illustrate a fitting error value of an edge model with respect to 45 target sheets.
Figure 24B:
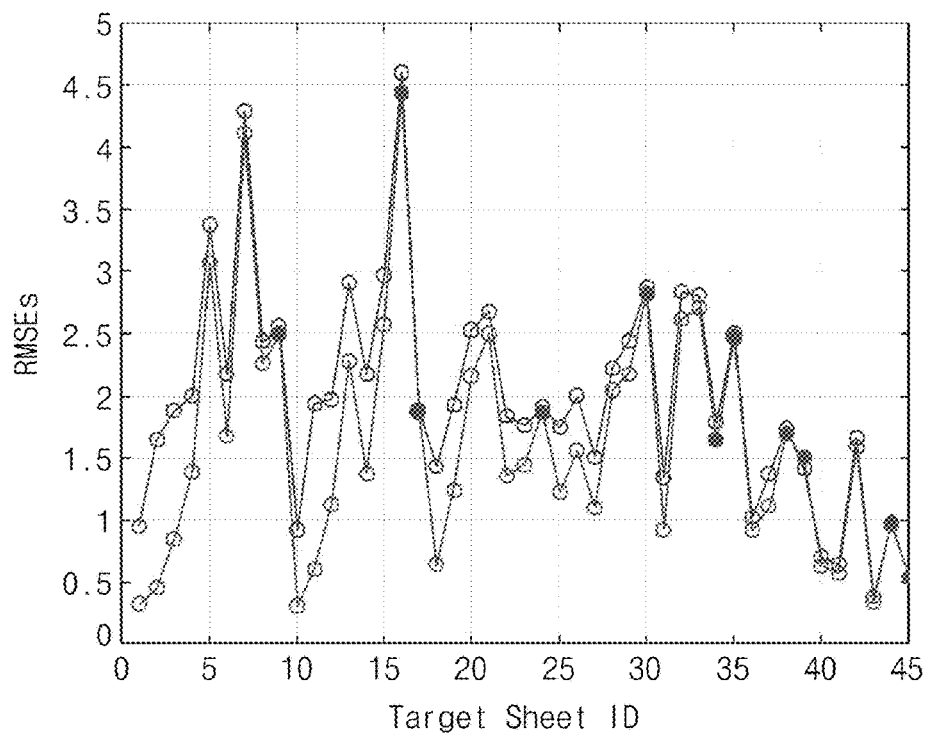
Figure 24C:
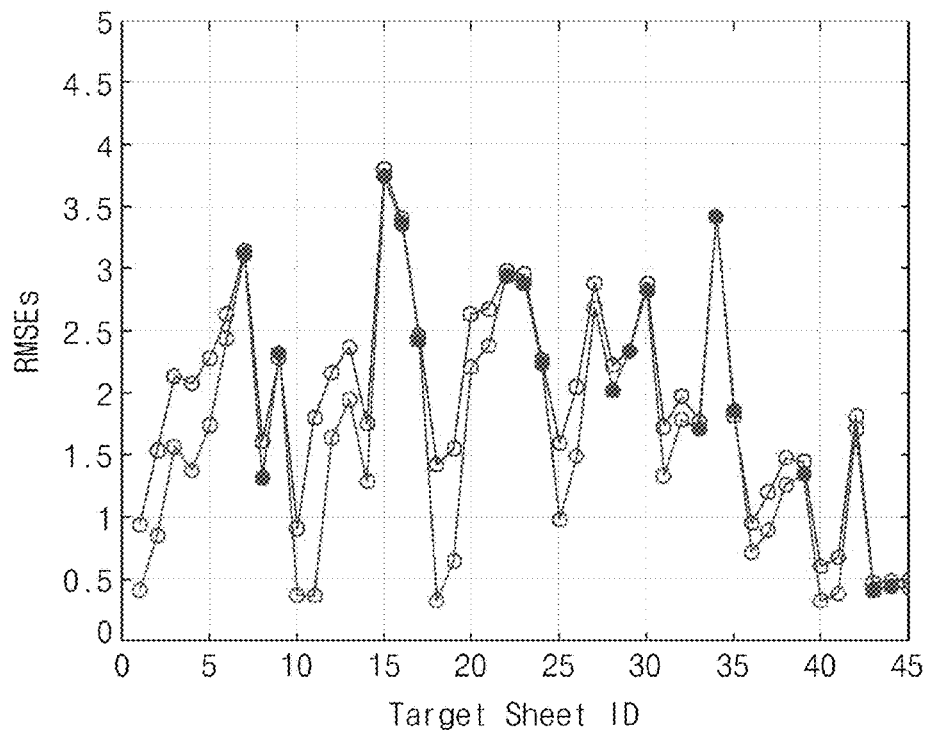
Figure 24D:
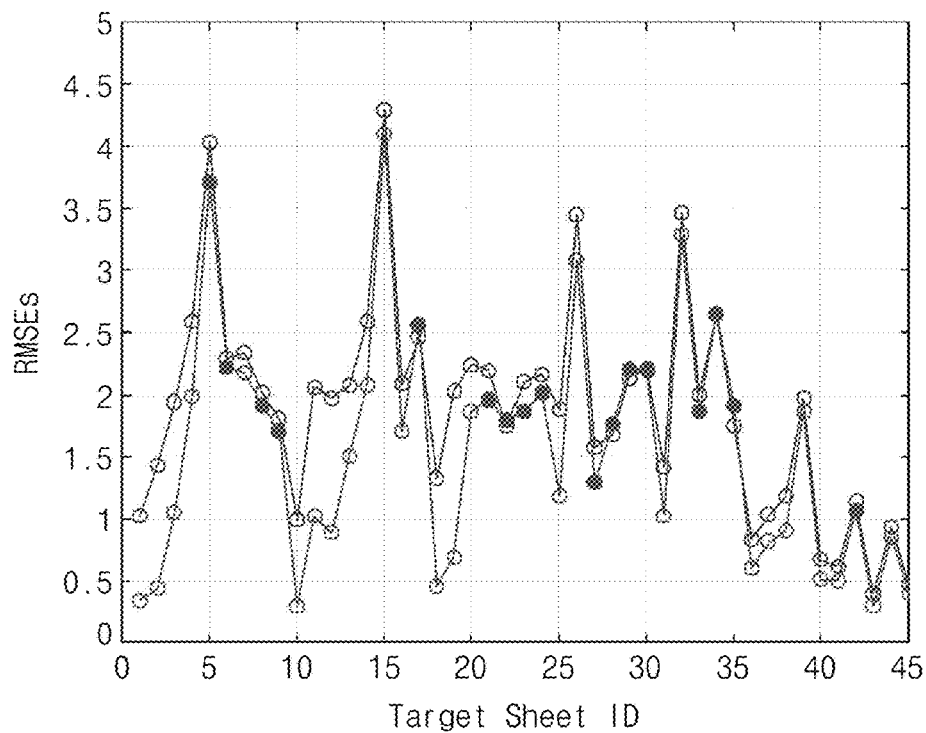
Figure 24E:
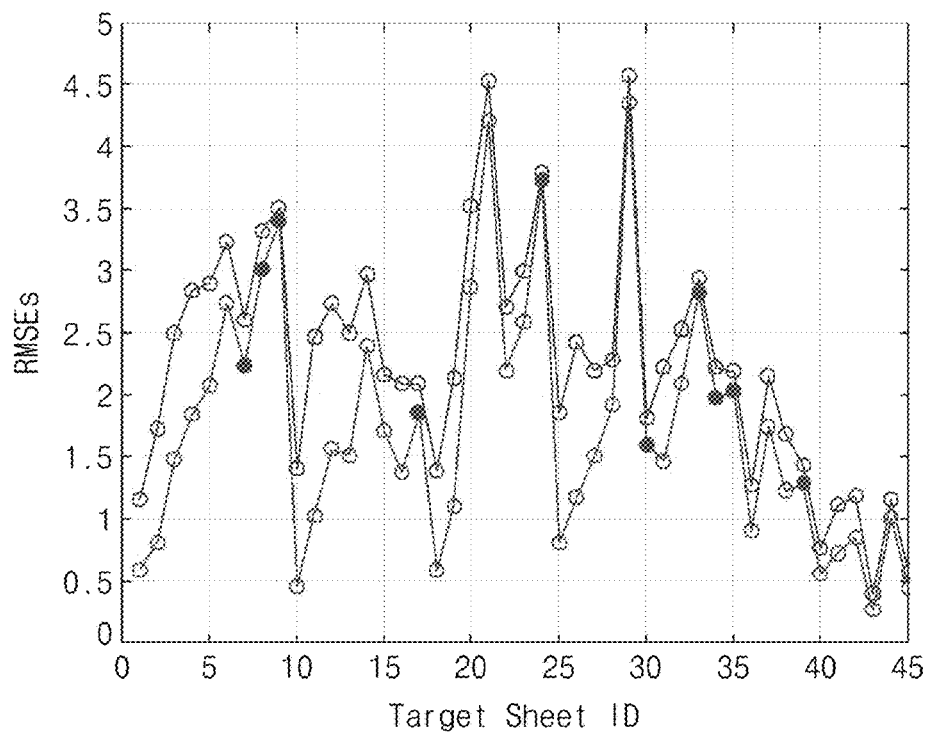
Figure 24F:
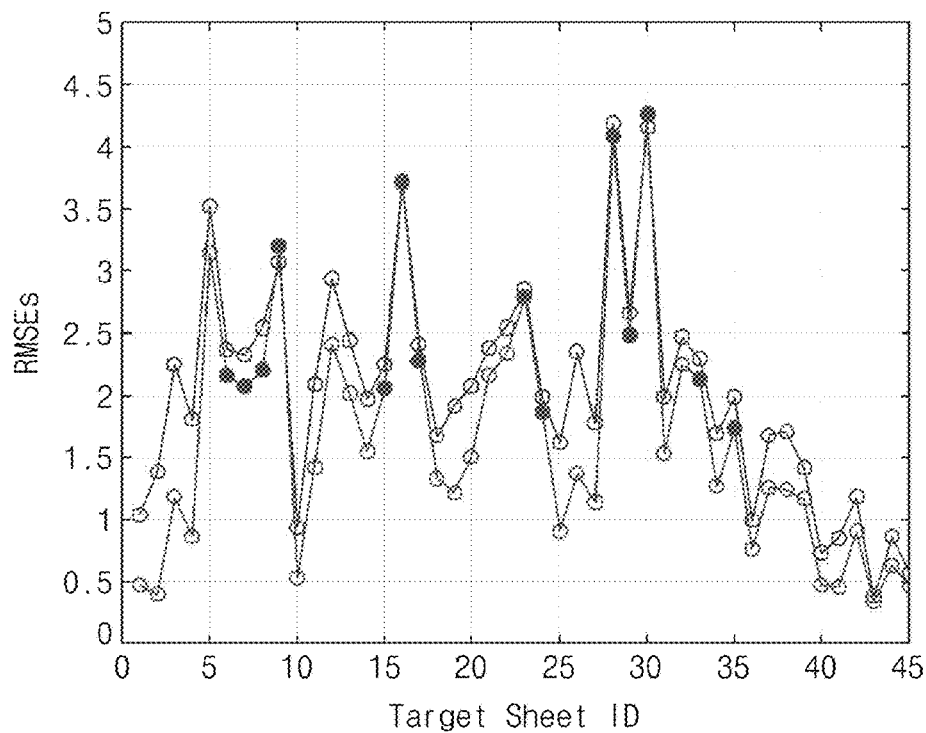

FIGS. 19 and 20 illustrate the variogram and the covariance function thereof according to other embodiments of the present invention. In FIGS. 19 and 20, circles are the variogram, and lines are the covariance function thereof. FIG. 19(*a*) is a covariance result on the background edge blur profile $\sigma_b$ for the COD of about 1 m, FIG. 19(*b*) is a covariance result on the background edge blur profile $\sigma_b$ for the COD of about 6 m, FIG. 19(*c*) is a covariance result on the foreground edge blur profile $\sigma_f$ for the COD of about 1 m, and FIG. 19(*d*) is a covariance result on the foreground edge blur profile $\sigma_f$ for the COD of about 6 m. At this point, a variogram point (the circle in FIGS. 19 and 20) is set to an observation value for estimating a variogram function V(h).

$$\gamma(h)=V(h)+e \quad (16)$$

where e is a random error.

From a visual analysis of the variogram, the covariance function is modeled by a linear function (Equation 17).

$$V(h)=ah \quad (17)$$

where a is an estimation parameter. At this point, for all CODs, the parameter (a in Equation 17) is estimated using the least square scheme. The edge blur I(P) can be predicted according to Equations 14 and 15. The edge blur setting device 300 predicts a residual at a grid point, and then considers the predicted residual and a trend so as to calculate the edge blur.

The following Table 6 shows a planar parameter for the background edge blur (DBP=BBP, $\sigma_1=\sigma_b$), a planar parameter for the foreground edge blur (LBP=FBP, $\sigma_2=\sigma_f$), and the MAD of residuals.

TABLE 6

| COD | Plane for DBP, $\sigma_1$ | | | Plane for LBP, $\sigma_2$ | | | MAD of planar fitting residuals for each blur parameter | |
|---|---|---|---|---|---|---|---|---|
| (m) | a | b | c | a | b | c | $\sigma_1$ | $\sigma_2$ |
| 1 | −0.0018 | −5.81e−4 | 1.4917 | 0.0011 | −1.92e−4 | 0.9154 | 0.0359 | 0.0284 |
| 2 | −0.0033 | −3.18e−4 | 1.6290 | 8.90e−4 | −2.54e−4 | 0.9316 | 0.0661 | 0.0287 |
| 3 | −0.0019 | −3.04e−4 | 1.4929 | 0.0015 | −2.17e−4 | 0.8701 | 0.0398 | 0.0290 |
| 4 | −0.0025 | −4.23e−4 | 1.5888 | 0.0012 | −3.81e−4 | 0.9194 | 0.0534 | 0.0311 |
| 5 | −0.0025 | −2.54e−6 | 1.6106 | 0.0018 | −3.04e−4 | 0.8804 | 0.0572 | 0.0326 |
| 6 | −0.0020 | −3.21e−4 | 1.4093 | 0.0016 | −1.63e−4 | 0.8417 | 0.0627 | 0.0264 |

Through Table 6, it can be understood that the background edge blur parameter decreases, as the background DN or the foreground DN increases. In addition, the decrease ratio of the background edge blur parameter to the background DN is larger than that of the foreground edge blur parameter to the foreground DN. This means that the background edge blur parameter further depends on the background DN rather than the foreground DN. In Table 6, the MAD values of the residuals indicate that a three-dimensional plane fits the blur values within 0.07 pixel for all the CODs. In addition, the MAD values of the residuals for the foreground edge blur parameters indicate that the blur values are fitted within 0.04 pixel for all the CODs.

FIGS. 21 and 22 illustrate surface characteristics generated by the kriging with respect to the background edge blur parameters and the foreground edge blur parameters. In FIG. 21, (a) to (f) are surface characterization results for the background edge blur parameter in cases in which the CODs are sequentially 1 m, 2 m, 3 m, 4 m, 5 m, and 6 m, and in FIG. 22, (a) to (f) are surface characterization results for the foreground edge blur parameter in cases in which the CODs are sequentially 1 m, 2 m, 3 m, 4 m, 5 m, and 6 m.

In FIG. 21, it can be understood that the background edge blur parameter decreases, as the background DN increases, as predicted in Table 6. In addition, as the COD increases, the ratio of the background edge blur parameter to the foreground DN decreases. In FIG. 22, it can be understood that the foreground edge blur parameter increases, as the background DN increases, and decreases, as the foreground DN increases. At this point, the variation rate of the foreground edge blur parameter, which varies together with the background DN has further meanings than that together with the foreground DN.

FIG. 23 illustrates difference values between the background edge blur parameter and the foreground edge blur parameter. In FIG. 23, (a) to (f) show cases in which the COD is sequentially 1 m, 2 m, 3 m, 4 m, 5 m, and 6 m. It can be understood, through FIG. 23, that, in most cases of the background DN and the foreground DN, the background edge blur parameter is larger than the foreground edge blur parameter, but the background edge blur parameter is smaller than the foreground edge blur parameter, when the foreground DN and the background DN are large.

TABLE 7

| Case | COD (m) | Target sheet design DDV | Target sheet design LDV | Target sheet image DPV | Target sheet image LPV | One blur edge model $\sigma$ | One blur edge model RMSE | Two blur edge model $\sigma_1$ | Two blur edge model $\sigma_2$ | Two blur edge model RMSE |
|---|---|---|---|---|---|---|---|---|---|---|
| 1 | 1 | 0.0 | 0.2 | 44.8 | 62.7 | 0.6619 | 0.9401 | 1.3517 | 1.0107 | 0.3541 |
| 2 | 2 | 0.1 | 0.4 | 56.0 | 83.7 | 0.6292 | 1.9440 | 1.5204 | 0.9760 | 0.6074 |
| 3 | 3 | 0.3 | 0.5 | 65.0 | 114.8 | 0.7267 | 1.5951 | 1.3785 | 0.9791 | 0.9800 |
| 4 | 4 | 0.8 | 0.5 | 179.7 | 204.7 | 0.8309 | 0.5741 | 1.1800 | 1.1207 | 0.4632 |
| 5 | 5 | 0.3 | 1.0 | 67.8 | 202.3 | 0.8608 | 2.2064 | 1.3195 | 0.9770 | 2.1889 |
| 6 | 6 | 0.0 | 1.0 | 49.4 | 203.5 | 0.8657 | 3.5129 | 1.5187 | 0.9657 | 3.4007 |

Table 7 shows fitting results of the edge blur parameters for 6 cases. In Table 7, DDV and LDV are respectively the background brightness and the foreground brightness of the target sheet. Cases 1 to 3 are the cases in which the background DN (DPV) and the foreground DN (LPV) are relatively small. In this case, a root mean square error (RMSE) for a model of two blur parameters is smaller than that of one blur parameter edge model. Cases 4 to 6 are cases in which the foreground DN (LPV) is large. In this case, the RMSE for the model of two edge blur parameters is smaller than that of the single edge blur parameter model, even though the difference is not large.

TABLE 8

| ID | DDV | LDV |
|---|---|---|
| 1 | 0.0 | 0.2 |
| 2 | 0.0 | 0.3 |
| 3 | 0.0 | 0.4 |
| 4 | 0.0 | 0.5 |
| 5 | 0.0 | 0.6 |
| 6 | 0.0 | 0.7 |
| 7 | 0.0 | 0.8 |
| 8 | 0.0 | 0.9 |
| 9 | 0.0 | 1.0 |
| 10 | 0.1 | 0.3 |
| 11 | 0.1 | 0.4 |
| 12 | 0.1 | 0.5 |
| 13 | 0.1 | 0.6 |
| 14 | 0.1 | 0.7 |
| 15 | 0.1 | 0.8 |
| 16 | 0.1 | 0.9 |
| 17 | 0.1 | 1.0 |
| 18 | 0.2 | 0.4 |
| 19 | 0.2 | 0.5 |
| 20 | 0.2 | 0.6 |
| 21 | 0.2 | 0.7 |
| 22 | 0.2 | 0.8 |
| 23 | 0.2 | 0.9 |
| 24 | 0.2 | 1.0 |
| 25 | 0.3 | 0.5 |
| 26 | 0.3 | 0.6 |
| 27 | 0.3 | 0.7 |
| 28 | 0.3 | 0.8 |
| 29 | 0.3 | 0.9 |
| 30 | 0.3 | 1.0 |
| 31 | 0.4 | 0.6 |
| 32 | 0.4 | 0.7 |
| 33 | 0.4 | 0.8 |
| 34 | 0.4 | 0.9 |
| 35 | 0.4 | 1.0 |
| 36 | 0.5 | 0.7 |
| 37 | 0.5 | 0.8 |
| 38 | 0.5 | 0.9 |
| 39 | 0.5 | 1.0 |
| 40 | 0.6 | 0.8 |
| 41 | 0.6 | 0.9 |
| 42 | 0.6 | 1.0 |
| 43 | 0.7 | 0.9 |
| 44 | 0.7 | 1.0 |
| 45 | 0.8 | 1.0 |

Table 8 shows the background brightness (DDV) and the foreground brightness (LDV) for 45 target sheets. FIG. 24 shows fitting errors for the edge models on the 45 target sheets. In FIG. 24, (a) to (d) show cases in which the CODs are sequentially 1 m, 2 m, 3 m, 4 m, 5 m, and 6 m. Table 9 shows summarized measurement results.

TABLE 9

| COD (m) | One blur parameter edge model | Two blur parameter edge model |
|---|---|---|
| 1 | 1.5603 | 1.2705 |
| 2 | 1.9876 | 1.6382 |
| 3 | 1.9592 | 1.6512 |
| 4 | 1.8986 | 1.5737 |
| 5 | 2.2719 | 1.7367 |
| 6 | 2.0487 | 1.6850 |
| Total mean | 1.9544 | 1.5926 |

In relation to FIG. 24 and Table 9, in most cases, the embodiments of the present invention show more excellent performance (smaller error) than one blur parameter edge model. The method for setting an edge blur according to the present invention can be used for evaluating camera characteristics, extracting an edge, or the like through the edge modeling.

DESCRIPTION OF REFERENCE NUMERALS

100 Target sheet
200 Camera
300 Edge blur setting device

The invention claimed is:
1. A method for setting an edge blur according to a brightness value, comprising:
 a first step for providing a plurality of target sheets on each of which a reference pattern for detecting a reference line and a grid pattern for detecting an edge position are provided, and in which changes in brightness values comprised in the grid patterns are different from each other;
 a second step for capturing images of the plurality of target sheets to obtain a plurality of target sheet images;
 a third step for analyzing each reference pattern of the plurality of target sheet images to estimate each reference line, and analyzing each grid pattern of the plurality of target sheet images to extract an edge profile provided in each grid pattern;
 a fourth step for calculating a mean edge profile from the edge profiles collected in the third step, calculating a gradient of a brightness difference between adjacent pixels on the basis of the mean edge profile, and acquiring a background edge blur parameter and a foreground edge blur parameter on the basis of the gradient according to brightness contrast present in an image; and a fifth step for generating background edge blur prediction information and foreground edge blur prediction information for each pixel value, which respectively correspond to brightness values, on a basis of distributions of the background edge blur parameter and the foreground edge blur parameter.

2. The method of claim 1, wherein each of the target sheets comprises the reference pattern in which one pair of vertical regions and two lateral regions have a segment shape with a prescribed width and are separated from each other with a central gap therebetween, and the grid pattern provided with 4 squares disposed in the central gap.

3. The method of claim 2, wherein the grid pattern is provided with upper two squares and lower two squares, one square and a square in a diagonal direction thereto being used for background, remaining squares being used for foreground, and brightness values of the foreground and the background have variable values.

4. The method of claim 3, wherein the foreground brightness value is set brighter than a background brightness value, the background being set to have a variable brightness value of 0.0 to 0.9, and a plurality of target sheets are manufactured so as to cause the foreground to have a variable brightness value of 0.1 to 1.0.

5. The method of claim 1, wherein the second step comprises a step for acquiring a plurality of images while a distance between a camera and an object is varied for each of the plurality of sheets, the third step estimates the edge profile according to a change in brightness value for each distance between the camera and the object, the fourth step acquires the background edge blur parameter and the foreground edge blur parameter according to the brightness contrast for each distance between the camera and the object, and the fifth step generates background edge blur prediction information and foreground edge blur prediction information according to respective distributions of the background edge blur parameter and the foreground edge blur parameter with respect to a brightness value of a constant interval in consideration of the change in brightness value and the distance between the camera and the object.

6. The method of claim 1, wherein, in the fourth step, the step of acquiring the edge blur parameters comprises:

a step for re-sampling the edge profile collected in the third step in a preset interval;

a step for generating the mean edge profile over all edge profiles in the re-sampled interval;

a step for acquiring a gradient profile calculated with central values in continuous periods using difference values of consecutive mean edge profiles; and a step for calculating the background edge blur parameter and the foreground edge blur parameter according to the brightness contrast by generating a gradient modeling function as a following Equation corresponding to the gradient profile, and by selecting one pair of values from which a least square error sum satisfying the same is obtained, $$s = f(\sigma_b, \sigma_f, x) + e = \left( -\frac{h_b}{\sigma_b \sqrt{2\pi}} e^{-\frac{x^2}{2\sigma_b^2}} + \frac{h_f}{\sigma_f \sqrt{2\pi}} e^{-\frac{x^2}{2\sigma_f^2}} \right) + e$$

where, e denotes a random error, $h_b$ denotes background brightness, $h_f$ denotes foreground brightness, $\sigma_b$ denotes the background edge blur parameter, and $\sigma_f$ denotes the foreground edge blur parameter, x denotes position.

7. The method of claim 6, wherein the background edge blur parameter $\sigma_b$, and the foreground edge blur parameter $\sigma_f$ are set to a mean brightness value for the grid pattern of the target sheet.

8. The method of claim 6, wherein the step for calculating the background edge blur parameter and the foreground edge blur parameter according to the brightness contrast is configured to calculate the background edge blur parameter and the foreground edge blur parameter for a combination of the background edge blur parameter and the foreground edge blur parameter having values of "0.2" to "2.0" with an interval of "0.01" using a brute-force scheme.

9. The method of claim 1, wherein the fifth step comprises:

a step for collecting the background edge blur parameter and the foreground edge blur parameter acquired in the fourth step as data points for a preset pixel value DN;

a step for calculating respective planar surface characteristics for the background edge blur parameter and the foreground edge blur parameter using the data points;

a step for acquiring respective residual components for the background edge blur parameter and the foreground edge blur parameter from the planar surface characteristics, and calculating each of kriging surface characteristics according to a kriging scheme using a respective residual component; and a step for determining the background and foreground blur prediction information by generating surface characteristics for each pixel value with respect to each of the background edge blur parameter and the foreground edge blur parameter on a basis of a difference between the planar surface characteristics and the kriging surface characteristics.

10. The method of claim 9, further comprising planes, for the background edge blur parameter and the foreground edge blur parameter, that are modeled as a following Equation, $$Z = aX + bY + c + e$$

where, X denotes a background pixel value, Y denotes a foreground pixel value, Z denotes an edge blur, a, b, and c denote planar parameters to be estimated, and e denotes a random error estimated to be present in the edge blur parameters.

11. The method of claim 9, wherein the calculating of the kriging surface characteristics comprises:

a step for acquiring a residual component as a following Equation from the edge blur parameters;

a step for acquiring a variogram for the respective residual components, and generating a covariance function by adopting a point of the variogram as an observation value; and a step for estimating a parameter for the covariance function using a least square scheme to acquire the kriging surface characteristics for a pixel value having a constant interval, $$R = y - A\xi$$

where, $$y = A\xi + e$$

where $$y = \begin{bmatrix} Z_1 \\ Z_2 \\ \vdots \\ Z_n \end{bmatrix}$$

-continued $$A = \begin{bmatrix} X_1 & Y_1 & 1 \\ X_2 & Y_2 & 1 \\ \vdots & \vdots & \vdots \\ X_n & Y_n & 1 \end{bmatrix}$$

$$\xi = \begin{bmatrix} a \\ b \\ c \end{bmatrix}$$

$$e = \begin{bmatrix} e_{Z_1} \\ e_{Z_2} \\ \vdots \\ e_{Z_n} \end{bmatrix} \quad e \sim N(0, \sigma_0^2 I)$$

where $\xi$ denotes a parameter vector, and R denotes a residual vector, A denotes vector, Z denotes edge blur, X denotes a background pixel value, Y denotes foreground pixel value, a, b, c denotes planar parameters to be estimated, e denotes a random error estimated to be present in the edge blur parameters, N denotes matrix parameter, $\sigma_0$ denotes blur parameter, I denotes unit matrix.

12. The method of claim 11, wherein the covariance function is generated in a quadratic function as a following Equation, $$C(h) = a + bh^2$$

where C(h) denotes the covariance function, a and b denote estimation parameters, and h denotes a distance between adjacent residual components.

13. The method of claim 11, wherein the covariance function is generated in a linear function as a following Equation, $$V(h) = ah$$

where V(h) denotes the covariance function, a denotes an estimation parameter, and h denotes a distance between adjacent residual components.

14. The method of claim 12, wherein an edge blur prediction value according to the surface characteristics for each pixel value having the constant interval is calculated by a following Equation, $$I(P) = k^T K^{-1} R$$

where P is an arbitrary point in a grid configuration predicted by the residual components, and k, K, and R are defined as following, $$k = [C(\overline{PP_1}) \ C(\overline{PP_2}) \ \ldots \ C(\overline{PP_m})]^T$$

$$K = \begin{bmatrix} 0 & C(\overline{P_1P_2}) & \ldots & C(\overline{P_1P_m}) \\ C(\overline{P_1P_2}) & 0 & \ldots & C(\overline{P_2P_m}) \\ \vdots & \vdots & \ddots & \vdots \\ C(\overline{P_1P_m}) & C(\overline{P_2P_m}) & \ldots & 0 \end{bmatrix}$$

$$R = [R_1 \ R_2 \ \ldots \ R_m]^T$$

where $PP_i$ is a distance between point P and point $P_i$, $P_iP_j$ is a distance between point $P_i$ and point $P_j$, and $R_i$ is a residual component at point $P_i$, C(h) denotes the covariance function.

15. The method of claim 9, wherein a background edge blur prediction value according to the surface characteristics is set to decrease, as a background pixel value increases or a foreground pixel value increases, and a foreground edge blur prediction value according to the surface characteristics is set to increase, as the background pixel value increases or the foreground pixel value decreases, wherein the surface characteristics is the generation surface characteristics for each pixel.

16. The method of claim 13, wherein an edge blur prediction value according to the surface characteristics for each pixel value having the constant interval is calculated by a following Equation, $$I(P) = k^T K^{-1} R$$

where P is an arbitrary point in a grid configuration predicted by the residual components, and k, K, and R are defined as following, $$k = [C(\overline{PP_1}) \ C(\overline{PP_2}) \ \ldots \ C(\overline{PP_m})]^T$$

$$K = \begin{bmatrix} 0 & C(\overline{P_1P_2}) & \ldots & C(\overline{P_1P_m}) \\ C(\overline{P_1P_2}) & 0 & \ldots & C(\overline{P_2P_m}) \\ \vdots & \vdots & \ddots & \vdots \\ C(\overline{P_1P_m}) & C(\overline{P_2P_m}) & \ldots & 0 \end{bmatrix}$$

$$R = [R_1 \ R_2 \ \ldots \ R_m]^T$$

where $PP_i$ is a distance between point P and point $P_i$, $P_iP_j$ is a distance between point $P_i$ and point $P_j$, and $R_i$ is a residual component at point $P_i$, C(h) denotes the covariance function V(h).

\* \* \* \* \*